(12) United States Patent
Li et al.

(10) Patent No.: US 11,510,236 B2
(45) Date of Patent: Nov. 22, 2022

(54) METHOD AND APPARATUS OF REQUESTING RESOURCE FOR SIDELINK RETRANSMISSION IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 90 days.

(21) Appl. No.: 16/585,483

(22) Filed: Sep. 27, 2019

(65) Prior Publication Data

US 2020/0112982 A1 Apr. 9, 2020

Related U.S. Application Data

(60) Provisional application No. 62/741,209, filed on Oct. 4, 2018.

(51) Int. Cl.
| | |
|---|---|
| *H04W 72/14* | (2009.01) |
| *H04L 1/18* | (2006.01) |
| *H04L 5/00* | (2006.01) |
| *H04W 72/04* | (2009.01) |

(Continued)

(52) U.S. Cl.
CPC .......... *H04W 72/14* (2013.01); *H04L 1/1819* (2013.01); *H04L 5/0082* (2013.01); *H04W 72/0406* (2013.01); *H04W 80/02* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2015/0208408 A1* | 7/2015 | Berggren | H04L 1/1861 370/329 |
| 2017/0215114 A1 | 7/2017 | Li et al. | |
| 2018/0255532 A1 | 9/2018 | Li | |

(Continued)

FOREIGN PATENT DOCUMENTS

| | | |
|---|---|---|
| EP | 3481125 A1 | 5/2019 |
| EP | 3537830 A1 | 9/2019 |

(Continued)

OTHER PUBLICATIONS

Corresponding Korean Patent Application No. 10-2019-0119684, Office Action dated Nov. 18, 2020. English Translation.

(Continued)

*Primary Examiner* — Alex Skripnikov
(74) *Attorney, Agent, or Firm* — Cooper Legal Group LLC

(57) ABSTRACT

A method and apparatus are disclosed. In an example from the perspective of a first device, a grant is received from a network node. The grant allocates a set of sidelink data resources. One or more sidelink data transmissions are performed on the set of sidelink data resources. A second feedback information associated with the one or more sidelink data transmissions is received and/or detected. An uplink resource is derived. A first feedback information is transmitted on the uplink resource to the network node. The first feedback information is set based upon the second feedback information.

21 Claims, 24 Drawing Sheets

(51) Int. Cl.
*H04W 80/02* (2009.01)
*H04W 92/18* (2009.01)

(56) References Cited

U.S. PATENT DOCUMENTS

| | | | | |
|---|---|---|---|---|
| 2019/0349895 A1* | 11/2019 | Liu | | H04W 76/11 |
| 2019/0364588 A1* | 11/2019 | Lu | | H04L 1/189 |
| 2020/0053600 A1* | 2/2020 | Jang | | H04W 28/26 |
| 2020/0059766 A1* | 2/2020 | Kim | | H04W 72/042 |
| 2020/0137769 A1* | 4/2020 | Sun | | H04L 5/0091 |
| 2021/0037359 A1* | 2/2021 | Lee | | H04W 36/00 |

FOREIGN PATENT DOCUMENTS

| | | | | |
|---|---|---|---|---|
| KR | 20140055365 A | 5/2014 | | |
| KR | 20140103867 A | 8/2014 | | |
| WO | 2017026970 A1 | 2/2017 | | |
| WO | 2018000422 A1 | 1/2018 | | |
| WO | 2018004323 A1 | 1/2018 | | |
| WO | 2018084524 A1 | 5/2018 | | |
| WO | WO-2018168169 A1 * | 9/2018 | | H04L 1/1642 |
| WO | WO-2020033622 A1 * | 2/2020 | | H04L 1/1854 |

OTHER PUBLICATIONS

European Search report from corresponding EP application No. 19200034.7, dated Feb. 18, 2020, 9 pgs.
Corresponding European Patent Application No. 19200034.7, Communication Pursuant to Article 94(3), dated Mar. 26, 2021.
Corresponding European Patent Application No. 19200034.7, Office Action dated Sep. 7, 2021.

* cited by examiner

METHOD AND APPARATUS OF REQUESTING RESOURCE FOR SIDELINK RETRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/741,209 filed on Oct. 4, 2018, the entire disclosure of which is incorporated herein in its entirety by reference.

FIELD

This disclosure generally relates to wireless communication networks, and more particularly, to a method and apparatus for requesting a resource for sidelink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, a grant is received from a network node. The grant allocates a set of sidelink data resources (e.g., a set of one or more sidelink data resources). One or more sidelink data transmissions are performed on the set of sidelink data resources. A second feedback information associated with the one or more sidelink data transmissions is received and/or detected. An uplink resource is derived. A first feedback information is transmitted on the uplink resource to the network node. The first feedback information is set based upon the second feedback information.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology", "Radio Access Architecture and Interfaces"; R2-164306, "Summary of email discussion [93bis

23][NR] Deployment scenarios", NTT DOCOMO; 3GPP RAN2 #94 meeting minute; 3GPP TS 36.213 V15.2.0 (2018-06), "E-UTRA; Physical layer procedures (Release 15)"; 3GPP TS 36.212 V15.2.1 (2018-07), "E-UTRA; Physical layer; Multiplexing and channel coding (Release 15)"; 3GPP TS 36.211 V15.2.0 (2018-06), "E-UTRA; Physical layer; Physical channels and modulation (Release 15)"; Draft Report of 3GPP TSG RAN WG1 #94 v0.1.0, (Gothenburg, Sweden, 20-24 Aug. 2018); 3GPP TS 36.214 V15.1.0 (2018-03), "E-UTRA; Physical layer; Measurements (Release 15)". The standards and documents listed above are hereby expressly incorporated by reference in their entirety.

Figure 1:
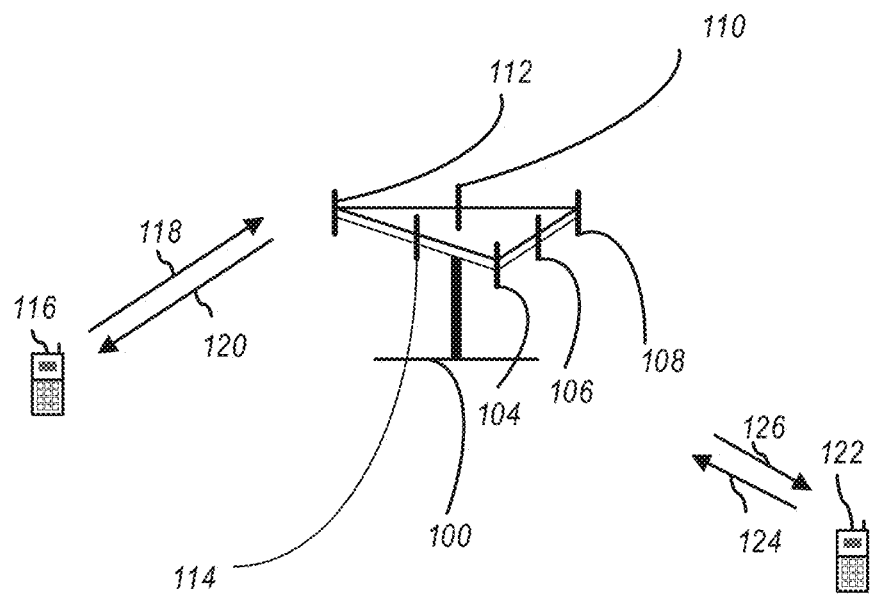
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB (eNB), or some other terminology. An access terminal (AT) may also be called user equipment (UE), a wireless communication device, terminal, access terminal or some other terminology.

Figure 2:
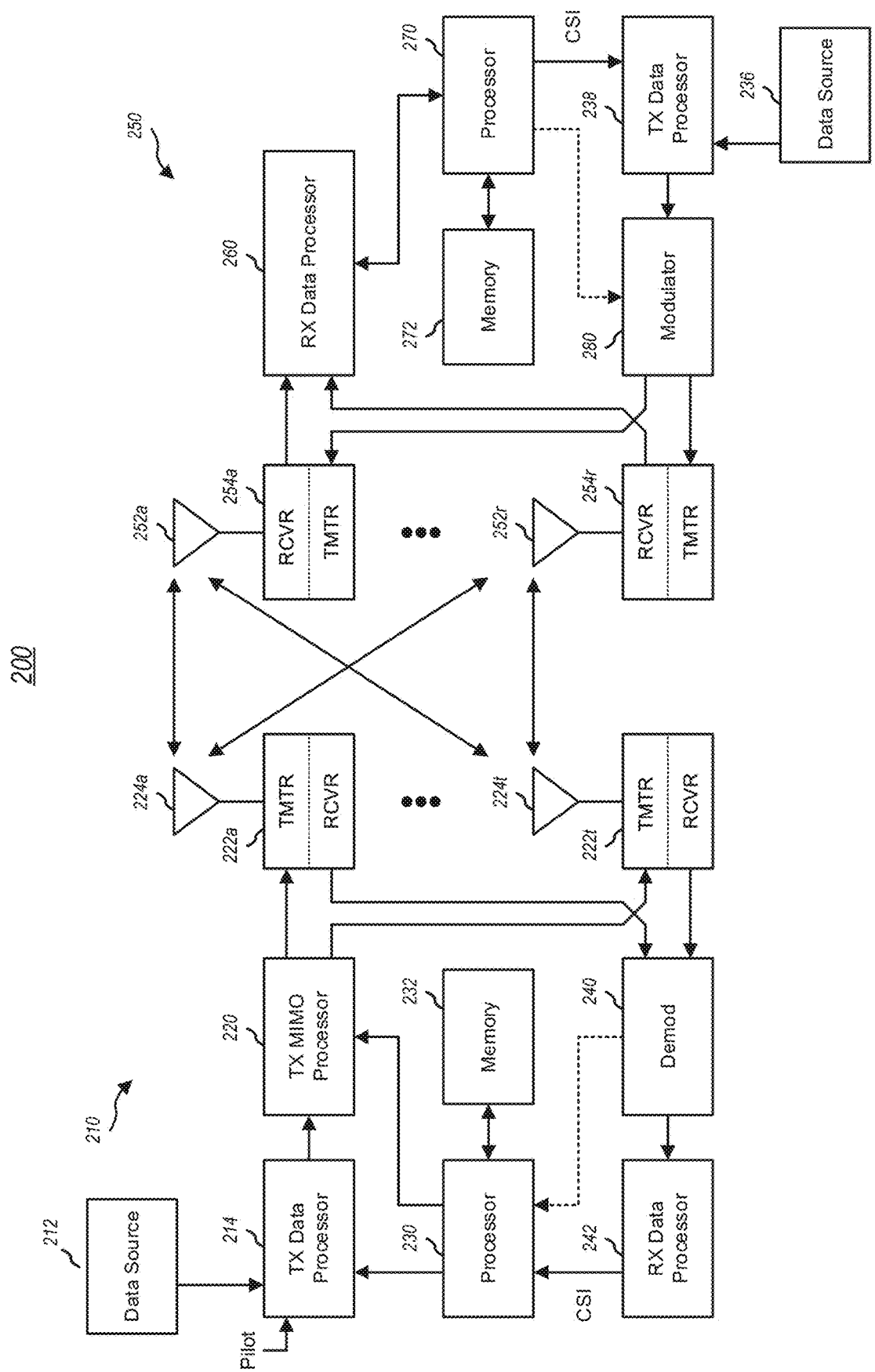
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
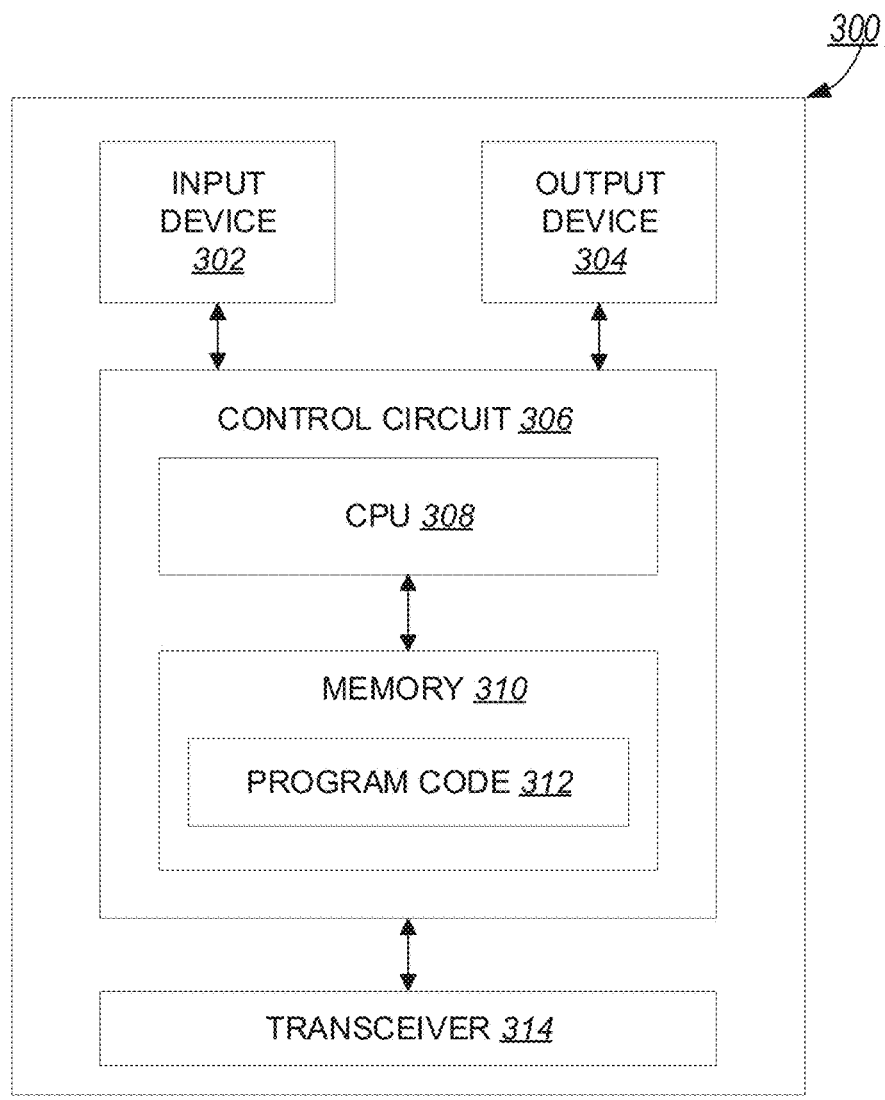
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
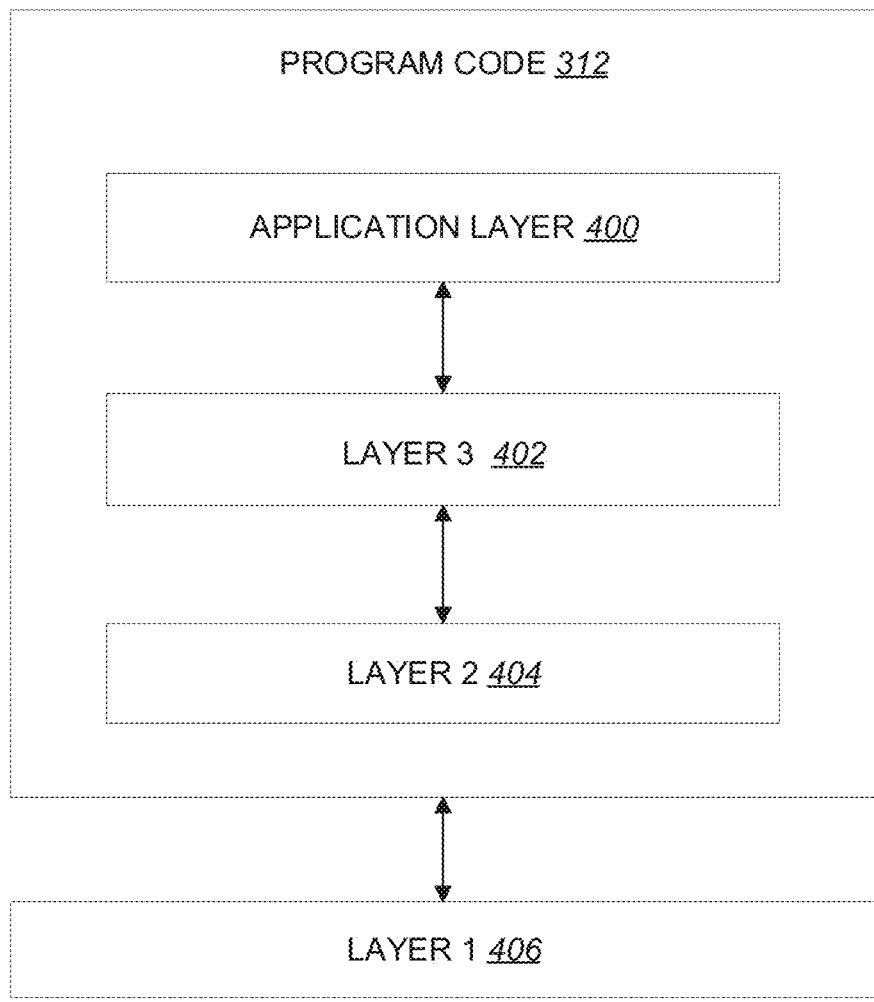
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020: mMTC (massive Machine Type Communications), eMBB (enhanced Mobile Broadband), and URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Figure 5:
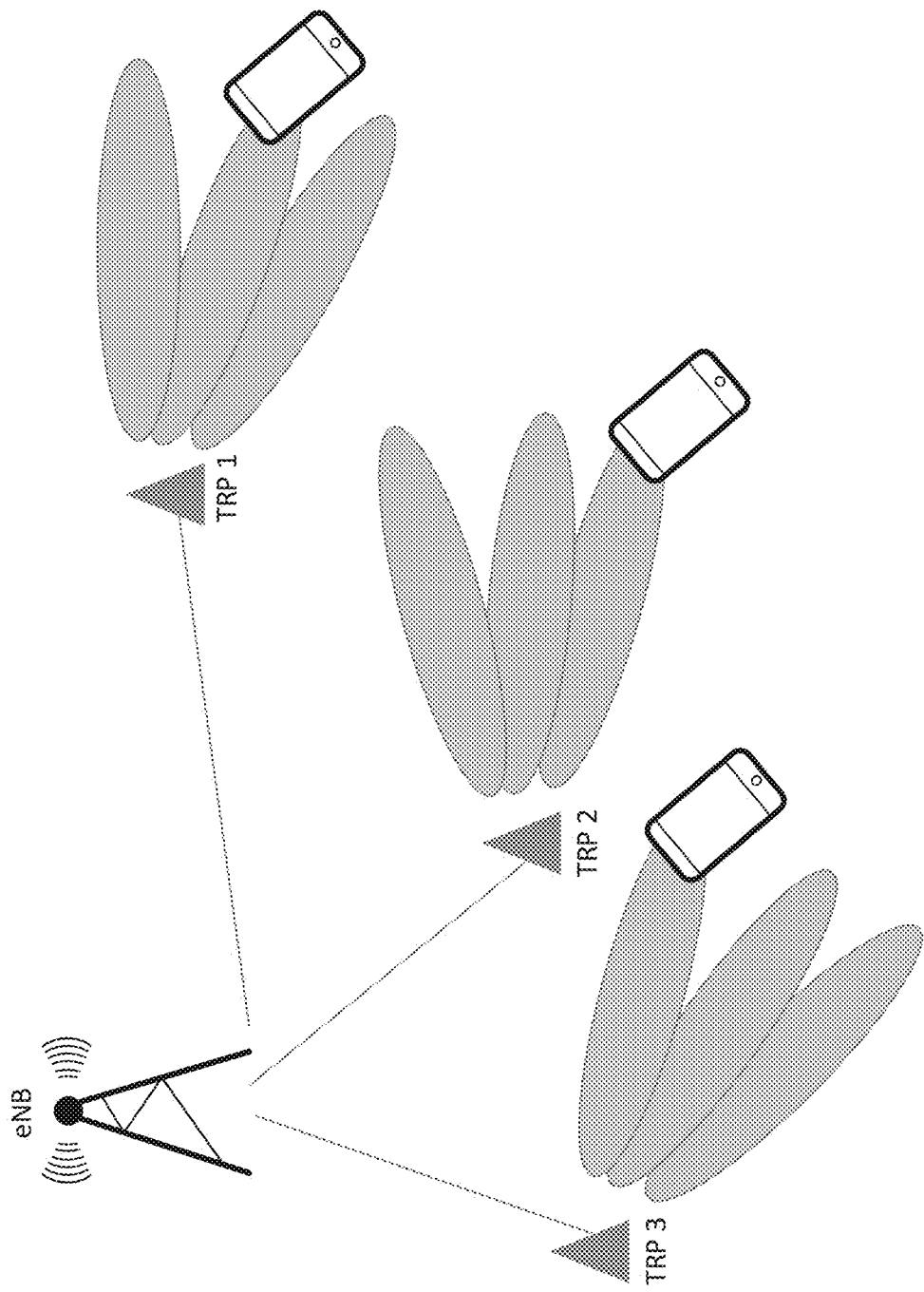
FIG. 5 illustrates an exemplary system comprising an eNodeB (eNB) with Transmission and Reception Points (TRPs).

As provided in R2-162709 and as shown in FIG. 5, an eNB may have multiple TRPs (either centralized or distributed). Notably, FIG. 5 is a reproduction of FIG. 1, entitled "Beam concept in 5G", in R2-162709. Each TRP can form multiple beams. The number of beams and the number of simultaneous beams in the time/frequency domain depend on the number of antenna array elements and the RF at the TRP.

Potential mobility type for NR can be listed: Intra-TRP mobility, Inter-TRP mobility, and Inter-NR eNB mobility.

As provided in R2-162762, reliability of a system purely relying on beamforming and operating in higher frequencies might be challenging, since the coverage might be more sensitive to both time and space variations. As a consequence of that the SINR of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 6:
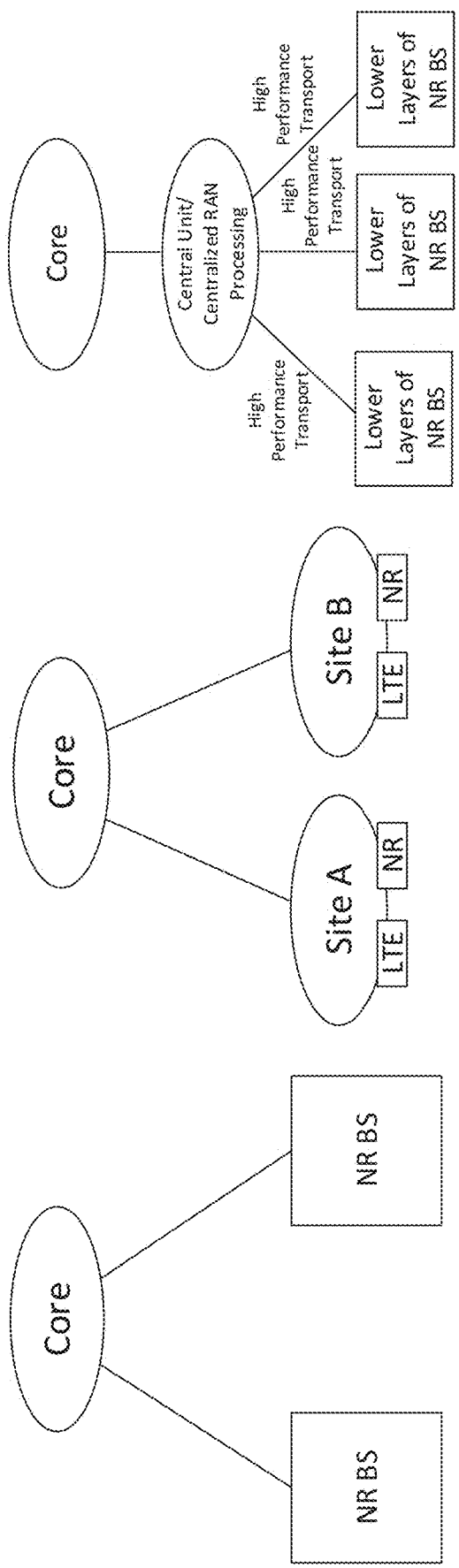
FIG. 6 illustrates exemplary deployment scenarios associated with New Radio Access Technology (NR) radio network architecture.
Figure 7:
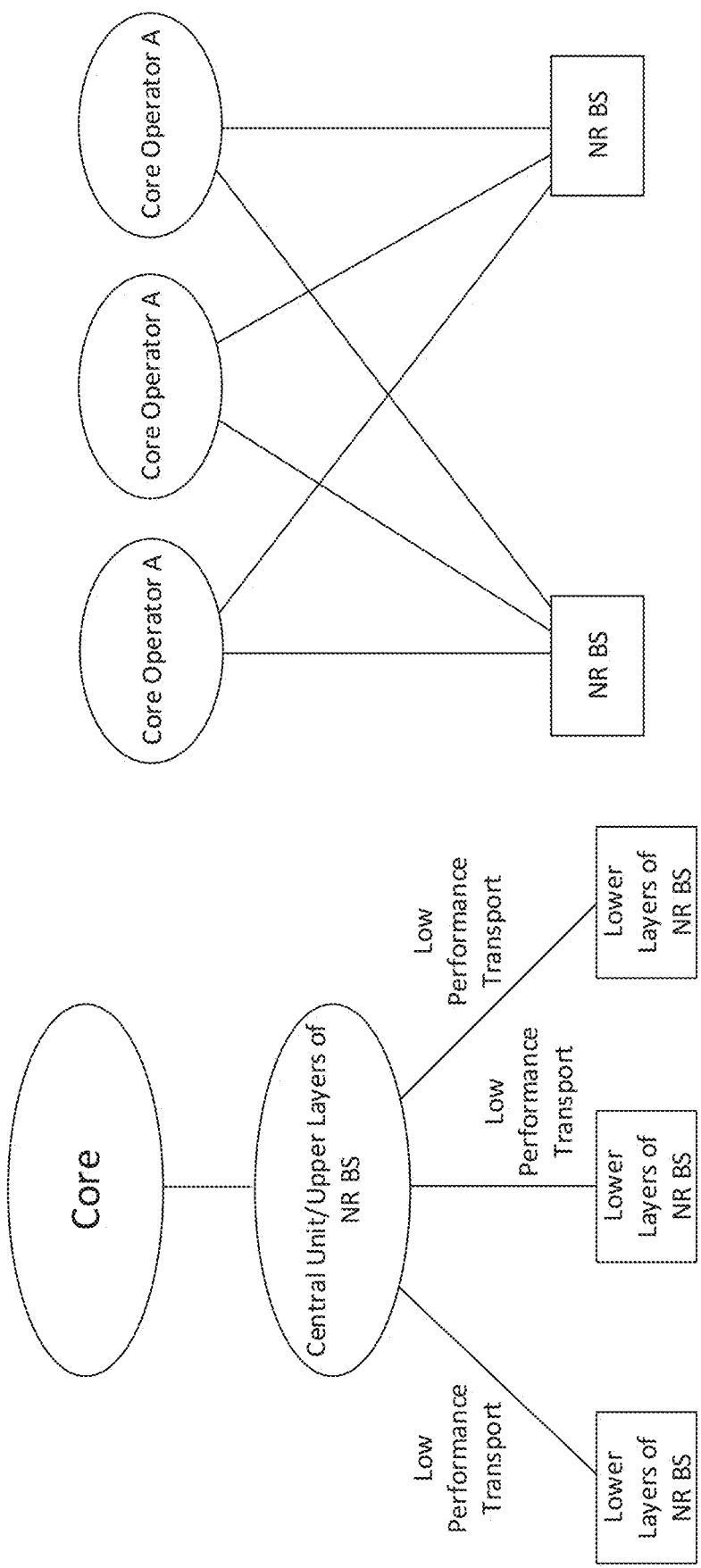
FIG. 7 illustrates exemplary deployment scenarios associated with NR radio network architecture.

As provided in R3-160947, scenarios illustrated in FIGS. 6-7 should be considered for support by the NR radio network architecture. FIGS. 6-7 illustrate exemplary deployment scenarios associated with NR radio network architecture. Notably, FIG. 6 is a reproduction of FIGS. 5.1-1 entitled "Stand-alone deployment", FIGS. 5.2-1 entitled "Co-sited deployment with LTE" and FIGS. 5.3-1 entitled "Centralized baseband deployments (high performance transport)" in R3-160947. FIG. 7 is a reproduction of FIGS. 5.4-1 entitled "Centralized deployment with low performance transport" and FIGS. 5.5-1 entitled "Shared RAN deployment" in R3-160947.

As provided in R2-164306, the following scenarios in terms of cell layout for standalone NR are captured to be studied: Macro cell only deployment, Heterogeneous deployment, and Small cell only deployment.

Based on 3GPP RAN2 #94 meeting minute, 1 NR eNB (e.g. called gNB) corresponds to one or more than one TRPs. Two levels of network controlled mobility: RRC driven at 'cell' level and Zero/Minimum RRC involvement (e.g. at MAC/PHY)

Figure 8:
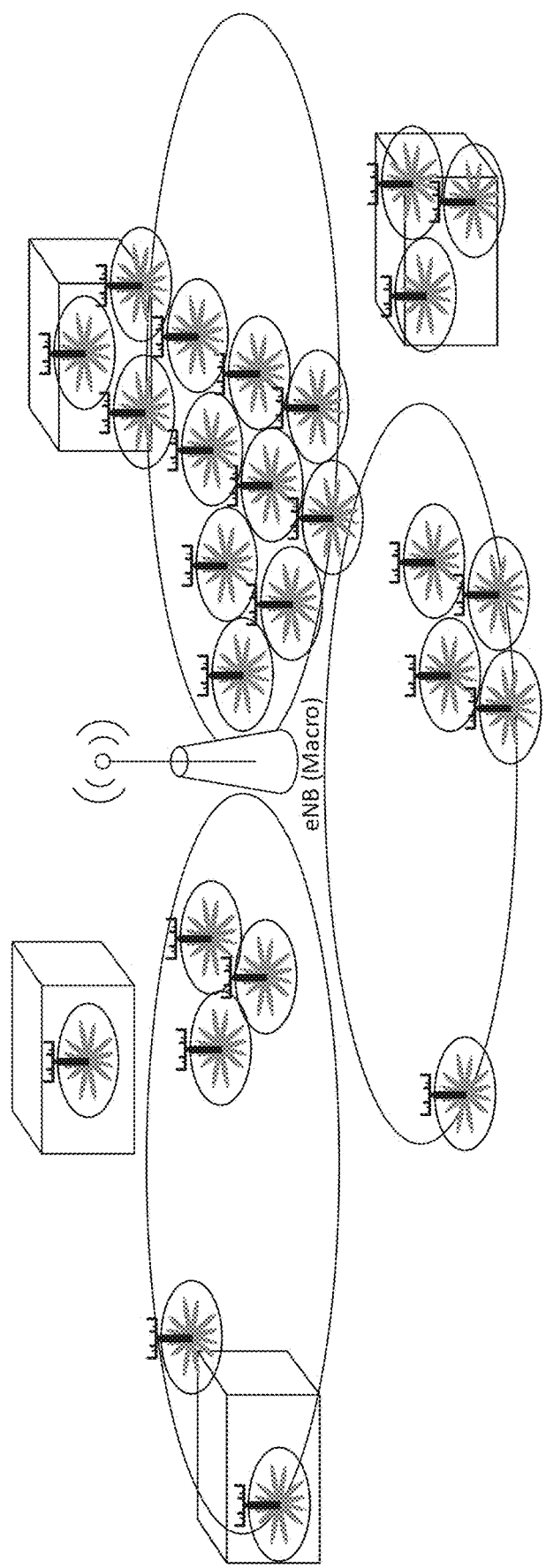
FIG. 8 illustrates an exemplary deployment scenario with a single TRP cell.
Figure 9:
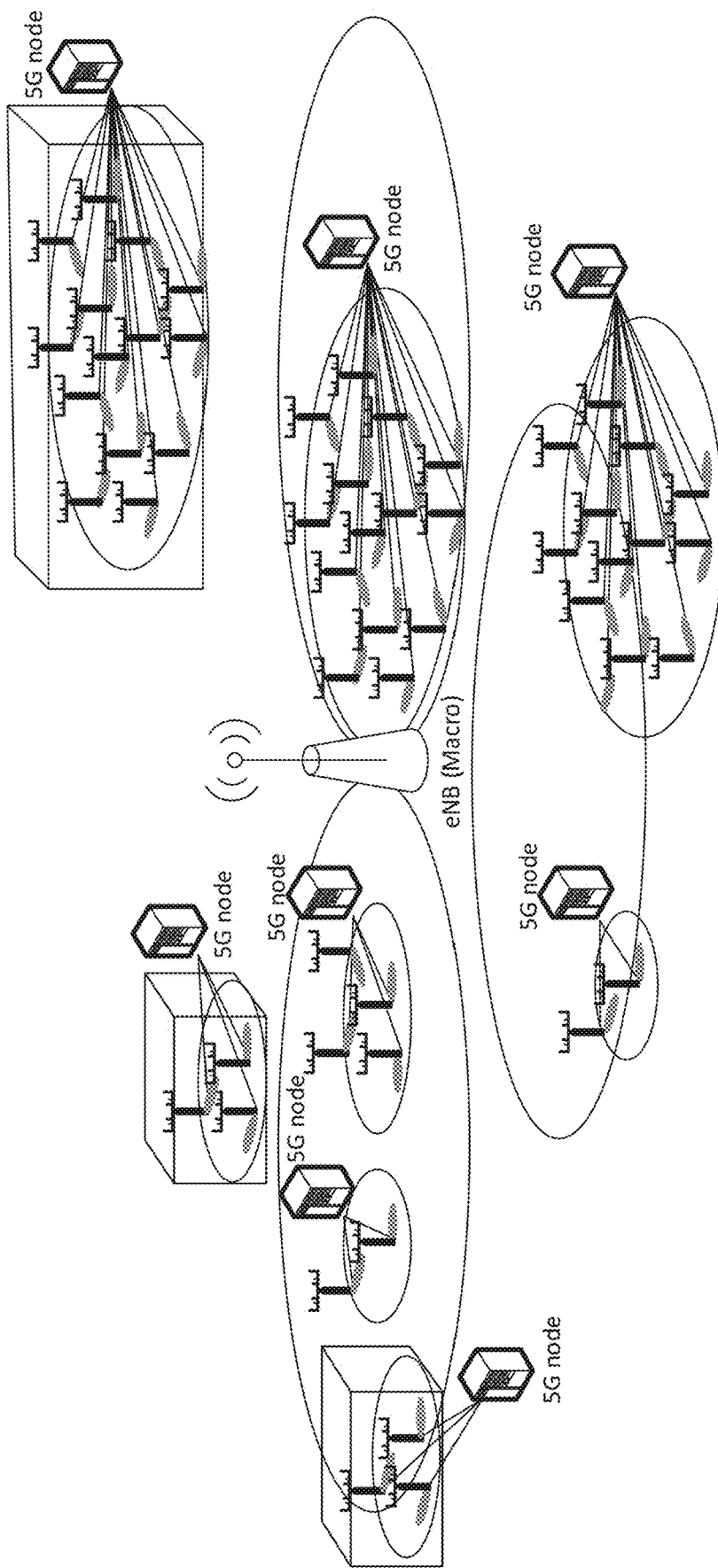
FIG. 9 illustrates an exemplary deployment scenario with multiple TRP cells.
Figure 10:
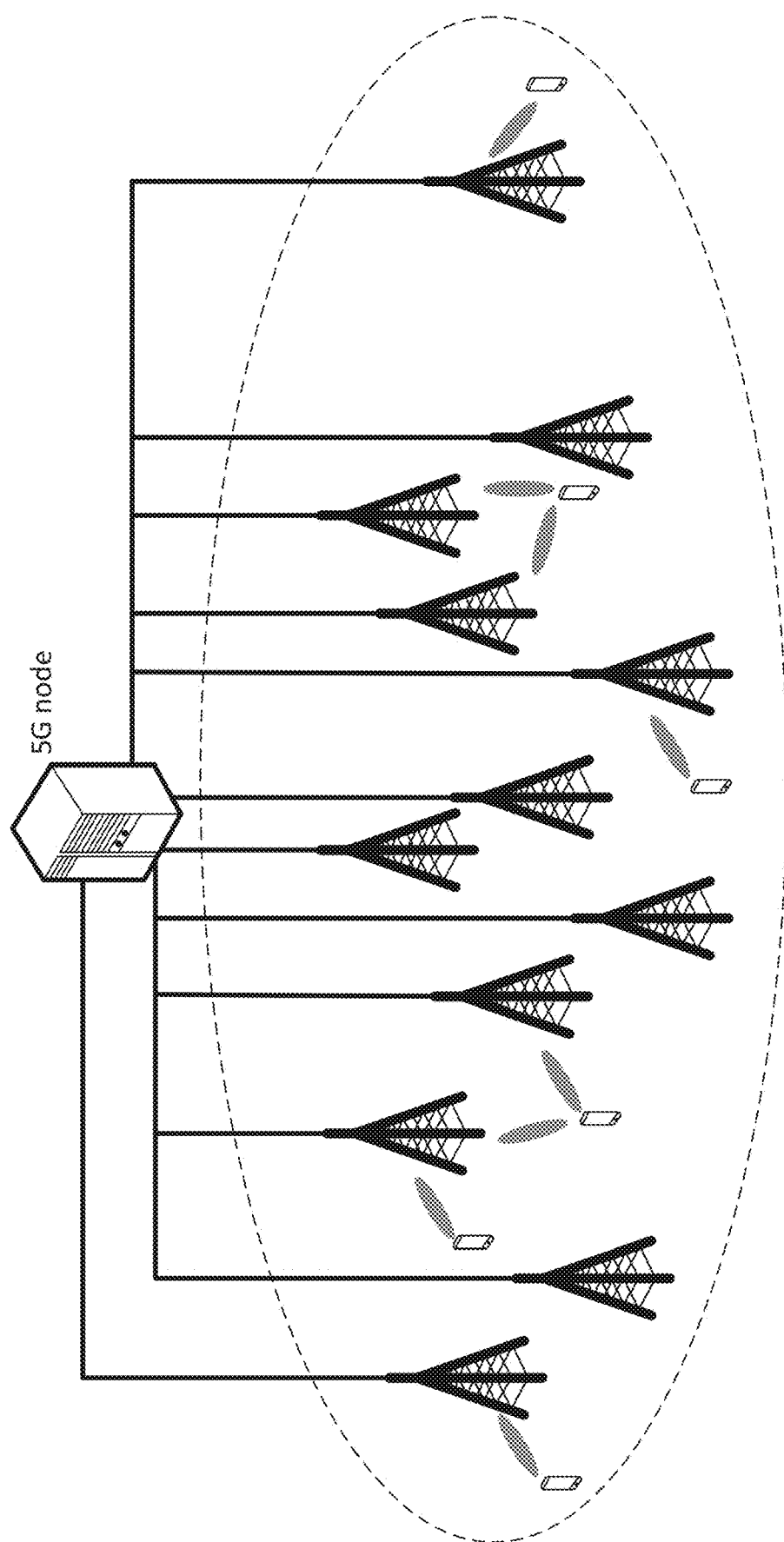
FIG. 10 illustrates a 5G cell comprising a 5G node with multiple TRPs.
Figure 11:
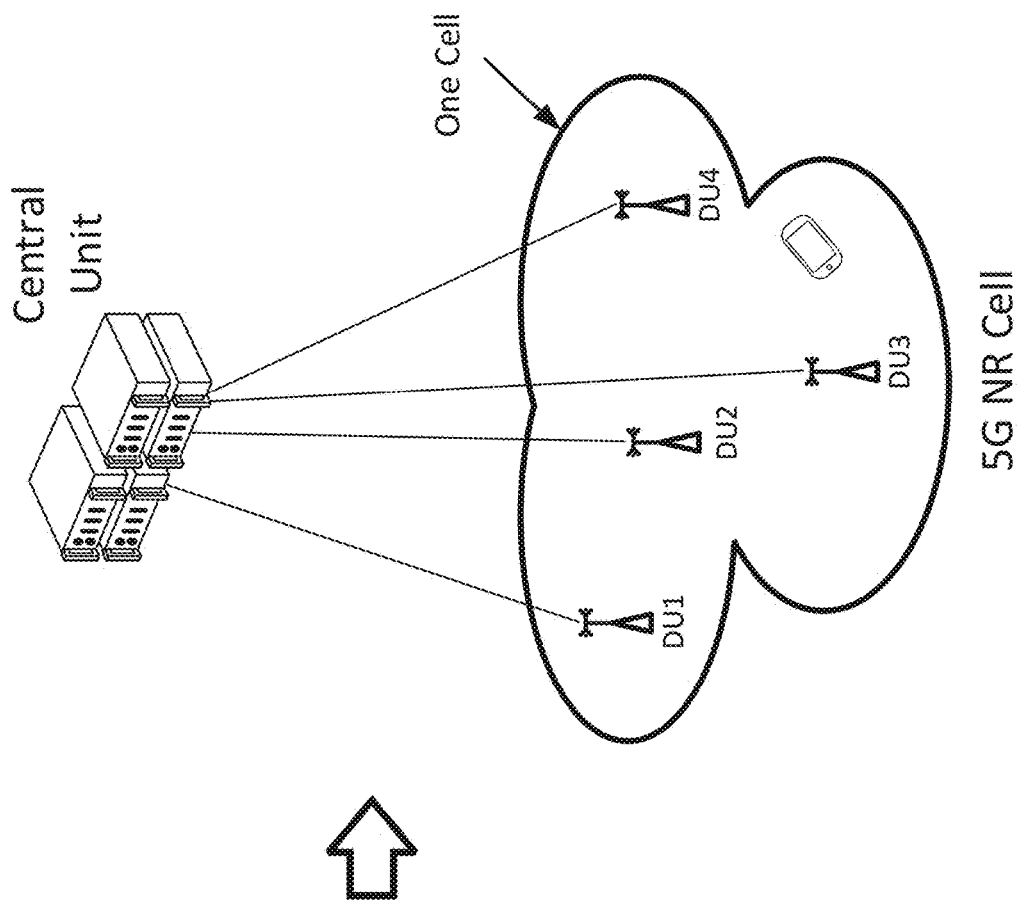
FIG. 11 illustrates a Long Term Evolution (LTE) cell and an NR cell.
Figure 11:
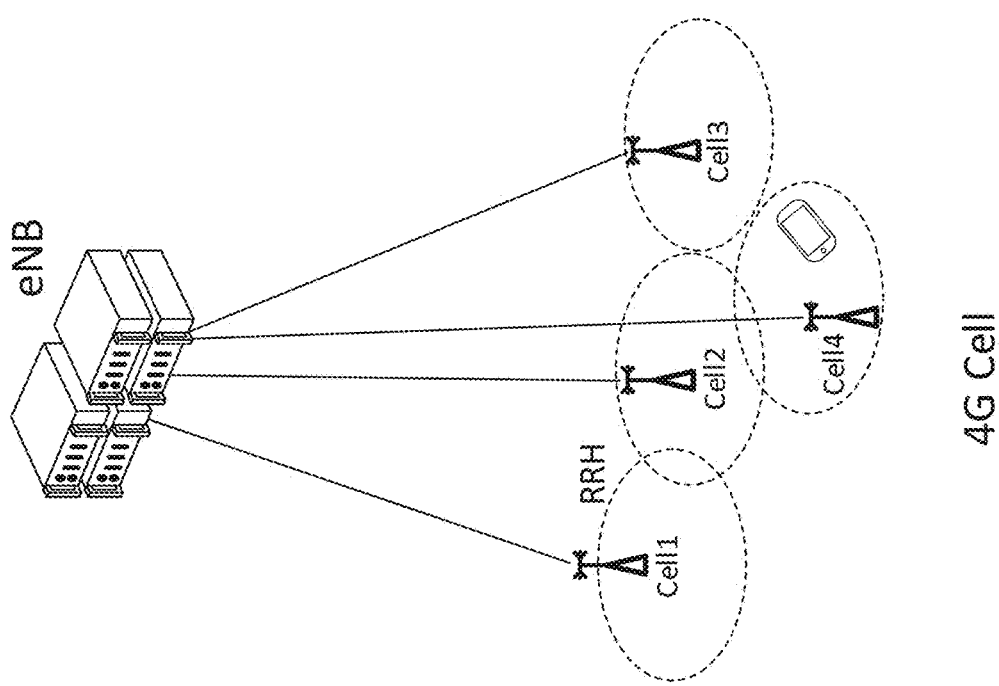

FIGS. 8-11 show some examples of the concept of a cell in 5G NR. FIG. 8, entitled "Different deployment scenarios with single TRP cell", shows a deployment with a single TRP cell. FIG. 9, entitled "Different deployment scenarios with multiple TRPs Cell", shows a deployment with multiple TRP cells. FIG. 10, entitled "One 5G Cell", shows one 5G cell comprising a 5G node with multiple TRPs. FIG. 11, entitled "LTE cell and NR cell", shows a comparison between a LTE cell and a NR cell.

3GPP TS 36.213 V15.1.0 specifies the UE procedure for V2X transmission. The V2X transmissions are performed as sidelink transmission mode 3 or sidelink transmission mode 4.

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1, 2, 3 or sidelink transmission mode 4. The physical sidelink control channel related procedures are described in Subclause 14.2.

[ . . . ]

14.1.1.6 UE Procedure for Determining the Subset of Resources to be Reported to Higher Layers in PSSCH Resource Selection in Sidelink Transmission Mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:
1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}$−1. The UE shall assume that any set of $L_{subCH}$ contiguous sub-channels included in the corresponding PSSCH resource pool (described in 14.1.5) within the time interval [n+T$_1$, n+T$_2$] corresponds to one candidate single-subframe resource, where selections of T$_1$ and T$_2$ are up to UE implementations under T$_1$≤4 and 20≤T$_2$≤100. UE selection of T$_2$ shall fulfil the latency requirement. The total number of the candidate single-subframe resources is denoted by $M_{total}$.
2) The UE shall monitor subframes $t_{n'-10\times P_{step}}^{SL}$, $t_{n'-10\times P_{step}+1}^{SL}$, ..., $t_{n'-1}^{SL}$ except for those in which its transmissions occur, where $t_{n'}^{SL}$=n if subframe n belongs to the set ($t_0^{SL}, t_1^{SL}, ..., t_{T_{max}}^{SL}$), otherwise subframe $t_{n'}^{SL}$ is the first subframe after subframe n belonging to the set ($t_0^{SL}, t_1^{SL}, ..., t_{T_{max}}^{SL}$). The UE shall perform the behaviour in the following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i=a*8+b+1.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
the UE has not monitored subframe $t_z^{SL}$ in Step 2.
there is an integer j which meets $y+j\times P'_{rsvp\_TX}=z+P_{step}\times k\times q$ where j=0, 1, ..., $C_{resel}$−1, $P'_{rsvp\_TX}=P_{step}\times P_{rsvp\_TX}/100$, k is any value allowed by the higher layer parameter restrictResourceReservationPeriod and q=1, 2, ..., Q. Here, $$Q = \frac{1}{k}$$

if k<1 and n'−z≤$P_{step}\times$k, where $t_{n'}^{SL}$=n if subframe n belongs to the set $t_0^{SL}, t_1^{SL}, ..., t_{T_{max}}^{SL}$, otherwise subframe $t_{n'}^{SL}$ is the first subframe belonging to the set $t_0^{SL}, t_1^{SL}, ..., t_{T_{max}}^{SL}$ after subframe n; and Q=1 otherwise.
6) The UE shall exclude any candidate single-subframe resource $R_{x,y}$ from the set $S_A$ if it meets all the following conditions:
the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
PSSCH-RSRP measurement according to the received SCI format 1 is higher than $Th_{prio_{TX}prio_{RX}}$.
the SCI format received in subframe $t_m^{SL}$ or the same SCI format 1 which is assumed to be received in subframe(s)

$$t_{m+q\times P_{step}\times P_{rsvp\_RX}}^{SL}$$

determines according to 14.1.1.4C the set of resource blocks and subframes which overlaps with $$R_{x,y+j\times P'_{rsvp\_TX}}$$

for q=1, 2, ..., Q and j=0, 1, ..., $C_{resel}$−1. Here, $$Q = \frac{1}{P_{rsvp\_RX}}$$

if $P_{rsvp\_RX}$<1 and n'−m≤$P_{step}\times P_{rsvp\_RX}$, where $t_{n'}^{SL}$=n if subframe n belongs to the set ($t_0^{SL}, t_1^{SL}, ..., t_{T_{max}}^{SL}$) otherwise subframe $t_{n'}^{SL}$ is the first subframe after subframe n belonging to the set ($t_0^{SL}, t_1^{SL}, ..., t_{T_{max}}^{SL}$); otherwise Q=1.
7) If the number of candidate single-subframe resources remaining in the set $S_A$ is smaller than $0.2\cdot M_{total}$, then Step 4 is repeated with $Th_{a,b}$ increased by 3 dB.
8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $t_{y-P_{step}*j}^{SL}$ for a non-negative integer j if $P_{rsvp\_TX}$≥100, and $$t_{y-P'_{rsvp\_TX}*j}^{SL}$$

for a non-negative integer j otherwise.
9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2\cdot M_{total}$.
The UE shall report set $S_B$ to higher layers.
[ ... ]
14.2 Physical Sidelink Control Channel Related Procedures
[ ... ] For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

TABLE 14.2-2

| PDCCH/EPDCCH configured by SL-V-RNTI or SL-SPS-V-RNTI | |
| --- | --- |
| DCI format | Search Space |
| DCI format 5A | For PDCCH: Common and UE specific by C-RNTI For EPDCCH: UE specific by C-RNTI |

The carrier indicator field value in DCI format 5A corresponds to v2x-InterFreqInfo.
[ ... ]
14.2.1 UE Procedure for Transmitting the PSCCH
For sidelink transmission mode 3,
The UE shall determine the subframes and resource blocks for transmitting SCI format 1 as follows:
SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4 + m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4 + m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

[ . . . ]

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

[ . . . ]

TABLE 14.2.1-1

Mapping of DCI format 5A offset field to indicated value m

| SL index field in DCI format 5A | Indicated value m |
|---|---|
| '00' | 0 |
| '01' | 1 |
| '10' | 2 |
| '11' | 3 |

In 3GPP TS 36.213 V15.2.0 (2018-06), it specifies that the UE feedbacks HARQ-ACK to network, depending on transport block(s) or a PDCCH/EPDCCH indicating downlink SPS release.

7.3.1 FDD HARQ-ACK Reporting Procedure

For FDD with PUCCH format 1a/1b transmission, when both HARQ-ACK and SR are transmitted in the same sub-frame/slot, a UE shall transmit the HARQ-ACK on its assigned HARQ-ACK PUCCH format 1a/1b resource for a negative SR transmission and transmit the HARQ-ACK on its assigned SR PUCCH resource for a positive SR transmission.

For FDD with PUCCH format 1a transmission, when both HARQ-ACK and SR are transmitted in the same subslot, a UE shall transmit the HARQ-ACK bit according to Table 7.3.1-0A:

TABLE 7.3.1-0A

| | PUCCH format 1a resource for transmission of HARQ-ACK bit and SR | |
|---|---|---|
| HARQ-ACK | SR transmission | Resource for HARQ-ACK bits transmission |
| ACK/NACK | negative | HARQ-ACK PUCCH format 1a resource |
| NACK | positive | The first SR PUCCH resource value configured by the higher layers |
| ACK | positive | The second SR PUCCH resource value configured by the higher layers | for FDD with PUCCH format 1b transmission, when both HARQ-ACK and SR are transmitted in the same subslot, a UE shall transmit the HARQ-ACK bits according to Table 7.3.1-0B:

TABLE 7.3.1-0B

| | PUCCH format 1b resource for transmission of HARQ-ACK bits | | |
|---|---|---|---|
| HARQ-ACK(0) | HARQ-ACK(1) | SR transmission | Resource for HARQ-ACK bits transmission |
| ACK/NACK | ACK/NACK | negative | HARQ-ACK PUCCH format 1b resource |
| NACK | NACK | positive | The first SR PUCCH resource value configured by the higher layers |
| NACK | ACK | positive | The second SR PUCCH resource value configured by the higher layers |
| ACK | NACK | positive | The third SR PUCCH resource value configured by the higher layers |
| ACK | ACK | positive | The fourth SR PUCCH resource value configured by the higher layers | where SR PUCCH resources are configured by higher layer parameter sr-SubslotSPUCCH-Resource, and HARQ-ACK (j), j=0, 1 denotes the ACK/NACK response for a transport block or SPS release PDCCH/EPDCCH/SPDCCH associated with serving cell c.

For FDD with PUCCH format 1b with channel selection, when both HARQ-ACK and SR are transmitted in the same sub-frame a UE shall transmit the HARQ-ACK on its assigned HARQ-ACK PUCCH resource with channel selection as defined in Subclause 10.1.2.2.1 for a negative SR transmission and transmit one HARQ-ACK bit per serving cell on its assigned SR PUCCH resource for a positive SR transmission according to the following:

if only one transport block or a PDCCH/EPDCCH indicating downlink SPS release is detected on a serving cell, the HARQ-ACK bit for the serving cell is the HARQ-ACK bit corresponding to the transport block or the PDCCH/EPDCCH indicating downlink SPS release:

if two transport blocks are received on a serving cell, the HARQ-ACK bit for the serving cell is generated by spatially bundling the HARQ-ACK bits corresponding to the transport blocks:

if neither PDSCH transmission for which HARQ-ACK response shall be provided nor PDCCH/EPDCCH indicating downlink SPS release is detected for a serving cell, the HARQ-ACK bit for the serving cell is set to NACK:

and the HARQ-ACK bits for the primary cell and the secondary cell are mapped to b(0) and b(1), respectively, where b(0) and b(1), are specified in Subclause 5.4.1 in [3].

For FDD, when a PUCCH format 3/4/5 transmission of HARQ-ACK coincides with a subframe/slot/subslot configured to the UE by higher layers for transmission of a scheduling request, the UE shall multiplex HARQ-ACK and SR bits on HARQ-ACK PUCCH resource as defined in Subclause 5.2.3.1 in [4], unless the HARQ-ACK corresponds to a subframe-PDSCH transmission on the primary cell only or a PDCCH/EPDCCH indicating downlink SPS release on the primary cell only, in which case the SR shall be transmitted as for FDD with PUCCH format 1a/1b.

For a non-BL/CE UE for FDD and for a PUSCH transmission, a UE shall not transmit HARQ-ACK on PUSCH in subframe/slot/subslot n if the UE does not receive PDSCH or PDCCH/SPDCCH indicating downlink SPS release in
    subframe $n-k_p$ for subframe-PDSCH or in subframe n−4 for PDCCH indicating downlink SPS release
    slot n−4 for slot-PDSCH
    subslot $n-X_p$ for subslot-SPDSCH if the higher layer parameter ul-TTI-Length is set to 'subslot'
    any of the subslot numbers listed in Table 10.1-1 if the higher layer parameter ul-TTI-Length is set to 'slot' and slot-PUSCH is transmitted in subframe m.

For a BL/CE UE, for FDD and for a PUSCH transmission scheduled by an MPDCCH where the last transmission of the MPDCCH is in subframe n−4, a UE shall not transmit HARQ-ACK on PUSCH in subframe n if there is no PDSCH or MPDCCH indicating downlink SPS release transmitted to the UE in subframe n−4 where the last transmission of the PDSCH or MPDCCH indicating downlink SPS release is in subframe n−4.

When only a positive SR is transmitted using subframe-PUCCH, a UE shall use PUCCH Format 1 for the SR resource as defined in Subclause 5.4.1 in [3].

When only a positive SR is transmitted using slot/subslot-PUCCH, a UE shall use PUCCH Format 1 for the first SR resource configured by higher layers as defined in Subclause 5.4A.2 in [3].

In 3GPP TS 36.214 V15.1.0 (2018-03), it specifies some measurements for sidelink transmission.

| 5.1.28 Sidelink Received Signal Strength Indicator (S-RSSI) | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

| 5.1.29 PSSCH Reference Signal Received Power (PSSCH-RSRP) | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE. |

| | 5.1.29 PSSCH Reference Signal Received Power (PSSCH-RSRP) |
|---|---|
| Applicable for | If receiver diversity is in use by the UE, the reported value shall not be lower than the corresponding PSSCH-RSRP of any of the individual diversity branches<br>RRC_IDLE intra-frequency,<br>RRC_IDLE inter-frequency,<br>RRC_CONNECTED intra-frequency,<br>RRC_CONNECTED inter-frequency |

NOTE:
The power per resource element is determined from the energy received during the useful part of the symbol, excluding the CP.

In 3GPP TS 36.212 V15.2.1 (2018-07), it specifies downlink shared channel and downlink control information, which are for communication between network node and UE, i.e. Uu link.

[ ... ]

5.3.3 Downlink Control Information

A DCI transports downlink, uplink or sidelink scheduling information, requests for aperiodic CQI reports. LAA common information, notifications of MCCH change [6] or uplink power control commands for one cell and one RNTI. The RNTI is implicitly encoded in the CRC.

[ ... ]

5.3.3.1.9 Format 5

DCI format 5 is used for the scheduling of PSCCH, and also contains several SCI format 0 fields used for the scheduling of PSSCH.

The following information is transmitted by means of the DCI format 5:

Resource for PSCCH—6 bits as defined in subclause 14.2.1 of [3]

TPC command for PSCCH and PSSCH—1 bit as defined in subclauses 14.2.1 and 14.1.1 of [3]

SCI format 0 fields according to 5.4.3.1.1:

Frequency hopping flag
  Resource block assignment and hopping resource allocation
  Time resource pattern If the number of information bits in format 5 mapped onto a given search space is less than the payload size of format 0 for scheduling the same serving cell, zeros shall be appended to format 5 until the payload size equals that of format 0 including any padding bits appended to format 0.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission–$[\log_2(N_{subchannel}^{SL})]$ bits as defined in subclause 14.1.1.4C of [3].

SCI format 1 fields according to 5.4.3.1.2:

Frequency resource location of initial transmission and retransmission.
  Time gap between initial transmission and retransmission.
  SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:

SL SPS configuration index—3 bits as defined in subclause 14.2.1 of [3].

Activation/release indication—1 bit as defined in subclause 14.2.1 of [3].

If the number of information bits in format 5A mapped onto a given search space is less than the payload size of format 0 mapped onto the same search space, zeros shall be appended to format 5A until the payload size equals that of format 0 including any padding bits appended to format 0.

If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

In 3GPP TS 36.212 V15.2.1 (2018-07), it also specifies sidelink shared channel and sidelink control information, which are for communication between devices, i.e. PC5 link or device-to-device link.

5.4 Sidelink Transport Channels and Control Information

[ ... ]

5.4.2 Sidelink Shared Channel

The processing of the sidelink shared channel follows the downlink shared channel according to subclause 5.3.2, with the following differences:

Data arrives to the coding unit in the form of a maximum of one transport block every transmission time interval (TTI)

In the step of code block concatenation, the sequence of coded bits corresponding to one transport block after code block concatenation is referred to as one codeword in subclause 9.3.1 of [2].

PUSCH interleaving is applied according to subclauses 5.2.2.7 and 5.2.2.8 without any control information in order to apply a time-first rather than frequency-first mapping, where $C_{max}=2\cdot(N_{symb}^{SL}-1)$. For SL-SCH configured by higher layers for V2X sidelink. $C_{max}=2\cdot(N_{symb}^{SL}-2)-1$ is used if the transmission format field of SCI format 1 is present and set to 1, otherwise $C_{max}=2\cdot(N_{symb}^{SL}-2)$.

5.4.3 Sidelink Control Information

An SCI transports sidelink scheduling information.

The processing for one SCI follows the downlink control information according to subclause 5.3.3, with the following differences:

In the step of CRC attachment, no scrambling is performed.

PUSCH interleaving is applied according to subclauses 5.2.2.7 and 5.2.2.8 without any control information in order to apply a time-first rather than frequency-first mapping, where $C_{max}=2\cdot(N_{symb}^{SL}-1)$ and the sequence of bits f is equal to e. For SCI format 1, $C_{max}=2\cdot(N_{symb}^{SL}-2)$.

5.4.3.1 SCI Formats

The fields defined in the SCI formats below are mapped to the information bits $a_0$ to $a_{A-1}$ as follows.

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

5.4.3.1.1 SCI Format 0

SCI format 0 is used for the scheduling of PSSCH.

The following information is transmitted by means of the SCI format 0:
- Frequency hopping flag—1 bit as defined in subclause 14.1.1 of [3].
- Resource block assignment and hopping resource allocation—$\lceil\log_2(N_{RB}^{SL}(N_{RB}^{SL}+1)/2)\rceil$ bits
  For PSSCH hopping:
  - $N_{SL\_hop}$ MSB bits are used to obtain the value of $\tilde{n}_{PRB}(i)$ as indicated in subclause 8.4 of [3]
  - $(\lceil\log_2(N_{RB}^{SL}(N_{RB}^{SL}+1)/2)\rceil - N_{SL\_hop})$ bits provide the resource allocation in the subframe
  For non-hopping PSSCH:
  - $(\lceil\log_2(N_{RB}^{SL}(N_{RB}^{SL}+1)/2)\rceil)$ bits provide the resource allocation in the subframe as defined in subclause 8.1.1 of [3]
- Time resource pattern—7 bits as defined in subclause 14.1.1 of [3].
- Modulation and coding scheme—5 bits as defined in subclause 14.1.1 of [3]
- Timing advance indication—11 bits as defined in subclause 14.2.1 of [3]
- Group destination ID—8 bits as defined by higher layers 5.4.3.1.2 SCI Format 1

SCI format 1 is used for the scheduling of PSSCH.
The following information is transmitted by means of the SCI format 1:
- Priority—3 bits as defined in subclause 4.4.5.1 of [7].
- Resource reservation—4 bits as defined in subclause 14.2.1 of [3].
- Frequency resource location of initial transmission and retransmission—$\lceil\log_2(N_{subchannel}^{SL}(N_{subchannel}^{SL}+1)/2)\rceil$ bits as defined in subclause 14.1.1.4C of [3].
- Time gap between initial transmission and retransmission—4 bits as defined in subclause 14.1.1.4C of [3].
- Modulation and coding scheme—5 bits as defined in subclause 14.2.1 of [3].
- Retransmission index—1 bit as defined in subclause 14.2.1 of [3].
- Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.
- Reserved information bits are added until the size of SCI format 1 is equal to 32 bits. The reserved bits are set to zero.

In 3GPP TS 36.211 V15.2.0 (2018-06), it also specifies generation for physical uplink shared channel, physical uplink control channel, physical downlink shared channel, and physical downlink control channel. The physical uplink shared channel, physical uplink control channel, physical downlink shared channel, and physical downlink control channel are for communication between network node and UE, i.e. Uu link.

The physical uplink shared channel (PUSCH) delivers data/transport block for uplink shared channel (UL-SCH).

The physical downlink shared channel (PDSCH) delivers data/transport block for downlink shared channel (DL-SCH).

The physical uplink control channel (PUCCH) delivers uplink control information (UCI).

The physical downlink control channel (PDCCH) delivers downlink control information (DCI).

5.4 Physical Uplink Control Channel

The physical uplink control channel, PUCCH, carries uplink control information. Simultaneous transmission of PUCCH and PUSCH from the same UE is supported if enabled by higher layers. For frame structure type 2, the PUCCH is not transmitted in the UpPTS field.

The physical uplink control channel supports multiple formats as shown in Table 5.4-1 with different number of bits per subframe, where $M_{RB}^{PUCCH4}$ represents the bandwidth of the PUCCH format 4 as defined by clause 5.4.2B, and $N_0^{PUCCH}$ and $N_1^{PUCCH}$ are defined in Table 5.4.2C-1.

Formats 2a and 2b are supported for normal cyclic prefix only.

TABLE 5.4-1

Supported PUCCH formats

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |
| 4 | QPSK | $M_{RB}^{PUCCH4} \cdot N_{sc}^{RB} \cdot (N_0^{PUCCH} + N_1^{PUCCH}) \cdot 2$ |
| 5 | QPSK | $N_{sc}^{RB} \cdot (N_0^{PUCCH} + N_1^{PUCCH})$ |

All PUCCH formats use a cyclic shift, $n_{cs}^{cell}(n_s,l)$, which varies with the symbol number $l$ and the slot number $n_s$ according to $$n_{cs}^{cell}(n_s,l)=\sum_{i=0}^{7} c(8N_{symb}^{UL} \cdot n_s + 8l + i) \cdot 2^i$$

where the pseudo-random sequence $c(i)$ is defined by clause 7.2. The pseudo-random sequence generator shall be initialized with $c_{init}=n_{ID}^{RS}$, where $n_{ID}^{RS}$ is given by clause 5.5.1.5 with $N_{ID}^{cell}$ corresponding to the primary cell, at the beginning of each radio frame.

The physical resources used for PUCCH format 1/1a/1b and PUCCH format 2/2a/2b depends on two parameters, $N_{RB}^{(2)}$ and $N_{cs}^{(1)}$, given by higher layers.

The variable $N_{RB}^{(2)} \geq 0$ denotes the bandwidth in terms of resource blocks that are available for use by PUCCH formats 2/2a/2b transmission in each slot. The variable $N_{cs}^{(1)}$ denotes the number of cyclic shift used for PUCCH formats 1/1a/1b in a resource block used for a mix of formats 1/1a/1b and 2/2a/2b. The value of $N_{cs}^{(1)}$ is an integer multiple of $\Delta_{shift}^{PUCCH}$ within the range of $\{0, 1, \ldots, 7\}$, where $\Delta_{shift}^{PUCCH}$ is provided by higher layers. No mixed resource block is present if $N_{cs}^{(1)}=0$. At most one resource block in each slot supports a mix of formats 1/1a/1b and 2/2a/2b. Resources used for transmission of PUCCH formats 1/1a/1b, 2/2a/2b, 3, 4, and 5 are represented by the non-negative indices $$n_{PUCCH}^{(1,\tilde{p})}, n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

$$n_{PUCCH}^{(3,\tilde{p})}, n_{PUCCH}^{(4)} \text{ and } n_{PUCCH}^{(5)},$$

respectively.

5.4.1 PUCCH Formats 1, 1a and 1b

For PUCCH format 1, information is carried by the presence/absence of transmission of PUCCH from the UE. In the remainder of this clause, $d(0)=1$ shall be assumed for PUCCH format 1.

For PUCCH formats 1a and 1b, one or two explicit bits are transmitted, respectively. The block of bits b(0), . . . , $b(M_{bit}-1)$ shall be modulated as described in Table 5.4.1-1, resulting in a complex-valued symbol d(0). The modulation schemes for the different PUCCH formats are given by Table 5.4-1.

[ . . . ]

TABLE 5.4.1-1

Modulation symbol d(0) for PUCCH formats 1a and 1b

| PUCCH format | b(0), . . . , $b(M_{bit}-1)$ | d(0) |
|---|---|---|
| 1a | 0 | 1 |
|  | 1 | −1 |
| 1b | 00 | 1 |
|  | 01 | −j |
|  | 10 | j |
|  | 11 | −1 |

[ . . . ]

5.4.2 PUCCH Formats 2, 2a and 2b

The block of bits b(0), . . . , b(19) shall be scrambled with a UE-specific scrambling sequence, resulting in a block of scrambled bits $\tilde{b}(0), \ldots, \tilde{b}(19)$ according to $$\tilde{b}(i)=(b(i)+c(i)) \bmod 2$$

where the scrambling sequence c(i) is given by clause 7.2. The scrambling sequence generator shall be initialised with $c_{init}=(\lfloor n_s/2 \rfloor+1)\cdot(2N_{ID}^{cell}+1)\cdot 2^{16}+n_{RNTI}$ at the start of each subframe where $n_{RNTI}$ is C-RNTI.

The block of scrambled bits $\tilde{b}(0), \ldots, \tilde{b}(19)$ shall be QPSK modulated as described in clause 7.1, resulting in a block of complex-valued modulation symbols d(0), . . . , d(9).

[ . . . ]

For PUCCH formats 2a and 2b, supported for normal cyclic prefix only, the bit(s) b(20), . . . , $b(M_{bit}-1)$ shall be modulated as described in Table 5.4.2-1 resulting in a single modulation symbol d(10) used in the generation of the reference-signal for PUCCH format 2a and 2b as described in clause 5.5.2.2.1.

TABLE 5.4.2-1

Modulation symbol d(10) for PUCCH formats 2a and 2b

| PUCCH format | b(20), . . . , $b(M_{bit}-1)$ | d(10) |
|---|---|---|
| 2a | 0 | 1 |
|  | 1 | −1 |
| 2b | 00 | 1 |
|  | 01 | −j |
|  | 10 | j |
|  | 11 | −1 |

5.4.2A PUCCH Format 3

The block of bits b(0), . . . , $b(M_{bit}-1)$ shall be scrambled with a UE-specific scrambling sequence, resulting in a block of scrambled bits $\tilde{b}(0), \ldots, \tilde{b}(M_{bit}-1)$ according to $$\tilde{b}(i)=(b(i)+c(i)) \bmod 2$$

where the scrambling sequence c(i) is given by clause 7.2. The scrambling sequence generator shall be initialised with $c_{init}=(\lfloor n_s/2 \rfloor+1)\cdot(2N_{ID}^{cell}+1)\cdot 2^{16}+n_{RNTI}$ at the start of each subframe where $n_{RNTI}$ is the C-RNTI.

The block of scrambled bits $\tilde{b}(0), \ldots, \tilde{b}(M_{bit}-1)$ shall be QPSK modulated as described in Subclause 7.1, resulting in a block of complex-valued modulation symbols d(0), . . . , $d(M_{symb}-1)$ where $M_{symb}=M_{bit}/2=2N_{sc}^{RB}$.

[ . . . ]

6.8 Physical Downlink Control Channel 6.8.1 PDCCH Formats

The physical downlink control channel carries scheduling assignments and other control information. A physical control channel is transmitted on an aggregation of one or several consecutive control channel elements (CCEs), where a control channel element corresponds to 9 resource element groups. The number of resource-element groups not assigned to PCFICH or PHICH is $N_{REG}$. The CCEs available in the system are numbered from 0 to $N_{CCE}-1$, where $N_{CCE}=\lfloor N_{REG}/9 \rfloor$. The PDCCH supports multiple formats as listed in Table 6.8.1-1. A PDCCH consisting of n consecutive CCEs may only start on a CCE fulfilling i mod n=0, where i is the CCE number.

Multiple PDCCHs can be transmitted in a subframe.

TABLE 6.8.1-1

Supported PDCCH formats

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

[ . . . ]

6.8.5 Mapping to Resource Elements

The mapping to resource elements is defined by operations on quadruplets of complex-valued symbols. Let $z^{(p)}(i)= \langle y^{(p)}(4i), y^{(p)}(4i+1), y^{(p)}(4i+2), y^{(p)}(4i+3) \rangle$ denote symbol quadruplet i for antenna port p.

The block of quadruplets $z^{(p)}(0), \ldots, z^{(p)}(M_{quad}-1)$, where $M_{quad}=M_{symb}/4$, shall be permuted resulting in $w^{(p)}(0), \ldots, w^{(p)}(M_{quad}-1)$. The permutation shall be according to the sub-block interleaver in clause 5.1.4.2.1 of 3GPP TS 36.212 [3] with the following exceptions:

the input and output to the interleaver is defined by symbol quadruplets instead of bits interleaving is performed on symbol quadruplets instead of bits by substituting the terms "bit", "bits" and "bit sequence" in clause 5.1.4.2.1 of 3GPP TS 36.212 [3] by "symbol quadruplet", "symbol quadruplets" and "symbol-quadruplet sequence", respectively <NULL> elements at the output of the interleaver in 3GPP TS 36.212 [3] shall be removed when forming $w^{(p)}(0), \ldots, w^{(p)}(M_{quad}-1)$. Note that the removal of <NULL> elements does not affect any <NIL> elements inserted in clause 6.8.2.

The block of quadruplets $w^{(p)}(0), \ldots, w^{(p)}(M_{quad}-1)$ shall be cyclically shifted, resulting in $\bar{w}^{(p)}(0), \ldots, \bar{w}^{(p)}(M_{quad}-1)$ where $\bar{w}^{(p)}(i)=w^{(p)}((i+N_{ID}^{cell}) \bmod M_{quad})$.

Mapping of the block of quadruplets $\bar{w}^{(p)}(0), \ldots, \bar{w}^{(p)}(M_{quad}-1)$ is defined in terms of resource-element groups, specified in clause 6.2.4, according to steps 1-10 below:

In 3GPP TS 36.211 V15.2.0 (2018-06), it also specifies generation for physical sidelink shared channel and physical sidelink control channel. The physical sidelink shared channel and physical sidelink control channel are for communication between devices, i.e. PC5 link or device-to-device link.

The physical sidelink shared channel (PSSCH) delivers data/transport block for sidelink shared channel (SL-SCH).

The physical sidelink control channel (PSCCH) delivers sidelink control information (SCI).

9 Sidelink 9.1 Overview

A sidelink is used for ProSe direct communication and ProSe direct discovery between UEs.

9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel. PSSCH
Physical Sidelink Control Channel. PSCCH
Physical Sidelink Discovery Channel. PSDCH
Physical Sidelink Broadcast Channel. PSBCH Generation of the baseband signal representing the different physical sidelink channels is illustrated in FIGS. 5.3-1. Notably, FIGS. 5.3-1 of 3GPP TS 36.211 V15.2.0 (2018-06) is omitted.

[ . . . ]

9.3 Physical Sidelink Shared Channel

[ . . . ]

9.3.6 Mapping to Physical Resources

The block of complex-valued symbols $z(0), \ldots, z(M_{symb}^{ap}-1)$ shall be multiplied with the amplitude scaling factor $\beta_{PSSCH}$ in order to conform to the transmit power $P_{PSSCH}$ specified in [4], and mapped in sequence starting with $z(0)$ to physical resource blocks on antenna port p and assigned for transmission of PSSCH. The mapping to resource elements (k,l) corresponding to the physical resource blocks assigned for transmission and not used for transmission of reference signals shall be in increasing order of first the index k, then the index l, starting with the first slot in the subframe. Resource elements in the last SC-FDMA symbol within a subframe shall be counted in the mapping process but not transmitted.

[ . . . ]

9.4 Physical Sidelink Control Channel

[ . . . ]

9.4.6 Mapping to Physical Resources

The block of complex-valued symbols $z(0), \ldots, z(M_{symb}^{ap}-1)$ shall be multiplied with the amplitude scaling factor $\beta_{PSCCH}$ in order to conform to the transmit power $P_{PSCCH}$ specified in [4], and mapped in sequence starting with $z(0)$ to physical resource blocks on antenna port p and assigned for transmission of PSCCH. The mapping to resource elements (k,l) corresponding to the physical resource blocks assigned for transmission and not used for transmission of reference signals shall be in increasing order of first the index k, then the index l, starting with the first slot in the subframe. Resource elements in the last SC-FDMA symbol within a subframe shall be counted in the mapping process but not transmitted.

In Draft Report of 3GPP TSG RAN WG1 #94 v0.1.0, RAN1 has some agreements about NR V2X.

Agreements:

RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to. Note that RAN1 has not made agreement about the difference among transmissions in unicast, groupcast, and broadcast manner.

RAN1 assumes that the physical layer knows the following information for a certain transmission belonging to a unicast or groupcast session. Note RAN1 has not made agreement about the usage of this information.

ID
  Groupcast: destination group ID, FFS: source ID
  Unicast: destination ID, FFS: source ID
HARQ process ID (FFS for groupcast)

RAN1 can continue discussion on other information

Agreements:

RAN1 to study the following topics for the SL enhancement for unicast and/or groupcast. Other topics are not precluded.
  HARQ feedback
  CSI acquisition
  Open loop and/or closed-loop power control
  Link adaptation
  Multi-antenna transmission scheme

[ . . . ]

Agreements:

At least PSCCH and PSSCH are defined for NR V2X.
  PSCCH at least carries information necessary to decode PSSCH.
  Note: PSBCH will be discussed in the synchronization agenda.
RAN1 continues study on the necessity of other channels.
Further study on
  Whether/which sidelink feedback information is carried by PSCCH or by another channel/signal.
  Whether/which information to assist resource allocation and/or schedule UE's transmission resource(s) is carried by PSCCH or by another channel/signal.
  PSCCH format(s) and content(s) for unicast, groupcast, and broadcast

[ . . . ]

Agreements:

RAN1 to continue study on multiplexing physical channels considering at least the above aspects:
  Multiplexing of PSCCH and the associated PSSCH (here, the "associated" means that the PSCCH at least carries information necessary to decode the PSSCH).
    Study further the following options:
      Option 1: PSCCH and the associated PSSCH are transmitted using non-overlapping time resources.
        Option 1A: The frequency resources used by the two channels are the same.
        Option 1B: The frequency resources used by the two channels can be different.
      Option 2: PSCCH and the associated PSSCH are transmitted using non-overlapping frequency resources in the all the time resources used for transmission. The time resources used by the two channels are the same.
      Option 3: A part of PSCCH and the associated PSSCH are transmitted using overlapping time resources in non-overlapping frequency resources, but another part of the associated PSSCH and/or another part of the PSCCH are transmitted using non-overlapping time resources.

[ . . . ]

Agreements:

At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources Notes:
- eNB control of NR sidelink and gNB control of LTE sidelink resources will be separately considered in corresponding agenda items.
- Mode-2 definition covers potential sidelink radio-layer functionality or resource allocation sub-modes (subject to further refinement including merging of some or all of them) where
    a) UE autonomously selects sidelink resource for transmission
    b) UE assists sidelink resource selection for other UE(s)
    c) UE is configured with NR configured grant (type-1 like) for sidelink transmission
    d) UE schedules sidelink transmissions of other UEs
- RAN1 to continue study details of resource allocation modes for NR-V2X sidelink communication Some or all of the following terminology and assumptions may be used hereafter.
- BS: a network central unit and/or a network node in New Radio Access Technology (NR) which is used to control one or more transmission and reception points (TRPs) which are associated with one or more cells. Communication between BS and TRP(s) is via fronthaul. BS may be referred to as central unit (CU), eNB, gNB, and/or NodeB.
- TRP: a TRP provides network coverage and directly communicates with UEs. TRP may be referred to as distributed unit (DU) and/or network node.
- Cell: a cell is composed of one or more associated TRPs, i.e. coverage of the cell is composed of coverage of some and/or all associated TRP(s). One cell is controlled by one BS. Cell may be referred to as TRP group (TRPG).
- NR-Physical Downlink Control Channel (PDCCH): A channel carries downlink control signal which is used to control communication between a UE and a network side. A network transmits NR-PDCCH on a configured control resource set (CORESET) to the UE.
- Uplink-control signal (UL-control signal): A UL-control signal may be one or more of scheduling request (SR), Channel State Information (CSI), Hybrid Automatic Repeat reQuest (HARQ)-Acknowledgement (HARQ-ACK) and/or HARQ-Negative Acknowledgement (HARQ-NACK) for downlink transmission, etc.
- Slot: a scheduling unit in NR. Slot duration is 14 OFDM symbols.
- Mini-slot: a scheduling unit with duration less than 14 OFDM symbols.
- Slot format information (SFI): Information of slot format of symbols in a slot. A symbol in a slot may belong to following type: downlink, uplink, unknown and/or other. The slot format of a slot could at least convey transmission direction of symbols in the slot.
- DL common signal: data channel carrying common information that targets for multiple UEs in a cell and/or some and/or all UEs in a cell. Example of DL common signal may be one or more of system information, paging, Random Access Response (RAR), etc.

For network side:
- Downlink timing of TRPs in the same cell are synchronized.
- Radio Resource Control (RRC) layer of network side is in BS.

For UE side:
- There are at least two UE (RRC) states: connected state (also called active state) and non-connected state (also called inactive state and/or idle state). Inactive state may be an additional state and/or belong to connected state and/or non-connected state.

For LTE and/or LTE Advanced (LTE-A) Vehicle to everything (V2X) and/or Pedestrian-to-Everything (P2X) transmission, there are at least two transmission modes: one is scheduled via network, such as sidelink transmission mode 3 as shown in 3GPP TS 36.212 V15.2.1 (2018-07); another one is sensing-based transmission, such as sidelink transmission mode 4, as shown in 3GPP TS 36.212 V15.2.1 (2018-07). Since the sensing-based transmission is not scheduled via network, the UE may perform sensing before selecting a resource for transmission, in order to avoid resource collision and interference from and/or in other UEs. In LTE/LTE-A Release 14, a V2X resource pool is configured with one of the two transmission modes. Thus, the two transmission modes are not mixed utilized in a V2X resource pool. In LTE/LTE-A Release 15, it is supported that the two transmission modes can be mixed utilized in a V2X resource pool.

For sidelink transmission mode 3, the network node may transmit a sidelink grant, (e.g., downlink control information (DCI) format 5A in LTE/LTE-A), on Uu interface for scheduling Physical Sidelink Control Channel (PSCCH) and/or Physical Sidelink Shared Channel (PSSCH). The V2X UE may perform PSCCH and PSSCH on PC5 interface, in response to the received DCI format 5A. Note that the V2X UE does not feedback HARQ-ACK associated with reception the DCI format 5A to network node. The Uu interface corresponds to the wireless interface for communication between network and UE. The PC5 interface corresponds to the wireless interface for communication between UEs.

A DCI format 5A may schedule one transmission occasion of PSCCH and/or PSSCH, wherein the DCI format 5A is with Cyclic Redundancy Checksum (CRC) scrambled via sidelink V2X Radio Network Temporary Identifier (SL-V-RNTI). Alternatively and/or additionally, the DCI format 5A may schedule semi-persistent periodic transmission occasions of PSCCH and/or PSSCH, wherein the DCI format 5A is with CRC scrambled via Semi-Persistent Scheduling (SPS) V2X Radio Network Temporary Identifier (RNTI) (SL-SPS-V-RNTI). Alternatively and/or additionally, the DCI format 5A with CRC scrambled via SL-SPS-V-RNTI may activated/release semi-persistent periodic transmission occasions of PSCCH and/or PSSCH. The periodicity may be configured in RRC with one of 20, 50, 100, 200, . . . , 1000 ms.

For one transmission occasion, the UE performs a PSSCH (new) transmission and/or a PSSCH retransmission for a transport block. For n transmission occasions, the UE performs n PSSCH (new) transmissions and/or n PSSCH retransmissions for n transport blocks.

Figure 12:
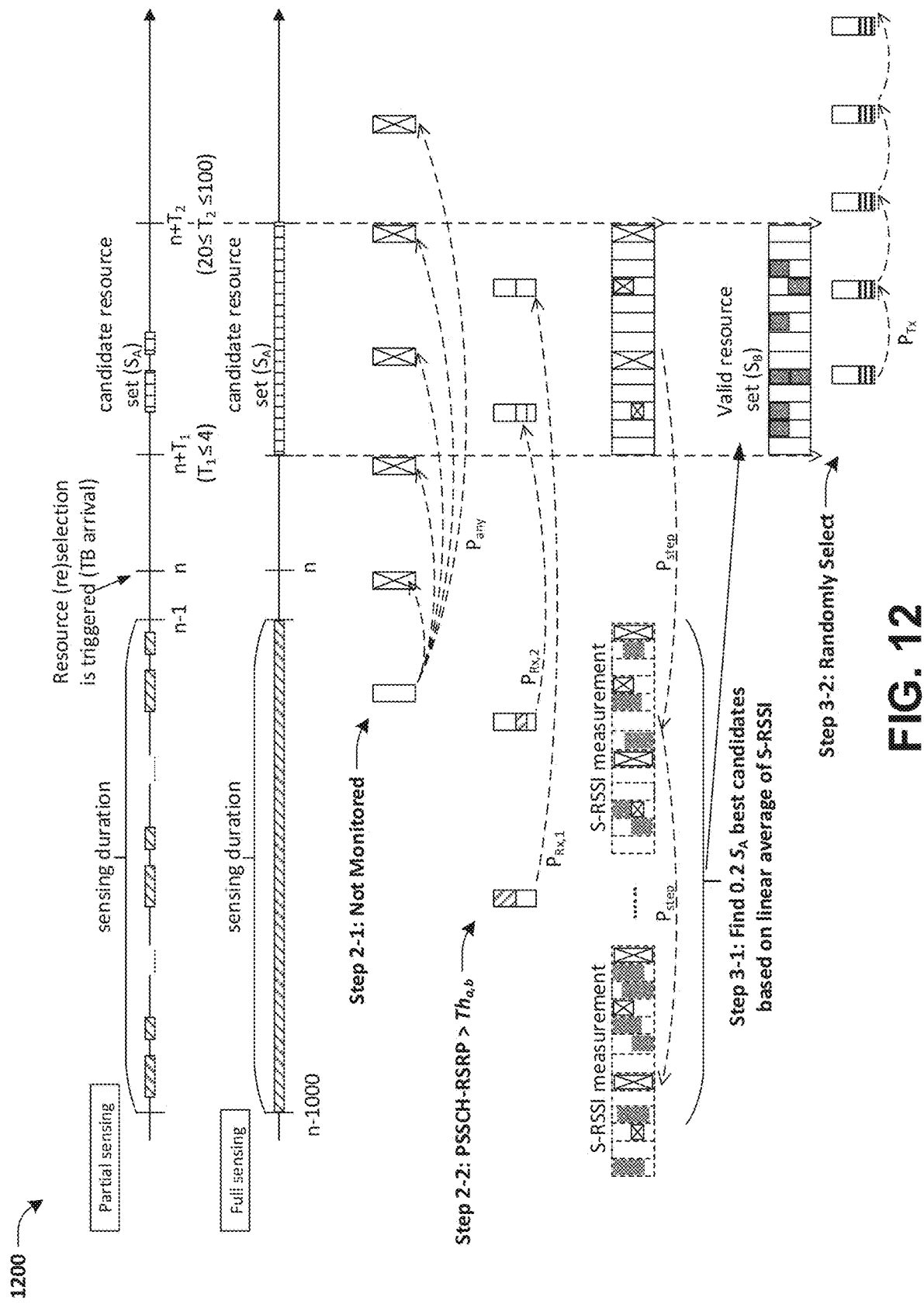
FIG. 12 illustrates an exemplary scenario associated with sensing-based resource selection.

For sidelink transmission mode 3, the sensing-based resource selection procedure is performed by UE. FIG. 12 illustrates an exemplary scenario 1200 associated with sensing-based resource selection. For a sensing-based resource selection procedure, an example of which is shown in FIG. 12, the UE has a candidate resource set comprising multiple candidate resources. The available candidate resource set is restricted with time interval [n+$T_1$, n+$T_2$]. The restricted time interval may be different depending on whether partially sensing is configured or not. Full sensing may mean that partially sensing is not configured. In one embodiment, a candidate resource may mean one candidate single-subframe resource. One candidate resource may comprise one or more resource units. The resource unit may be a sub-channel. In one embodiment, the resource unit may comprise multiple (physical) resource blocks in a transmission time interval (TTI). The TTI may be a subframe.

Based on sensing within a sensing duration, the UE may generate a valid resource set, wherein the valid resource set is a subset of the candidate resource set. The generation of the valid resource set may be performed via excluding some candidate resources (e.g., one or more candidate resources) from the candidate resource set, for instance the step 2-1 and step 2-2 shown in FIG. 12. The generation of the valid resource set may be performed via selecting some valid candidate resources, for instance the step 3-1 shown in FIG. 12. And then, the UE select one or more valid resources from the valid resource set to perform transmission from the UE. The valid resource selection for transmission may be randomly selected from the valid resource set, for instance the step 3-2 shown in FIG. 12.

As shown in 3GPP TS 36.212 V15.2.1 (2018-07), the first excluding step is that if the UE does not monitor/sense a TTI z, the UE may not determine (and/or may not be capable of determining) whether the candidate resources in TTI "$z+P_{any}$" are occupied or not, wherein $P_{any}$ corresponds to a possible periodicity for transmission. For instance, the first excluding step is shown as the step 2-1 in FIG. 12. For the case of $P_{any}>=100$ ms, the UE excludes the candidate resources in TTI "$z+P_{any}$" and excludes the candidates resources for which the UE may have possible transmission occurred in TTI "$z+P_{any}$". For the case of $P_{any}<100$ ms, the UE excludes the candidate resources in TTI "$z+q\cdot P_{any}$" and excludes the candidates resources for which the UE may have possible transmission occurred in TTI "$z+q\cdot P_{any}$", wherein q is 1, 2, . . . , $100/P_{any}$. The parameter q indicates that the UE excludes multiple candidate resources with period $P_{any}$ within time interval [z, z+100]. The possible transmission may mean a transmission on a selected valid resource. The possible transmission may mean a periodic transmission of a transmission on a selected valid resource. Alternatively and/or additionally, $P_{any}$ corresponds to a possible periodicity configured by higher layer.

The second excluding step is that if the UE receives/detects a control signaling in a TTI m, the UE may exclude the candidate resources according to the received control signaling. For instance, the second excluding step is shown as the step 2-2 in FIG. 12. Alternatively and/or additionally, if the UE receives/detects a control signaling scheduling a transmission in a TTI m and the measurement result of the scheduled transmission and/or the control signal is over a threshold, the UE may exclude the candidate resources according to the received control signaling. The measurement result may be RSRP. Alternatively and/or additionally, the measurement result may be PSSCH-RSRP. The control signaling may indicate the resources of the scheduled transmission and/or periodicity of the scheduled transmission, $P_{RX}$. The excluded candidate resources according to the received control signaling are the resources of a next scheduled transmission (e.g., a single scheduled transmission) based on the resources of the scheduled transmission and periodicity of the scheduled transmission, such as for the case of $P_{RX}>=100$ ms. Alternatively and/or additionally, the excluded candidate resources according to the received control signaling are the resources of multiple next scheduled transmissions based on the resources of the scheduled transmission and periodicity of the scheduled transmission, such as for the case of $P_{RX}<100$ ms. The multiple next scheduled transmissions may be with period $P_{RX}$ within time interval [m, m+100]. If the control signaling indicates that there is not a next scheduled transmission, if the control signaling indicates that the resource of scheduled transmission is not kept in next time, if the control signaling indicates that the scheduled transmission is the last transmission from the UE transmitting the control signaling and/or if the control signaling indicates that the periodicity of the scheduled transmission is indicated as zero, the UE may not exclude candidate resources according to the received control signaling.

After the first excluding step and the second excluding step, the UE may select some valid candidate resources from the remaining candidate resources, such as the step 3-1 shown in FIG. 12. The UE may measure resources in the sensing duration, wherein the measured resources are associated with the remaining candidate resources after the step 2-1 and step 2-2.

Alternatively and/or additionally, for a remaining candidate resource, the associated measured resources in the sensing duration are in the occasions with multiple times of a time period from the remaining candidate resources.

For instance, if the time period is 100 TTIs, the associated measured resources in the sensing duration are in the TTI "n−j·100", j is positive integer, for a remaining candidate resource in TTI n. Alternatively and/or additionally, the associated measured resources in the sensing duration are with the same frequency resources as the remaining candidate resource. Alternatively and/or additionally, the measurement is Sidelink Received Signal Strength Indicator (S-RSSI) measurement. Based on the measurement, the UE can derive metric for each remaining candidate resource. The metric for a remaining candidate resource may be linear average of S-RSSI measured from its associated measured resources in the sensing duration. And then, the UE may select valid candidate resources based on the metric of each remaining candidate resource. In one embodiment, an action is that a remaining candidate resource with the smallest metric is selected as valid candidate resource and moved into a valid resource set. The action may be repeated until the UE selects a number of remaining candidate resources as valid candidate resources and moves the number of remaining candidate resources into the valid resource set. For instance, the number is larger than or equal to 20% of total candidate resources. Alternatively and/or additionally, the number is larger than or equal to 20% of cardinality of the candidate resource set.

Based on the current (partially) sensing procedure, the UE can determine the valid resource set. The valid resource set may be reported to higher layers for transmission from the UE. The UE may select one or more valid resources from the valid resource set to perform transmission from the UE. The transmission from the UE may be PSSCH transmission.

In NR V2X, at least two sidelink resource allocation modes are defined for NR-V2X sidelink communication. Mode 1 is that base station/network node can schedule sidelink resource(s) to be used by UE for sidelink transmission(s). Mode 2 is that UE determines (e.g., base station/network node does not schedule) sidelink transmission resource(s) within sidelink resources configured by base station/network node and/or pre-configured sidelink resources. The mode 3 in LTE V2X may be a start point and/or basis for study mode 1 in NR V2X. The mode 4 in LTE V2X may be a start point and/or basis for study mode 2 in NR V2X.

Alternatively and/or additionally, NR V2X has requirement of high reliability and high throughput requirement.

Thus, it is considered to support HARQ feedback for unicast and/or groupcast. Accordingly, a transmitting device transmits a sidelink data transmission to a receiving device, and then the receiving device may transmit HARQ feedback to the transmitting device. If the HARQ feedback is ACK, it may mean the receiving device receives and decodes the sidelink data transmission successfully. When the transmitting device receives the HARQ feedback as ACK, the transmitting device may transmit another new sidelink data transmission to the receiving device. If the HARQ feedback is NACK, it may mean the receiving device does not receive and decode the sidelink data transmission successfully. When the transmitting device receives the HARQ feedback as NACK, the transmitting device may retransmit the sidelink data transmission to the receiving device. Since the sidelink data retransmission carries the same data packet as the sidelink data transmission, the receiving device may combine the sidelink data transmission and sidelink data retransmission and then perform decoding for the data packet. The combining can increase possibility of decoding successfully.

For Mode 1 V2X transmission, the resource of NR-V2X sidelink communication is scheduled by base station/network node. A similar in LTE/LTE-3 mode 3, the base station/network node may transmit a sidelink grant to a transmitting device, wherein the sidelink grant may allocated/indicate one or more sidelink data resources. Then, the transmitting device can perform NR-V2X sidelink data transmission(s) on the one or more sidelink data resources. However, when the transmitting device receives, from receiving device(s), the HARQ feedback as NACK, it is not clear how to acquire sidelink data resources for NR-V2X sidelink data retransmission. Since the sidelink data transmission and corresponding HARQ feedback are transmitted/received in PC5 interface, the base station/network node does not receive the HARQ feedback and not know whether the transmitting device needs to perform NR-V2X sidelink data retransmission or not. In other words, if the transmitting device receives, from receiving device(s), the HARQ feedback as ACK, the transmitting device does not need to acquire sidelink data resources for NR-V2X sidelink data retransmission. If the transmitting device receives, from receiving device(s), the HARQ feedback as NACK and/or Discontinuous Transmission (DTX), the transmitting device may need to acquire sidelink data resources for NR-V2X sidelink data retransmission.

Methods for acquiring sidelink data resource for NR-V2X sidelink data retransmission are described.

Method A

The concept of Method A is that a transmitting device transmits a sidelink data transmission in a first mode and transmits a sidelink data retransmission in a second mode. In one embodiment, the sidelink data transmission in the first mode and the sidelink data retransmission in the second mode carry/deliver/include the same data packet. In one embodiment, the first mode and the second mode are different modes for sidelink data (re)transmission. In one embodiment, a transmitting device transmits the sidelink data transmission on a first sidelink data resource in a first sidelink resource pool and transmits sidelink data retransmission on a second sidelink data resource in a second sidelink resource pool. In one embodiment, the transmitting device may transmit a first sidelink control information, which allocates/schedules the first sidelink data resource and indicates a partial and/or full identity of the transmitting device. In one embodiment, the transmitting device may transmit a second sidelink control information, which allocates/schedules the second sidelink data resource and indicates the partial and/or full identity of the transmitting device. In one embodiment, the partial and/or full identity of the transmitting device is to assist receiving device to determine which device transmits the sidelink data (re)transmission. In one embodiment, the identity of the transmitting device is source ID.

Accordingly, a receiving device may receive a sidelink data transmission in a first mode and receives sidelink data retransmission in a second mode. In one embodiment, the receiving device may receive a first sidelink control information, which allocates/schedules the sidelink data transmission and indicates a partial and/or full identity of the transmitting device. In one embodiment, the receiving device may receive a second sidelink control information, which allocates/schedules the sidelink data retransmission and indicates the same partial and/or full identity of the transmitting device. In one embodiment, the sidelink data transmission in the first mode and the sidelink data retransmission in the second mode carry/deliver/include the same data packet. In one embodiment, the receiving device may combine the sidelink data transmission in the first mode and the sidelink data retransmission in the second mode, to perform decoding for the data packet. In one embodiment, the first mode and the second mode are different modes for sidelink data reception. In one embodiment, a receiving device may receive the sidelink data transmission on a first sidelink data resource in a first sidelink resource pool and receive sidelink data retransmission on a second sidelink data resource in a second sidelink resource pool.

In one embodiment, the first sidelink resource pool is configured/set for the first mode, and the second sidelink resource pool is configured/set for the second mode. In one embodiment, the first resource pool is distinct/different from the second sidelink resource pool. In one embodiment, the first sidelink resource pool is not overlapped with the second sidelink resource pool. Alternatively and/or additionally, the first sidelink resource pool is overlapped with the second sidelink resource pool. Alternatively and/or additionally, the first sidelink resource pool is the same as the second sidelink resource pool, which means that the first/second sidelink resource pool is configured/set for both the first mode and the second mode.

In a first embodiment of Method A, the transmitting device performs a sidelink data transmission in a first sidelink data resource. The first sidelink data resource is allocated/scheduled by a network node. In one embodiment, the transmitting device receives a downlink control information, which allocates/schedules the first sidelink data resource. In one embodiment, the sidelink data transmission is performed in network scheduling mode (e.g., mode 1). In one embodiment, the transmitting device is configured with network scheduling mode for performing sidelink data transmission. In one embodiment, the transmitting device may transmit a first sidelink control information, which allocates/schedules the first sidelink data resource and indicates a partial and/or full identity of the transmitting device.

After performing the sidelink data transmission, the transmitting device may receive a non-acknowledgement feedback associated with the sidelink data transmission. In one embodiment, the transmitting device may perform sensing and selecting a second sidelink data resource. Alternatively and/or additionally, the transmitting device may randomly select a second sidelink data resource. Then, the transmitting device may perform sidelink data retransmission in the selected second sidelink data resource. In one embodiment, the sidelink data retransmission is performed in a device determining mode (e.g., mode 2). In one embodiment, the transmitting device may transmit a second sidelink control information, which allocates/schedules the second sidelink data resource and indicates the partial and/or full identity of the transmitting device. In one embodiment, the sidelink data transmission and the sidelink data retransmission carry/deliver/include the same data packet. In one embodiment, the transmitting device is still configured with network scheduling mode for performing sidelink data transmission. Accordingly, the transmitting device can perform the sidelink data retransmission in a device determining mode, even though the transmitting device is configured with network scheduling mode for performing sidelink data transmission.

In one embodiment, the first sidelink data resource is in a first sidelink resource pool. In one embodiment, the first sidelink resource pool is configured/set for network scheduling mode.

In one embodiment, the second sidelink data resource is in a second sidelink resource pool. In one embodiment, the second sidelink resource pool is configured/set for device determining mode.

In one embodiment, the first sidelink resource pool is distinct/different from the second sidelink resource pool. In one embodiment, the first sidelink resource pool is not overlapped with the second sidelink resource pool. Alternatively and/or additionally, the first sidelink resource pool is overlapped with the second sidelink resource pool. Alternatively and/or additionally, the first sidelink resource pool is the same as the second sidelink resource pool, which means that the first/second sidelink resource pool is configured/set for both the network scheduling mode and the device determining mode.

In a second embodiment of Method A, the transmitting device performs a sidelink data transmission in a first sidelink data resource. In one embodiment, the transmitting device may perform sensing and selecting the first sidelink data resource. Alternatively and/or additionally, the transmitting device may randomly select the first sidelink data resource. In one embodiment, the sidelink data transmission is performed in device determining mode (e.g., mode 2). In one embodiment, the transmitting device is configured with device determining mode for performing sidelink data transmission. In one embodiment, the transmitting device may transmit a first sidelink control information, which allocates/schedules the first sidelink data resource and indicates a partial and/or full identity of the transmitting device.

After performing the sidelink data transmission, the transmitting device may receive a non-acknowledgement feedback associated with the sidelink data transmission. In one embodiment, the transmitting device may transmit a request to network node for acquiring sidelink data resource (for sidelink data retransmission). In one embodiment, the transmitting device may perform sidelink data retransmission in a second sidelink data resource. In one embodiment, the transmitting device may transmit a second sidelink control information, which allocates/schedules the second sidelink data resource and indicates the partial and/or full identity of the transmitting device. The second sidelink data resource is allocated/scheduled by a network node. In one embodiment, the transmitting device receives a downlink control information, which allocates/schedules the second sidelink data resource. In one embodiment, the sidelink data retransmission is performed in network scheduling mode (e.g., mode 1). In one embodiment, the sidelink data transmission and the sidelink data retransmission carry/deliver/include the same data packet. In one embodiment, the transmitting device is still configured with device determining mode for performing sidelink data transmission. Accordingly, the transmitting device can perform the sidelink data retransmission in network scheduling mode, even though the transmitting device is configured with device determining mode for performing sidelink data transmission. In one embodiment, the transmitting device can transmit a request to network node for acquiring sidelink data resource (for sidelink data retransmission), even though the transmitting device is configured with device determining mode for performing sidelink data transmission.

In one embodiment, the first sidelink data resource is in a first sidelink resource pool. In one embodiment, the first sidelink resource pool is configured/set for device determining mode.

In one embodiment, the second sidelink data resource is in a second sidelink resource pool. In one embodiment, the second sidelink resource pool is configured/set for network scheduling mode.

In one embodiment, the first sidelink resource pool is distinct/different from the second sidelink resource pool. In one embodiment, the first sidelink resource pool is not overlapped with the second sidelink resource pool. Alternatively and/or additionally, the first sidelink resource pool is overlapped with the second sidelink resource pool. Alternatively and/or additionally, the first sidelink resource pool is the same as the second sidelink resource pool, which means that the first/second sidelink resource pool is configured/set for both the network scheduling mode and the device determining mode.

For the first embodiment and/or the second embodiment, the receiving device may receive the sidelink data transmission in a first sidelink resource pool and may receive sidelink data retransmission in a second mode. In one embodiment, the receiving device may receive a first sidelink control information, which allocates/schedules the sidelink data transmission and indicates a partial and/or full identity of the transmitting device. In one embodiment, the receiving device may receive a second sidelink control information, which allocates/schedules the sidelink data retransmission and indicates the same partial and/or full identity of the transmitting device. In one embodiment, the sidelink data transmission in the first sidelink resource pool and the sidelink data retransmission in the second sidelink resource pool carry/deliver/include the same data packet. In one embodiment, the receiving device may combine the sidelink data transmission in the first sidelink resource pool and the sidelink data retransmission in the second sidelink resource pool, to perform decoding for the data packet. In one embodiment, the first sidelink resource pool and the second sidelink resource pool are different sidelink resource pools for sidelink data reception/monitoring. In one embodiment, a receiving device may receive/monitor the sidelink data transmission in the first sidelink resource pool and receive/monitor sidelink data retransmission on the second sidelink resource pool. In one embodiment, the first sidelink resource pool is utilized for sidelink transmission in device selecting mode (e.g., NR V2X mode 2). The second sidelink resource pool is utilized for sidelink transmission in network scheduling mode (e.g., NR V2X mode 1). Alternatively and/or additionally, the first sidelink resource pool is utilized for sidelink transmission in network scheduling mode (e.g., NR V2X mode 1). The second sidelink resource pool is utilized for sidelink transmission in device selecting mode (e.g., NR V2X mode 2).

Method B-1

The concept of Method B-1 is that a transmitting device may transmit a first feedback information to network node, wherein the first feedback information is set based on a second feedback information received from a receiving device. Alternatively and/or additionally, the receiving device transmits/delivers the second feedback information to the transmitting device via a sidelink feedback transmission in PC5 interface. In one embodiment, the second feedback information indicates whether associated sidelink data transmission(s) is decoded/received by the receiving device successfully or not. Alternatively and/or additionally, the transmitting device transmits/delivers the first feedback information to the network node via uplink control/data transmission in Uu interface. In one embodiment, the first feedback information indicates whether sidelink data transmission(s) on sidelink data resource(s) scheduled by the network node is received by the receiving device successfully or not. In one embodiment, the first feedback information indicates whether the transmitting device needs sidelink data resources for performing sidelink data retransmission. In one embodiment, the uplink resource of the uplink control/data transmission is associated with the sidelink data resource(s) scheduled by the network node. In one embodiment, the uplink resource of the uplink control/data transmission is associated with a sidelink grant and/or downlink control information for scheduling the sidelink data resource(s). Thus, the network node can determine the utilized situation of the scheduled sidelink data resource(s) based on the first feedback information. Examples corresponding to possible relationships associated with the first feedback information and the second feedback information are described.

In a first example, if the transmitting device receives the second feedback information as positive acknowledgement and/or ACK, the transmitting device may transmit the first feedback information as positive acknowledgement and/or ACK. For example, the second feedback information may be indicative of positive acknowledgement and/or ACK and/or the first feedback information may be indicative of positive acknowledgement and/or ACK. The second feedback information as positive acknowledgement and/or ACK means that the receiving device receives/decodes the associated sidelink data transmission successfully. For example, the second feedback information being indicative of positive acknowledgement and/or ACK may indicate that the receiving device successfully receives and/or decodes the associated sidelink data transmission and/or that the receiving device has successfully received and/or decoded the associated sidelink data transmission. In the example, the transmitting device may determine, based upon the second feedback information being indicative of positive acknowledgement and/or ACK, that the receiving device successfully receives and/or decodes the associated sidelink data transmission and/or that the receiving device has successfully received and/or decoded the associated sidelink data transmission. The first feedback information as positive acknowledgement and/or ACK means that the sidelink data transmission(s) on sidelink data resource(s) scheduled by the network node is received by the receiving device successfully and/or means that the transmitting device does not need sidelink data resources for performing sidelink data retransmission. For example, the first feedback information being indicative of positive acknowledgement and/or ACK may indicate that the sidelink data transmission(s) on sidelink data resource(s) scheduled by the network node is successfully received by the receiving device and/or may indicate that the transmitting device does not need (e.g., the transmitting device does not require) sidelink data resources for performing sidelink data retransmission. In the example, the network node may determine, based upon the first feedback information indicative of positive acknowledgement and/or ACK, that the sidelink data transmission(s) on sidelink data resource(s) scheduled by the network node is successfully received by the receiving device and/or that the transmitting device does not need (e.g., the transmitting device does not require) sidelink data resources for performing sidelink data retransmission.

In a second example, if the transmitting device receives the second feedback information as non-positive acknowledgement and/or NACK, the transmitting device may transmit the first feedback information as non-positive acknowledgement and/or NACK. For example, the second feedback information may be indicative of non-positive acknowledgement and/or NACK and/or the first feedback information may be indicative of non-positive acknowledgement and/or NACK. The second feedback information as non-positive acknowledgement and/or NACK means that the receiving device does not decode the associated sidelink data transmission successfully. For example, the second feedback information being indicative of non-positive acknowledgement and/or NACK may indicate that the receiving device does not successfully receive and/or decode the associated sidelink data transmission. In the example, the transmitting device may determine, based upon the second feedback information being indicative of non-positive acknowledgement and/or NACK, that the receiving device does not successfully receive and/or decode the associated sidelink data transmission. The first feedback information as non-positive acknowledgement and/or NACK means that the sidelink data transmission(s) on sidelink data resource(s) scheduled by the network node is not received by the receiving device successfully and/or means that the transmitting device needs sidelink data resources for performing sidelink data retransmission. For example, the first feedback information being indicative of non-positive acknowledgement and/or NACK may indicate that the sidelink data transmission(s) on the sidelink data resource(s) scheduled by the network node is not successfully received by the receiving device and/or may indicate that the transmitting device needs (e.g., the transmitting device requires) sidelink data resources for performing sidelink data retransmission. In the example, the network node may determine, based upon the first feedback information indicative of non-positive acknowledgement and/or NACK, that the sidelink data transmission(s) on sidelink data resource(s) scheduled by the network node is not successfully received by the receiving device and/or that the transmitting device needs sidelink data resources for performing sidelink data retransmission.

In a third example, if the transmitting device does not receive the second feedback information and/or considers the second feedback information as DTX, the transmitting device may transmit the first feedback information as non-positive acknowledgement and/or NACK. For example, the second feedback information may not be received by the transmitting device. Alternatively and/or additionally, the transmitting device may consider and/or determine that the second feedback information corresponds to DTX. In the example, the transmitting device may transmit the first feedback information indicative of non-positive acknowledgement and/or NACK responsive to not receiving the second feedback information and/or responsive to considering that the second feedback information corresponds to DTX. Not receiving the second feedback information means that the receiving device does not receive a sidelink control information which schedules the associated sidelink data transmission and does not receive the associated sidelink data transmission. For example, the second feedback information not being received by the transmitting device may indicate that the receiving device does not receive and/or has not received the sidelink control information for scheduling the associated sidelink data transmission. Alternatively and/or additionally, the second feedback information not being received by the transmitting device may indicate that that the receiving device does not receive and/or has not received the associated sidelink data transmission. In the example, the transmitting device may determine, based upon the transmitting device not receiving the second feedback information, that the receiving device does not receive and/or has not received the sidelink control information for scheduling the associated sidelink data transmission and/or that the receiving device does not receive and/or has not received the associated sidelink data transmission. The second feedback information as DTX means that the receiving device does not receive a sidelink control information which schedules the associated sidelink data transmission and does not receive the associated sidelink data transmission. For example, the second feedback information corresponding to DTX may indicate that the receiving device does not receive and/or has not received the sidelink control information for scheduling the associated sidelink data transmission. Alternatively and/or additionally, the second feedback information corresponding to DTX may indicate that that the receiving device does not receive and/or has not received the associated sidelink data transmission. In the example, the transmitting device may determine, based upon determining and/or considering that the second feedback information corresponds to DTX, that the receiving device does not receive and/or has not received the sidelink control information for scheduling the associated sidelink data transmission and/or that the receiving device does not receive and/or has not received the associated sidelink data transmission. The first feedback information as non-positive acknowledgement and/or NACK means that the sidelink data transmission(s) on sidelink data resource(s) scheduled by the network node is not received by the receiving device successfully and/or means that the transmitting device needs sidelink data resources for performing sidelink data retransmission. For example, the first feedback information being indicative of non-positive acknowledgement and/or NACK may indicate that the sidelink data transmission(s) on the sidelink data resource(s) scheduled by the network node is not successfully received by the receiving device and/or may indicate that the transmitting device needs sidelink data resources for performing sidelink data retransmission. In the example, the network node may determine, based upon the first feedback information indicative of non-positive acknowledgement and/or NACK, that the sidelink data transmission(s) on sidelink data resource(s) scheduled by the network node is not successfully received by the receiving device and/or that the transmitting device needs sidelink data resources for performing sidelink data retransmission.

In a fourth example, if the transmitting device receives the second feedback information as positive acknowledgement and/or ACK, the transmitting device may perform a first feedback transmission to the network node. For example, the second feedback information may be indicative of positive acknowledgement and/or ACK. Performing the first feedback transmission means the first feedback information as positive acknowledgement and/or ACK. For example, the transmitting device performing the first feedback transmission may be indicative of positive acknowledgement and/or ACK. Alternatively and/or additionally, the first feedback transmission may be indicative of positive acknowledgement and/or ACK. In the example, the network node may determine that the first feedback information is indicative of positive acknowledgement and/or ACK based upon the transmitting device performing the first feedback transmission. The second feedback information as positive acknowledgement and/or ACK means that the receiving device receives/decodes the associated sidelink data transmission successfully. For example, the second feedback transmission information being indicative of positive acknowledgement and/or ACK may indicate that the receiving device receives and/or decodes the associated sidelink data transmission and/or that the receiving device has successfully received and/or decoded the associated sidelink data transmission. In the example, the transmitting device may determine, based upon the second feedback information indicative of positive acknowledgement and/or ACK, that the receiving device receives and/or decodes the associated sidelink data transmission and/or that the receiving device has successfully received and/or decoded the associated sidelink data transmission. Performing the first feedback transmission means that the sidelink data transmission(s) on sidelink data resource(s) scheduled by the network node is received by the receiving device successfully and/or means that the transmitting device does not need sidelink data resources for performing sidelink data retransmission. For example, the transmitting device performing the first feedback transmission may indicate that the sidelink data transmission(s) on the sidelink data resource(s) scheduled by the network node is successfully received by the receiving device and/or may indicate that the transmitting device does not need sidelink data resources for performing sidelink data retransmission. In the example, the network node may determine, based upon the transmitting device performing the first feedback transmission, that the sidelink data transmission(s) on the sidelink data resource(s) scheduled by the network node is successfully received by the receiving device and/or that the transmitting device does not need sidelink data resources for performing sidelink data retransmission.

In a fifth example, if the transmitting device receives the second feedback information as non-positive acknowledgement and/or NACK, the transmitting device may not perform a first feedback transmission to the network node. For example, the second feedback information may be indicative of non-positive acknowledgement and/or NACK. In the example, responsive to receiving the second feedback information indicative of non-positive acknowledgement and/or NACK, the transmitting device may not perform the first feedback transmission to the network node. Not performing the first feedback transmission means the first feedback information as non-positive acknowledgement and/or NACK. For example, the transmitting device not performing the first feedback transmission to the network node may be indicative of non-positive acknowledgement and/or NACK. The second feedback information as non-positive acknowledgement and/or NACK means that the receiving device does not decode the associated sidelink data transmission successfully. For example, the second feedback information being indicative of non-positive acknowledgement and/or NACK may indicate that the receiving device does not successfully decode and/or has not successfully decoded the associated sidelink data transmission. In the example, the transmitting device may determine, based upon the second feedback information indicative of non-positive acknowledgement and/or NACK, that the receiving device does not successfully decode and/or has not successfully decoded the associated sidelink data transmission. Not performing the first feedback transmission means that the sidelink data transmission(s) on sidelink data resource(s) scheduled by the network node is not received by the receiving device successfully and/or means that the transmitting device needs sidelink data resources for performing sidelink data retransmission. For example, the transmitting device not performing the first feedback transmission may indicate that the sidelink data transmission(s) on the sidelink data resource(s) scheduled by the network node is not successfully received by the receiving device and/or may indicate that the transmitting device needs sidelink data resources for performing sidelink data retransmission. In the example, the network node may determine, based upon the transmitting device not performing the first feedback transmission (and/or based upon not receiving the first feedback transmission from the transmitting device), that the sidelink data transmission(s) on the sidelink data resource(s) scheduled by the network node is not successfully received by the receiving device and/or that the transmitting device needs sidelink data resources for performing sidelink data retransmission.

In a sixth example, if the transmitting device does not receive the second feedback information and/or considers the second feedback information as DTX, the transmitting device may not perform a first feedback transmission to the network node. For example, the second feedback information may not be received by the transmitting device. Alternatively and/or additionally, the transmitting device may consider and/or determine that the second feedback information corresponds to DTX. In the example, the transmitting device may not transmit the first feedback information responsive to not receiving the second feedback information and/or responsive to considering that the second feedback information corresponds to DTX. Not performing the first feedback transmission means the first feedback information as DTX. For example, the transmitting device not transmitting the first feedback information may be indicative of DTX. Not receiving the second feedback information means that the receiving device does not receive a sidelink control information which schedules the associated sidelink data transmission and does not receive the associated sidelink data transmission. For example, the second feedback information not being received by the transmitting device may indicate that the receiving device does not receive and/or has not received the sidelink control information for scheduling the associated sidelink data transmission. Alternatively and/or additionally, the second feedback information not being received by the transmitting device may indicate that that the receiving device does not receive and/or has not received the associated sidelink data transmission. In the example, the transmitting device may determine, based upon the transmitting device not receiving the second feedback information, that the receiving device does not receive and/or has not received the sidelink control information for scheduling the associated sidelink data transmission and/or that the receiving device does not receive and/or has not received the associated sidelink data transmission. The second feedback information as DTX means that the receiving device does not receive a sidelink control information which schedules the associated sidelink data transmission and does not receive the associated sidelink data transmission. For example, the second feedback information corresponding to DTX may indicate that the receiving device does not receive and/or has not received the sidelink control information for scheduling the associated sidelink data transmission. Alternatively and/or additionally, the second feedback information corresponding to DTX may indicate that the receiving device does not receive and/or has not received the associated sidelink data transmission. In the example, the transmitting device may determine, based upon determining and/or considering that the second feedback information corresponds to DTX, that the receiving device does not receive and/or has not received the sidelink control information for scheduling the associated sidelink data transmission and/or that the receiving device does not receive and/or has not received the associated sidelink data transmission. Not performing the first feedback transmission means that the sidelink data transmission(s) on sidelink data resource(s) scheduled by the network node is not received by the receiving device successfully and/or means that the transmitting device needs sidelink data resources for performing sidelink data retransmission. For example, the transmitting device not performing the first feedback transmission may indicate that the sidelink data transmission(s) on the sidelink data resource(s) scheduled by the network node is not successfully received by the receiving device and/or may indicate that the transmitting device needs sidelink data resources for performing sidelink data retransmission. In the example, the network node may determine, based upon the transmitting device not performing the first feedback transmission (and/or based upon not receiving the first feedback transmission from the transmitting device), that the sidelink data transmission(s) on the sidelink data resource(s) scheduled by the network node is not successfully received by the receiving device and/or that the transmitting device needs sidelink data resources for performing sidelink data retransmission.

In one embodiment, a transmitting device receives a sidelink grant from network node. The sidelink grant allocates/schedules sidelink data resource(s) for sidelink data transmission(s). In one embodiment, the sidelink grant corresponds to a downlink control information for allocating/scheduling sidelink data resource(s). The transmitting devices may perform sidelink data transmission(s) on the sidelink data resource(s) to a receiving device. In one embodiment, the transmitting device may also transmit sidelink control information(s), which allocates/schedules the sidelink data resource(s). In one embodiment, the sidelink data transmission is performed in network scheduling mode (e.g., mode 1). In one embodiment, the transmitting device is configured with network scheduling mode for performing sidelink data transmission.

After performing the sidelink data transmission(s), the transmitting device may receive a second feedback information associated with the sidelink data transmission(s). The second feedback information is transmitted by a receiving device which receives/decodes the sidelink data transmission(s). In one embodiment, the transmitting device receives the second feedback information via sidelink feedback transmission in PC5 interface. Alternatively and/or additionally, the receiving device transmits/delivers the second feedback information to the transmitting device via the sidelink feedback transmission in PC5 interface. In one embodiment, the receiving device transmits/delivers the second feedback information as positive acknowledgement and/or ACK if the receiving device receives/decodes the sidelink data transmission(s) successfully. For example, the receiving device may transmit and/or deliver the second feedback information indicative of positive acknowledgement and/or ACK responsive to successfully receiving and/or decoding the sidelink data transmission(s). In one embodiment, the receiving device transmits/delivers the second feedback information as non-positive acknowledgement and/or NACK if the receiving device does not receive/decode the sidelink data transmission(s) successfully. For example, the receiving device may transmit and/or deliver the second feedback information indicative of non-positive acknowledgement and/or NACK responsive to the receiving device not successfully receiving and/or decoding the sidelink data transmission(s).

In one embodiment, the sidelink resource of the sidelink feedback transmission is associated with the sidelink data resource(s). In one embodiment, the sidelink resource of the sidelink feedback transmission is derived based on the sidelink data resource(s). In one embodiment, the sidelink resource of the sidelink feedback transmission is associated with a sidelink resource of sidelink control transmission carrying/delivering the sidelink control information. In one embodiment, the sidelink resource of the sidelink feedback transmission is derived based on a sidelink resource of sidelink control transmission carrying/delivering the sidelink control information. In one embodiment, the sidelink resource of the sidelink feedback transmission is indicated by the sidelink control information.

In one embodiment, the sidelink feedback transmission may correspond to a sidelink control transmission from the receiving device to the transmitting device. In one embodiment, the sidelink feedback transmission may correspond to a sidelink data transmission from the receiving device to the transmitting device.

Responsive to and/or upon receiving the second feedback information, the transmitting device may transmit a first feedback information to network node. The first feedback information is set based on a second feedback information using one or more of the techniques presented herein. In one embodiment, the transmitting device transmits/delivers the first feedback information to the network node via an uplink control/data transmission in Uu interface. The first feedback information may be set based on the second feedback information in accordance with the examples described herein corresponding to possible relationships associated with the first feedback information and the second feedback information.

In one embodiment, the uplink resource of the uplink control/data transmission is associated with a downlink resource of a downlink control transmission carrying/delivering the sidelink grant and/or the downlink control information for allocating/scheduling the sidelink data resource(s). In one embodiment, the uplink resource of the uplink control/data transmission is derived based on a downlink resource of a downlink control transmission carrying/delivering the sidelink grant and/or the downlink control information for allocating/scheduling the sidelink data resource(s). In one embodiment, the uplink resource index of the uplink control/data transmission is derived based on a downlink resource index of a downlink control transmission carrying/delivering the sidelink grant and/or the downlink control information for allocating/scheduling the sidelink data resource(s). In one embodiment, the uplink resource of the uplink control/data transmission is indicated by the sidelink grant and/or the downlink control information for allocating/scheduling the sidelink data resource(s). In one embodiment, the uplink resource of the uplink control/data transmission (and/or a frequency resource associated with the uplink resource) is associated with the last resource of the allocated/scheduled the sidelink data resource(s). In one embodiment, the uplink resource index of the uplink control/data transmission is associated with the sidelink resource index of the last resource of the allocated/scheduled the sidelink data resource(s). In one embodiment, the uplink resource index of the uplink control/data transmission is associated with the sidelink resource index of the last sidelink control transmission carrying/delivering the sidelink control information. In one embodiment, the uplink resource of the uplink control/data transmission (and/or a time-domain resource associated with the uplink resource) is associated with the last resource of the allocated/scheduled the sidelink data resource(s). In one embodiment, the uplink resource of the uplink control/data transmission (and/or the time-domain resource associated with the uplink resource) is derived based on the last resource of the allocated/scheduled the sidelink data resource(s). In one embodiment, the uplink resource of the uplink control/data transmission (and/or the time-domain resource associated with the uplink resource) is associated with the resource of last sidelink control transmission carrying/delivering the sidelink control information. In one embodiment, the uplink resource of the uplink control/data transmission (and/or the time-domain resource associated with the uplink resource) is derived based on the resource of last sidelink control transmission carrying/delivering the sidelink control information.

In one embodiment, the association between the uplink resource and the sidelink data resource (and/or the association between the time-domain resource, associated with the uplink resource, and the sidelink data resource) may correspond to a fixed, configured and/or specified TTI difference between the uplink resource and the sidelink data resource (and/or a fixed, configured and/or specified TTI difference between the time-domain resource, associated with the uplink resource, and the sidelink data resource). In one embodiment, the association between the uplink resource and the sidelink control transmission (and/or the association between the time-domain resource, associated with the uplink resource, and the sidelink control transmission) may correspond to a fixed, configured and/or specified TTI difference between the uplink resource and the sidelink control transmission (and/or a fixed, configured and/or specified TTI difference between the time-domain resource, associated with the uplink resource, and the sidelink control transmission). In one embodiment, the association between the uplink resource and the downlink control transmission (and/or the association between the time-domain resource, associated with the uplink resource, and the downlink control transmission) may correspond to a fixed, configured and/or specified TTI difference between the uplink resource and the downlink control transmission (and/or a fixed, configured and/or specified TTI difference between the time-domain resource, associated with the uplink resource, and the downlink control transmission).

In one embodiment, the association between the uplink resource and the sidelink data resource may correspond to a fixed, configured and/or specified frequency resource (index) difference, in unit of frequency resource unit, between the uplink resource and the sidelink data resource. In one embodiment, the association between the uplink resource and the sidelink control transmission may correspond to a fixed, configured and/or specified frequency resource (index) difference, in unit of frequency resource unit, between the uplink resource and the sidelink control transmission. In one embodiment, the association between the uplink resource and the downlink control transmission may correspond to a fixed, configured and/or specified frequency resource (index) difference, in unit of frequency resource unit, between the uplink resource and the downlink control transmission.

In one embodiment, the association between the uplink resource and the sidelink data resource may correspond to a fixed, configured and/or specified resource (index) difference between the uplink resource and the sidelink data resource. In one embodiment, the association between the uplink resource and the sidelink control transmission may correspond to a fixed, configured and/or specified resource (index) difference between the uplink resource and the sidelink control transmission. In one embodiment, the association between the uplink resource and the downlink control transmission may correspond to a fixed, configured and/or specified resource (index) difference between the uplink resource and the downlink control transmission.

In one embodiment, the uplink control/data transmission may be transmitted on physical uplink control channel (PUCCH). In one embodiment, the uplink control/data transmission may be transmitted as a PUCCH format for HARQ feedback. In one embodiment, the uplink control/data transmission may be transmitted on physical uplink shared channel (PUSCH) and/or multiplexed with PUSCH.

Upon reception/detection of the first feedback information, the network node can determine the utilized situation of the scheduled sidelink data resource(s). If the network detects that the sidelink data transmission(s) on the sidelink data resource(s) scheduled by the network node is not received by the receiving device successfully, the network node may transmit another sidelink grant and/or another downlink control information for allocating/scheduling another sidelink data resource(s) to the transmitting device. In one embodiment, the transmitting device may perform sidelink data retransmission(s) on the another sidelink data resource(s) to the receiving device. In one embodiment, the sidelink data transmission(s) and sidelink data retransmission(s) carry/deliver/include the same data packet. In one embodiment, the sidelink data resource(s) and the another sidelink data resource(s) are with the same size of frequency resources Method B-2

The concept of Method B-2 is that a receiving device may receive a sidelink control information and/or sidelink data transmission, wherein the sidelink control information schedules the sidelink data transmission. In one embodiment, the receiving device may transmit/deliver a feedback information to network node, wherein the feedback information is associated with the sidelink data transmission. In one embodiment, the feedback information indicates whether the associated sidelink data transmission is decoded/received by the receiving device successfully or not. Alternatively and/or additionally, the receiving device transmits/delivers the feedback information to the network node via uplink control/data transmission in Uu interface.

In one embodiment, the sidelink control information may indicate whether the receiving device transmits/delivers the feedback information to network node or not. In one embodiment, the sidelink control information may indicate the receiving device transmits/delivers the feedback information to network node and/or to a transmitting device. In one embodiment, the sidelink control information may indicate the receiving device transmits/delivers the feedback information to network node via an uplink control/data transmission in Uu interface and/or to a transmitting device via a sidelink feedback transmission in PC5 interface.

In one embodiment, the sidelink resource of the sidelink feedback transmission is associated with the sidelink data resource of the sidelink data transmission. In one embodiment, the sidelink resource of the sidelink feedback transmission is derived based on the sidelink data resource of the sidelink data transmission. In one embodiment, the sidelink resource of the sidelink feedback transmission is associated with a sidelink resource of sidelink control transmission carrying/delivering the sidelink control information. In one embodiment, the sidelink resource of the sidelink feedback transmission is derived based on a sidelink resource of sidelink control transmission carrying/delivering the sidelink control information. In one embodiment, the sidelink resource of the sidelink feedback transmission is indicated by the sidelink control information.

In one embodiment, the sidelink feedback transmission may mean a sidelink control transmission from the receiving device to the transmitting device. In one embodiment, the sidelink feedback transmission may mean a sidelink data transmission from the receiving device to the transmitting device.

In one embodiment, the uplink resource of the uplink control/data transmission is indicated by the sidelink control information. In one embodiment, the uplink resource of the uplink control/data transmission (and/or a time-domain resource associated with the uplink resource) is associated with the resource of the sidelink data transmission. In one embodiment, the uplink resource of the uplink control/data transmission (and/or a frequency resource associated with the uplink resource) is associated with the resource of the sidelink data transmission. In one embodiment, the uplink resource index of the uplink control/data transmission is associated with the sidelink resource index of the sidelink data transmission. In one embodiment, the uplink resource index of the uplink control/data transmission is associated with the sidelink resource index of the sidelink control transmission carrying/delivering the sidelink control information. In one embodiment, the uplink resource of the uplink control/data transmission (and/or the time-domain resource associated with the uplink resource) is derived based on the resource of the sidelink data transmission. In one embodiment, the uplink resource of the uplink control/data transmission (and/or the time-domain resource associated with the uplink resource) is associated with sidelink control transmission carrying/delivering the sidelink control information. In one embodiment, the uplink resource of the uplink control/data transmission (and/or the time-domain resource associated with the uplink resource) is derived based on the resource of sidelink control transmission carrying/delivering the sidelink control information. In one embodiment, if there are more than one sidelink data transmissions for the same data packet, the receiving device may transmit/deliver the feedback information to network node via uplink control/data transmission, wherein the uplink resource of the uplink control/data transmission is associated with the last sidelink data transmission of the more than one sidelink data transmissions. In one embodiment, if there are more than one sidelink data transmissions for the same data packet, the receiving device may transmit/deliver the feedback information to network node via uplink control/data transmission, wherein the uplink resource of the uplink control/data transmission is associated with the resource of the last sidelink control transmission carrying/delivering the last sidelink control information, which schedules the last sidelink data transmission of the more than one sidelink data transmissions.

In one embodiment, the association between the uplink resource and the sidelink data resource (and/or the association between the time-domain resource, associated with the uplink resource, and the sidelink data resource) may correspond to a fixed and/or configured TTI difference between the uplink resource and the sidelink data resource (and/or a fixed and/or configured TTI difference between the time-domain resource, associated with the uplink resource, and the sidelink data resource). In one embodiment, the association between the uplink resource and the sidelink control transmission (and/or the association between the time-domain resource, associated with the uplink resource, and the sidelink control transmission) may correspond to a fixed and/or configured TTI difference between the uplink resource and the sidelink control transmission (and/or a fixed and/or configured TTI difference between the time-domain resource, associated with the uplink resource, and the sidelink control transmission). In one embodiment, the association between the uplink resource and the downlink control transmission (and/or the association between the time-domain resource, associated with the uplink resource, and the downlink control transmission) may correspond to a fixed and/or configured TTI difference between the uplink resource and the downlink control transmission (and/or a fixed and/or configured TTI difference between the time-domain resource, associated with the uplink resource, and the downlink control transmission).

In one embodiment, the uplink control/data transmission may be transmitted on PUCCH. In one embodiment, the uplink control/data transmission may be transmitted as a PUCCH format for HARQ feedback. In one embodiment, the uplink control/data transmission may be transmitted on PUSCH and/or multiplexed with PUSCH.

Method C

In NR, a Buffer Status Report (BSR) is used to reflect a buffer size of new data available for transmission. The different logical channels will be configured with different logical channel groups (LCGs). When a BSR is going to be reported, a BSR Medium Access Control (MAC) Control Element (MAC CE) may include LCG(s) with corresponding buffer size information. The buffer size information indicates the total amount of new data belonging to logical channels for same LCG. Regarding NR V2X, a UE will also need to support (sidelink) BSR mechanism for assisting network's scheduling. Alternatively and/or additionally, in current NR discussion, HARQ feedback and HARQ retransmission on PC5 interface are considered for increasing reliability. For supporting dynamic HARQ retransmission, a network (e.g., one or more of a BS, a TRP, a Cell, etc.) will need more information to provide resource to a UE, because the transport block size of HARQ retransmission may not be changed and the network may not be capable of determining whether a transmission on device-to-device interface is successful. For providing the network enough information to provide resources to a UE, we propose some possible designs.

Method C-1: Reporting Buffer Size of Retransmission

One possible design of a report (e.g., a BSR) includes a buffer size field for reporting data amount for sidelink data retransmission. In one embodiment, the buffer size field indicates a buffer size associated with a HARQ process. For instance, a buffer size is associated with a HARQ process. In one embodiment, the buffer size is included in a (sidelink) BSR MAC CE if the corresponding HARQ process is associated with performing sidelink data retransmission. In some examples, if the UE (and/or the logical channel/radio bearer) is configured to perform sidelink data communication based on HARQ feedback mechanism, the HARQ process performs sidelink data retransmission if a NACK associated with HARQ feedback is received and/or if HARQ feedback is not received.

Figure 13:
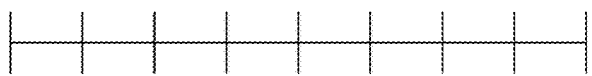
FIG. 13 illustrates an exemplary embodiment of a report.

FIG. 13 illustrates an exemplary embodiment 1300 of the report (e.g., one or more of a BSR, a BSR MAC CE, a MAC subheader, etc.). In the exemplary embodiment 1300, the report comprises buffer size field(s) associated with (sidelink) HARQ process(es). A buffer size is indicative of resource demand for sidelink data retransmission (e.g., a network may determine resource demand for sidelink data retransmission based upon the buffer size field(s) comprising one or more buffer sizes). In one embodiment, a buffer size field is included in the report if the buffer size field is a non-zero value. Alternatively and/or additionally, the buffer size field is included in the report if the buffer size field is a non-zero value and/or if the buffer size field is zero. Alternatively and/or additionally, if HARQ process ID information is not required by the network and/or is not used by the network, the HARQ process ID field may not be included in the report. Alternatively and/or additionally, a priority for transport block in each HARQ process may be provided to the network for assisting scheduling. The priority may be provided in the report with a buffer size and/or a transport block size of each HARQ process. In one embodiment, the priority may replace the HARQ process ID field in the report if the HARQ process ID is not necessary (e.g., if the HARQ process ID is not required by the network and/or is not used by the network).

In one embodiment, the buffer size for sidelink data retransmission is reported in LCG. In some examples, the network may allocate LCG(s) for the UE reporting sidelink data retransmission buffer size. The network may provide a configuration for associating a LCG with sidelink data retransmission. Alternatively and/or additionally, a special LCG for sidelink BSR may be defined for reporting sidelink data retransmission.

Figure 14:
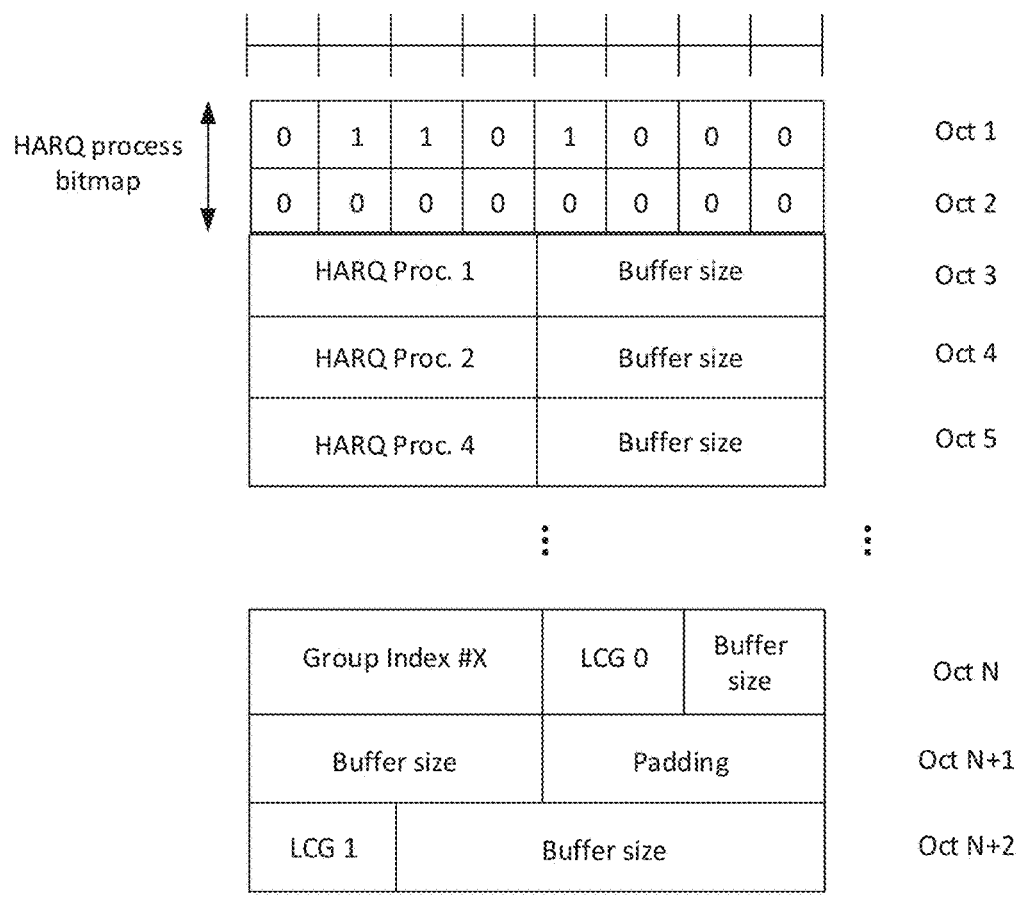
FIG. 14 illustrates an exemplary embodiment of a report.

The network may be required to determine whether the buffer size(s) for sidelink data retransmission are presented. In some examples, the network may determine whether the buffer size(s) for sidelink data retransmission are presented by including a field in (sidelink) BSR MAC CE and/or MAC subheader for indicating whether buffer size(s) for sidelink data retransmission are presented. For example, the network may determine whether the buffer size(s) for sidelink data retransmission are presented based upon the field indicative of whether buffer size(s) for sidelink data retransmission are presented. FIG. 14 illustrates an exemplary embodiment 1400 of the report (e.g., one or more of a BSR, a BSR MAC CE, a MAC subheader, etc.). In the exemplary embodiment 1400, a bitmap is included in the report such that the network may determine a quantity of buffer size fields for sidelink data retransmission are included in the BSR. The process number may be assumed to be from 0 to 15. In some examples, if HARQ process ID information is not required by the network and/or is not used by the network, the HARQ process ID field may not be included in the report.

In some examples, a MAC CE may include one or more fields of the report (e.g., the BSR) as described herein (e.g., one or more fields of the exemplary embodiment 1300 of the report and/or the exemplary embodiment 1400 of the report may be included in the MAC CE). In some examples, the MAC CE may use different Logical Channel IDs compared with (sidelink) BSR. The MAC CE may be used for reporting sidelink data retransmission requirements and/or needs to the network (similarly to the report).

In one embodiment, a buffer size may be replaced with a transport block size (e.g., the transport block size may be included in the report in addition to and/or in place of the buffer size). Alternatively and/or additionally, the buffer size may be replaced with an amount of radio resources (e.g., the amount of radio resources may be included in the report in addition to and/or in place of the buffer size). Alternatively and/or additionally, the buffer size may be replaced with a grant size (e.g., the grant size may be included in the report in addition to and/or in place of the buffer size).

Method C-2: Indicating Whether a Sidelink Grant Transmission is Successful

Figure 15:
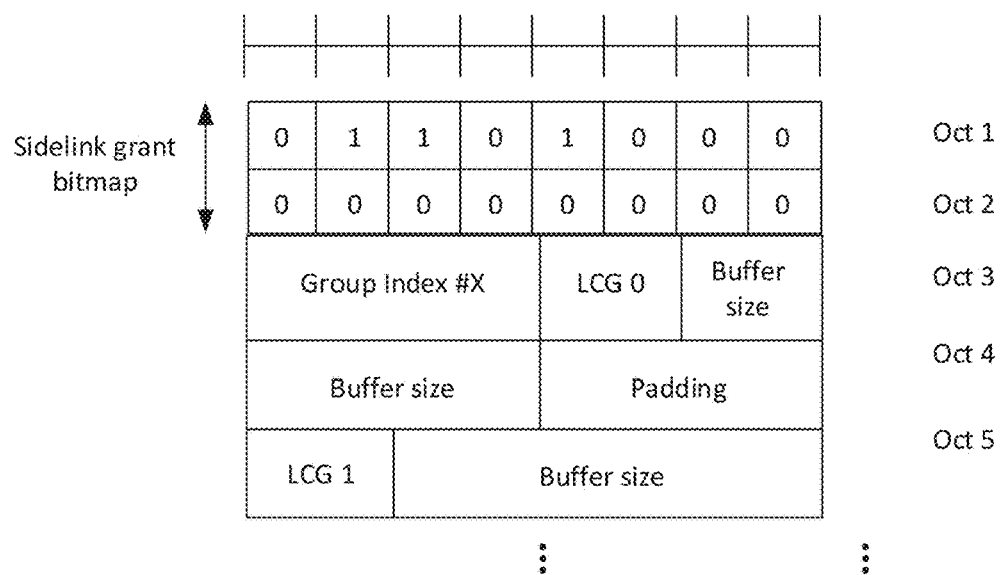
FIG. 15 illustrates an exemplary embodiment of a report.

In one embodiment, the device indicates whether one or more received sidelink grants are required for performing sidelink data retransmission. In one embodiment, a field may be included in a report (e.g., a BSR, a (sidelink) BSR MAC CE and/or a MAC subheader) for indicating whether one or more sidelink data transmission(s) are successful. FIG. 15 illustrates an exemplary embodiment 1500 of the report (e.g., one or more of a BSR, a BSR MAC CE, a MAC subheader, etc.). In some examples, the report may comprise a sidelink grant bitmap indicative of previous allocated sidelink grant(s) associated with required sidelink data retransmission. In one embodiment, the sidelink grant bitmap indicates sidelink data retransmission demand of sidelink grant(s) based on receiving order within a fixed period.

In some examples, a MAC CE may include one or more fields of the report (e.g., the BSR) as described herein (e.g., one or more fields of the exemplary embodiment 1500 of the report may be included in the MAC CE). In some examples, the MAC CE may use different Logical Channel IDs compared with (sidelink) BSR.

In one embodiment, a number of bits may be included in uplink control transmission for indicating whether one or more sidelink data transmission(s) are successful. The number of bits may be a sidelink grant bitmap to indicate previous allocated sidelink grant(s) associated with required sidelink data retransmission. In one embodiment, the sidelink grant bitmap indicates sidelink data retransmission demand of sidelink grant(s) based on receiving order within a fixed period. The uplink control transmission may be transmitted in PUCCH. The uplink control transmission may be a scheduling request (SR).

Method C-3: Indicating Whether a Sidelink Process Needs Retransmission

In one embodiment, the device may indicate whether transmission is successful per process (e.g., the device may indicate whether transmission is successful for each sidelink HARQ process). If a sidelink grant is addressed to a specific sidelink HARQ process, the device may assist the network in determining information for scheduling retransmission. For example, if a BS schedules a sidelink HARQ process 1 of a device and the transmission of the sidelink HARQ process 1 is failed (e.g., a NACK is received), the device may report that (merely) HARQ process 1 is non-empty/transmission failure. The BS may determine a size of resource based on the previous sidelink grant. A MAC CE and/or a physical layer signaling to BS may include information indicative of whether a HARQ process needs retransmission (e.g., bitmap).

Further embodiments are described for the techniques, examples and alternatives described above.

In one embodiment, the TTI may correspond to one or more slots. In one embodiment, the TTI may correspond to one or more mini-slots. In one embodiment, the TTI may correspond to one or more subframes. In one embodiment, the TTI may correspond to one or more symbols. In one embodiment, the TTI may correspond to a set of symbols. In one embodiment, the TTI may correspond to one or more mini-seconds.

In one embodiment, the frequency resource unit of the sidelink data/control/feedback resource may be a subchannel. In one embodiment, the frequency resource unit of the sidelink data/control/feedback resource may be a (physical) resource element. In one embodiment, the frequency resource unit of the sidelink data/control/feedback resource may be a (physical) resource block. In one embodiment, the frequency resource unit of the sidelink data/control/feedback resource may be a set of (physical) resource blocks.

In one embodiment, the sidelink resource index of a sidelink data resource may correspond to a subchannel index. In one embodiment, the sidelink resource index of a sidelink data resource may correspond to the index of the lowest subchannel comprised in the sidelink data resource.

In one embodiment, the sidelink resource index of a sidelink data resource may correspond to a resource block index. In one embodiment, the sidelink resource index of a sidelink data resource may correspond to the index of the lowest resource block comprised in the sidelink data resource.

In one embodiment, the sidelink resource index of a sidelink control resource may correspond to a subchannel index. In one embodiment, the sidelink resource index of a sidelink control resource may correspond to the index of the lowest subchannel comprised in the sidelink control resource. In one embodiment, the sidelink resource index of a sidelink control resource may correspond to the index of the subchannel comprising the sidelink control resource.

In one embodiment, the sidelink resource index of a sidelink control resource may correspond to a resource block index. In one embodiment, the sidelink resource index of a sidelink control resource may correspond to the index of the lowest resource block comprised in the sidelink control resource. In one embodiment, the sidelink resource index of a sidelink control resource may correspond to the index of the resource block comprising the sidelink control resource.

In one embodiment, the sidelink resource index of a sidelink feedback transmission may correspond to a subchannel index. In one embodiment, the sidelink resource index of a sidelink feedback transmission may correspond to the index of the lowest subchannel comprised in the sidelink feedback transmission. In one embodiment, the sidelink resource index of a sidelink feedback transmission may correspond to the index of the subchannel comprising the sidelink feedback transmission. In one embodiment, the sidelink resource index of a sidelink feedback transmission may correspond to resource block index. In one embodiment, the sidelink resource index of a sidelink feedback transmission may correspond to the index of the lowest resource block comprised in the sidelink feedback transmission. In one embodiment, the sidelink resource index of a sidelink feedback transmission may correspond to the index of the resource block comprising the sidelink feedback transmission.

In one embodiment, the downlink resource index of a downlink control transmission may correspond to a CCE index. In one embodiment, the downlink resource index of a downlink control transmission may correspond to the index of the lowest CCE comprised in the sidelink control resource. In one embodiment, the downlink resource index of a downlink control transmission may correspond to the index of the (lowest) resource block comprised in the downlink control transmission. In one embodiment, the downlink resource index of a downlink control transmission may correspond to a resource block index.

In one embodiment, the uplink resource index of an uplink control transmission may correspond to a PUCCH resource index. In one embodiment, the uplink resource index of an uplink control transmission may correspond to the index of the (lowest) resource block comprised in the uplink control transmission. In one embodiment, the uplink resource index of an uplink control transmission may correspond to a resource block index. In one embodiment, the uplink resource index of an uplink data transmission may correspond to the index of the (lowest) resource block comprised in the uplink control transmission. In one embodiment, the uplink resource index of an uplink data transmission may correspond to resource block index.

In one embodiment, successful reception/decoding of the sidelink data transmission may mean that the CRC check of the sidelink data transmission is passed. For example, successful reception/decoding of the sidelink data transmission may correspond to the CRC check of the sidelink data transmission passing.

In one embodiment, non-successful reception/decoding of the sidelink data transmission may mean that the CRC check of the sidelink data transmission is not passed. For example, non-successful reception/decoding of the sidelink data transmission may correspond to the CRC check of the sidelink data transmission not passing.

In one embodiment, the data packet may correspond to a MAC Protocol Data Unit (PDU). In one embodiment, the data packet may be delivered on SL-SCH. In one embodiment, the data packet may be delivered neither on downlink shared channel (DL-SCH) nor on uplink shared channel (UL-SCH). In one embodiment, the data packet may be transmitted on PSSCH. In one embodiment, the data packet may be transmitted neither on physical downlink shared channel (PDSCH) nor on PUSCH.

In one embodiment, the sidelink feedback transmission may correspond to PSCCH, PSSCH and/or Physical Sidelink Feedback Channel (PSFCH).

In one embodiment, the sidelink data transmission may correspond to PSSCH.

In one embodiment, the sidelink control information may correspond to neither downlink control information nor uplink control information. In one embodiment, the sidelink control information may be transmitted/delivered on PSCCH. In one embodiment, the sidelink control information may be transmitted/delivered neither on PDCCH nor on PUCCH. In one embodiment, the sidelink control transmission may correspond to PSCCH. In one embodiment, the sidelink control transmission may be transmitted neither on PDCCH nor on PUCCH.

In one embodiment, the sensing procedure may comprise the transmitting device receiving a transmission, and the transmitting device excluding the (time and frequency) candidate resources associated with the (received) transmission.

In one embodiment, the (excluded) candidate resources associated with the (received) transmission may mean that the candidate resources are expected to be utilized by a device which transmits the received transmission. For example, the transmitting device may exclude the (excluded) candidate resources based upon a determination that the candidate resources are utilized by a device which transmits the (received) transmission.

In one embodiment, the sensing procedure may comprise the transmitting device performs energy sensing to derive metrics for candidate resources. In one embodiment, the transmitting device may exclude candidate resources with larger metrics. In one embodiment, the transmitting device may select the candidate resources with smaller metrics as valid candidate resources. For example, valid candidate resources may be associated with metrics that are smaller than metrics associated with excluded candidate resources. In one embodiment, the candidate resources with larger metrics may correspond to candidate resources with metrics larger than metrics of a proportion and/or a percentage of total candidate resources. In one embodiment, the candidate resources with smaller metrics may correspond to candidate resources with metrics smaller than metrics of a proportion and/or a percentage of total candidate resources.

In one embodiment, the energy sensing may correspond to the transmitting device performing Received Signal Strength Indicator (RSSI) measurement.

In one embodiment, the metric corresponds to an RSSI.

In one embodiment, the metric corresponds to a linear average of measured RSSIs.

In one embodiment, the metric for a candidate resource corresponds to a linear average of RSSIs measured from associated resources of the candidate resource.

In one embodiment, the sidelink (control/data/feedback) transmission/reception may be a device-to-device transmission/reception. In one embodiment, the sidelink (control/data/feedback) transmission/reception may be a V2X transmission/reception. In one embodiment, the sidelink (control/data/feedback) transmission/reception may be a P2X transmission/reception. In one embodiment, the sidelink (control/data/feedback) transmission/reception may be on PC5 interface.

In one embodiment, the PC5 interface may be a wireless interface for communication between device and device. In one embodiment, the PC5 interface may be a wireless interface for communication between devices. In one embodiment, the PC5 interface may be a wireless interface for communication between UEs. In one embodiment, the PC5 interface may be a wireless interface for V2X communication and/or P2X communication.

In one embodiment, the Uu interface may be a wireless interface for communication between network node and device. In one embodiment, the Uu interface may be a wireless interface for communication between network node and UE.

In one embodiment, the transmitting/receiving device may be a UE. In one embodiment, the transmitting/receiving device may be a vehicle UE. In one embodiment, the transmitting/receiving device may be a V2X UE.

In one embodiment, the network node may be a base station. In one embodiment, the network node may be a network node type Road-Side Unit (RSU). In one embodiment, the network node may be a gNB.

Figure 16:
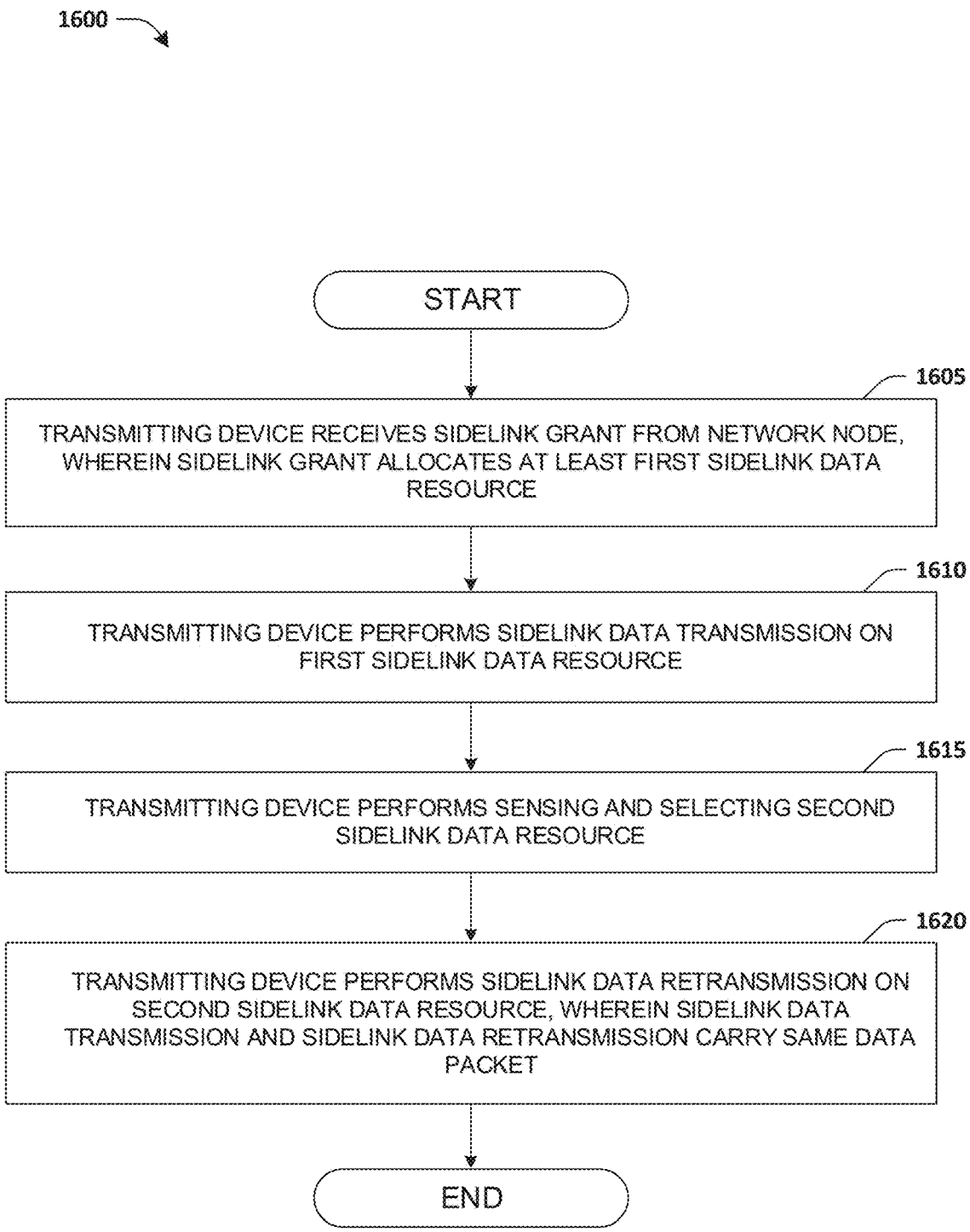
FIG. 16 is a flow chart according to one exemplary embodiment.

FIG. 16 is a flow chart 1600 according to one exemplary embodiment from the perspective of a transmitting device. In step 1605, the transmitting device receives a sidelink grant from a network node, wherein the sidelink grant allocates at least a first sidelink data resource. In step 1610, the transmitting device performs a sidelink data transmission on the first sidelink data resource. In step 1615, the transmitting device performs sensing and selecting a second sidelink data resource. In step 1620, the transmitting device performs a sidelink data retransmission on the second sidelink data resource, wherein the sidelink data transmission and the sidelink data retransmission carry the same data packet.

In one embodiment, the transmitting device receives a non-positive acknowledgement associated with the sidelink data transmission.

In one embodiment, the transmitting device is configured in network scheduling mode (e.g., NR V2X mode 1).

In one embodiment, the transmitting device is configured in network scheduling mode (e.g., NR V2X mode 1), when performing the sidelink data retransmission.

In one embodiment, the sidelink data transmission corresponds to network scheduling mode (e.g., NR V2X mode 1).

In one embodiment, the sidelink data retransmission corresponds to device selecting mode (e.g., NR V2X mode 2).

In one embodiment, the sidelink data transmission and the sidelink data transmission are performed in different data resource pools.

In one embodiment, the sidelink data transmission and the sidelink data transmission are performed in the same data resource pool.

In one embodiment, the transmitting device transmits a first sidelink control information, wherein the first sidelink control information allocates the first sidelink data resource and/or a partial and/or full identity of the transmitting device.

In one embodiment, the transmitting device transmits a second sidelink control information, wherein the second sidelink control information allocates the second sidelink data resource and/or a partial and/or full identity of the transmitting device.

Referring back to FIGS. 3 and 4, in one exemplary embodiment of a transmitting device, the device 300 includes a program code 312 stored in the memory 310. The CPU 308 could execute program code 312 to enable the transmitting device (i) to receive a sidelink grant from a network node, wherein the sidelink grant allocates at least a first sidelink data resource, (ii) to perform a sidelink data transmission on the first sidelink data resource, (iii) to perform sensing and selecting a second sidelink data resource, and (iv) to perform a sidelink data retransmission on the second sidelink data resource, wherein the sidelink data transmission and the sidelink data retransmission carry the same data packet. Furthermore, the CPU 308 can execute the program code 312 to perform one, some and/or all of the above-described actions and steps and/or others described herein.

Figure 17:
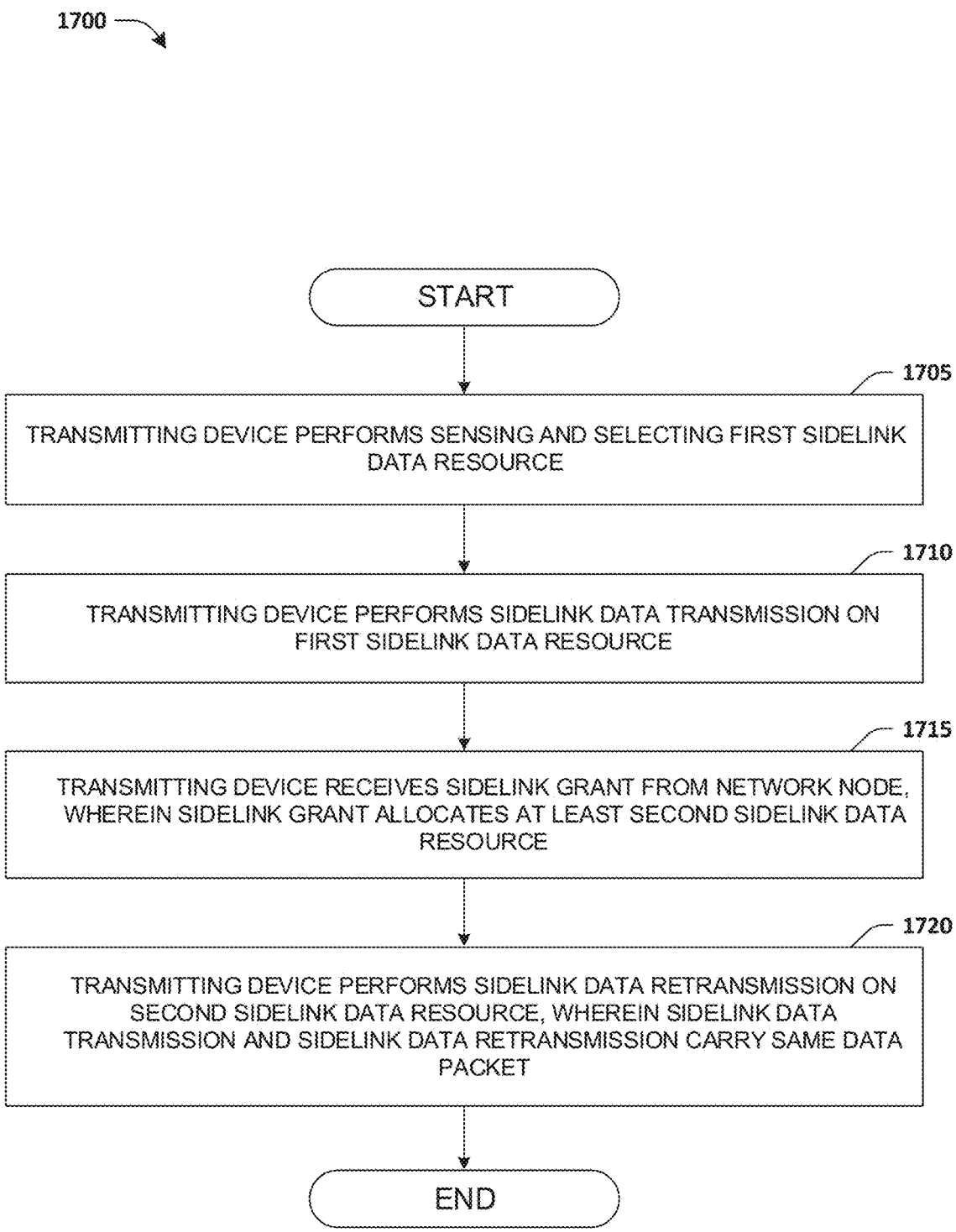
FIG. 17 is a flow chart according to one exemplary embodiment.

FIG. 17 is a flow chart 1700 according to one exemplary embodiment from the perspective of a transmitting device. In step 1705, the transmitting device performs sensing and selecting a first sidelink data resource. In step 1710, the transmitting device performs a sidelink data transmission on the first sidelink data resource. In step 1715, the transmitting device receives a sidelink grant from a network node, wherein the sidelink grant allocates at least a second sidelink data resource. In step 1720, the transmitting device performs a sidelink data retransmission on the second sidelink data resource, wherein the sidelink data transmission and the sidelink data retransmission carry the same data packet.

In one embodiment, the transmitting device receives a non-positive acknowledgement associated with the sidelink data transmission.

In one embodiment, the transmitting device is configured in device selecting mode (e.g., NR V2X mode 2).

In one embodiment, the transmitting device is configured in device selecting mode (e.g., NR V2X mode 2), when performing the sidelink data retransmission.

In one embodiment, the sidelink data transmission corresponds to device selecting mode (e.g., NR V2X mode 2).

In one embodiment, the sidelink data retransmission corresponds to network scheduling mode (e.g., NR V2X mode 1).

In one embodiment, the sidelink data transmission and the sidelink data transmission are performed in different data resource pools.

In one embodiment, the sidelink data transmission and the sidelink data transmission are performed in the same data resource pool.

In one embodiment, the transmitting device transmits a first sidelink control information, wherein the first sidelink control information allocates the first sidelink data resource and/or a partial and/or full identity of the transmitting device.

In one embodiment, the transmitting device transmits a second sidelink control information, wherein the second sidelink control information allocates the second sidelink data resource and/or a partial and/or full identity of the transmitting device.

Referring back to FIGS. 3 and 4, in one exemplary embodiment of a transmitting device, the device 300 includes a program code 312 stored in the memory 310. The CPU 308 could execute program code 312 to enable the transmitting device (i) to perform sensing and selecting a first sidelink data resource, (ii) to perform a sidelink data transmission on the first sidelink data resource, (iii) to receive a sidelink grant from a network node, wherein the sidelink grant allocates at least a second sidelink data resource, and (iv) to perform a sidelink data retransmission on the second sidelink data resource, wherein the sidelink data transmission and the sidelink data retransmission carry the same data packet. Furthermore, the CPU 308 can execute the program code 312 to perform one, some and/or all of the above-described actions and steps and/or others described herein.

Figure 18:
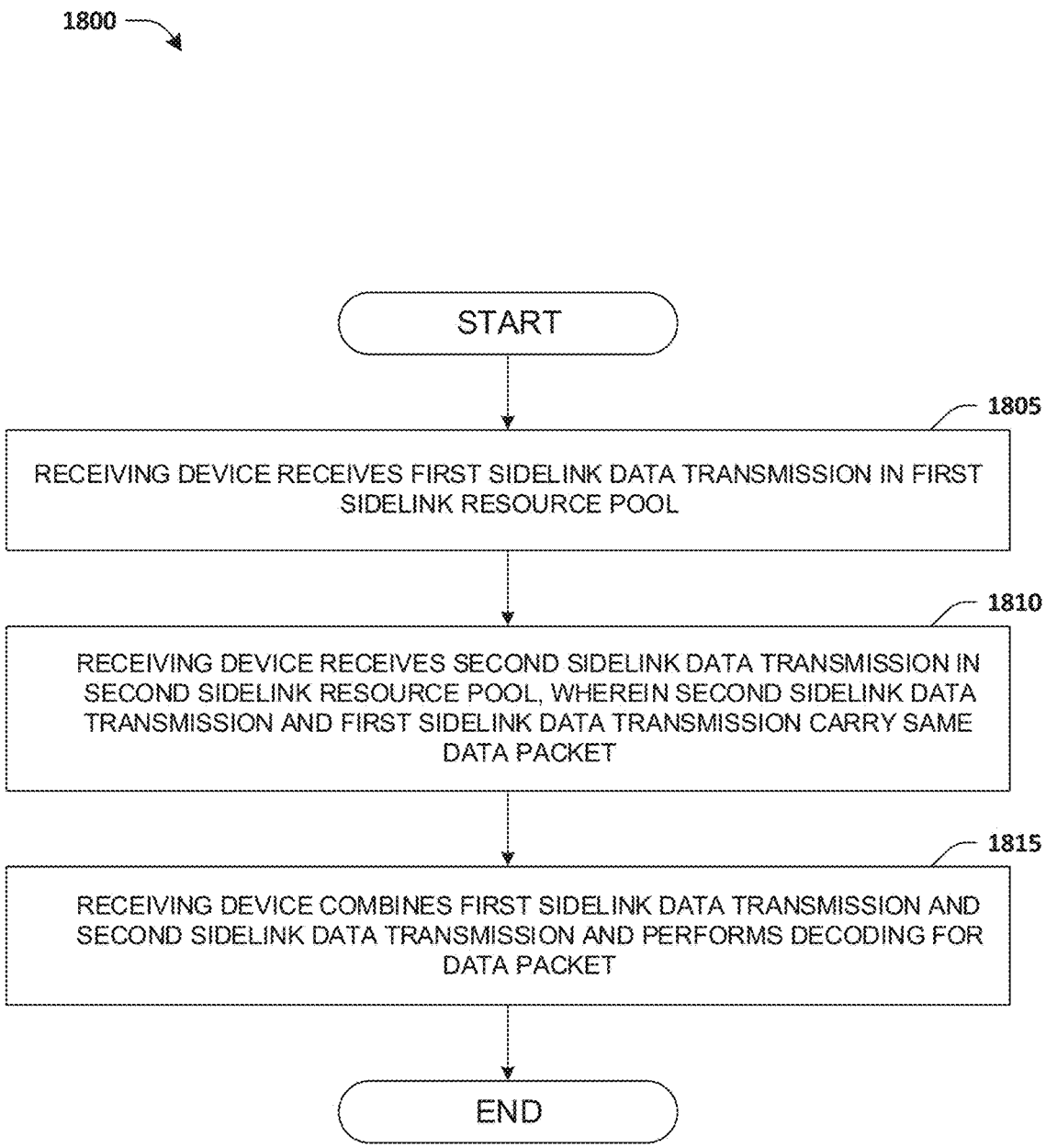
FIG. 18 is a flow chart according to one exemplary embodiment.

FIG. 18 is a flow chart 1800 according to one exemplary embodiment from the perspective of a receiving device. In step 1805, the receiving device receives a first sidelink data transmission in a first sidelink resource pool. In step 1810, the receiving device receives a second sidelink data transmission in a second sidelink resource pool, wherein the second sidelink data transmission and the first sidelink data transmission carry the same data packet. In step 1815, the receiving device combines the first sidelink data transmission and the second sidelink data transmission and performs decoding for the data packet.

In one embodiment, the first sidelink resource pool is utilized for sidelink transmission in device selecting mode (e.g., NR V2X mode 2).

In one embodiment, the second sidelink resource pool is utilized for sidelink transmission in network scheduling mode (e.g., NR V2X mode 1).

In one embodiment, the first sidelink resource pool is utilized for sidelink transmission in network scheduling mode (e.g., NR V2X mode 1).

In one embodiment, the second sidelink resource pool is utilized for sidelink transmission in device selecting mode (e.g., NR V2X mode 2).

In one embodiment, the receiving device receives a first sidelink control information, wherein the first sidelink control information schedules the first data transmission and/or a partial and/or full identity of the transmitting device.

In one embodiment, the receiving device receives a second sidelink control information, wherein the second sidelink control information schedules the second data transmission and/or a partial and/or full identity of the transmitting device.

Referring back to FIGS. 3 and 4, in one exemplary embodiment of a receiving device, the device 300 includes a program code 312 stored in the memory 310. The CPU 308 could execute program code 312 to enable the receiving device (i) to receive a first sidelink data transmission in a first sidelink resource pool, (ii) to receive a second sidelink data transmission in a second sidelink resource pool, wherein the second sidelink data transmission and the first sidelink data transmission carry the same data packet, and (iii) to combine the first sidelink data transmission and the second sidelink data transmission and performs decoding for the data packet. Furthermore, the CPU 308 can execute the program code 312 to perform one, some and/or all of the above-described actions and steps and/or others described herein.

Figure 19:
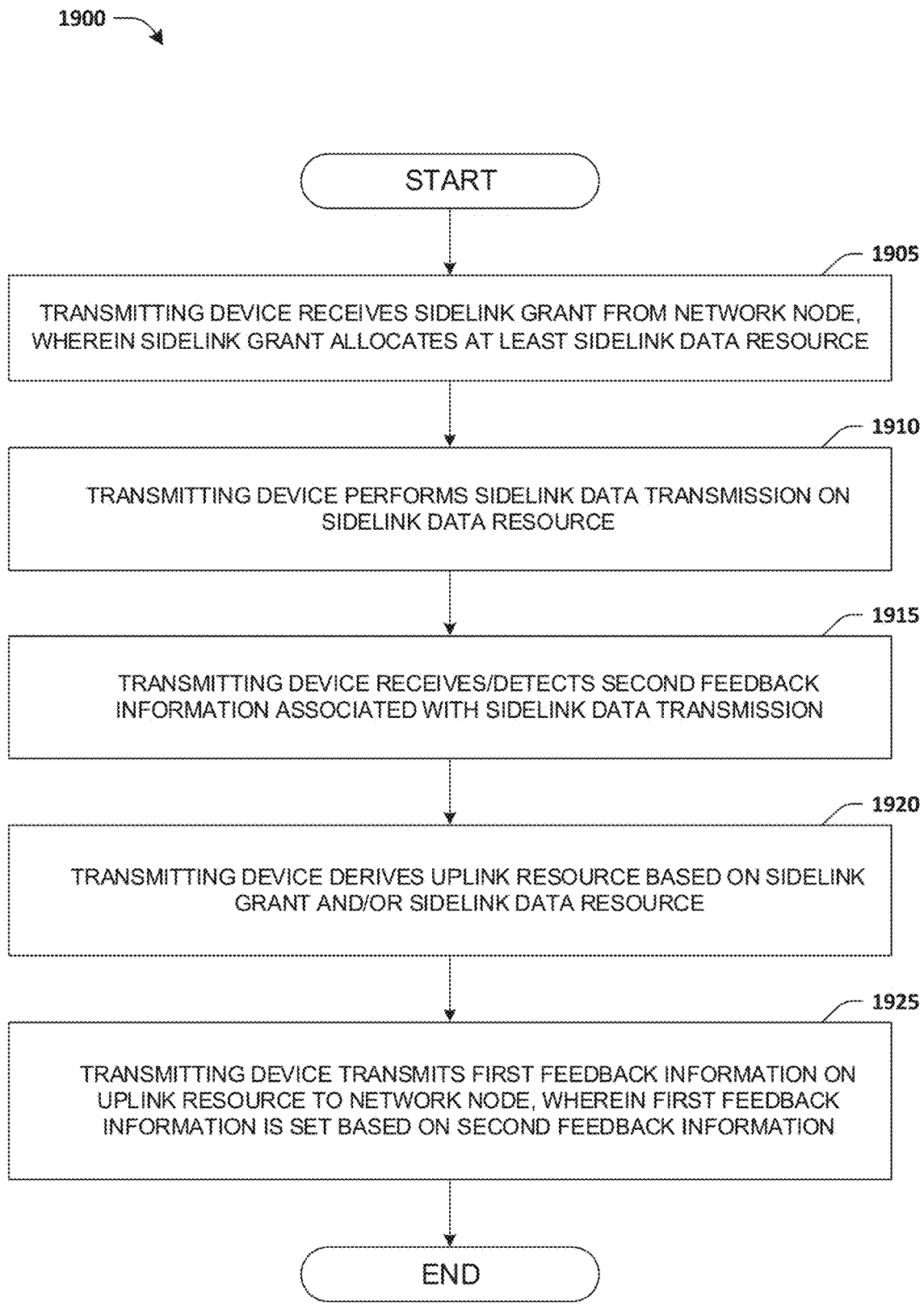
FIG. 19 is a flow chart according to one exemplary embodiment.

FIG. 19 is a flow chart 1900 according to one exemplary embodiment from the perspective of a transmitting device. In step 1905, the transmitting device receives a sidelink grant from a network node, wherein the sidelink grant allocates at least a sidelink data resource. In step 1910, the transmitting device performs a sidelink data transmission on the sidelink data resource. In step 1915, the transmitting device receives/detects a second feedback information associated with the sidelink data transmission. In step 1920, the transmitting device derives an uplink resource based on the sidelink grant and/or the sidelink data resource. In step 1925, the transmitting device transmits a first feedback information on the uplink resource to the network node, wherein the first feedback information is set based on the second feedback information.

In one embodiment, the second feedback information is transmitted from a receiving device.

In one embodiment, the transmitting device receives/detects the second feedback information in a sidelink feedback transmission.

In one embodiment, the transmitting device receives the second feedback information in a MAC CE.

In one embodiment, the transmitting device transmits the first feedback information in an uplink control transmission (e.g., PUCCH).

In one embodiment, the transmitting device transmits the first feedback information in an uplink data transmission and/or the transmitting device transmits the first feedback information multiplexed with an uplink data transmission (e.g., PUSCH).

In one embodiment, the transmitting device receives the second feedback information as positive acknowledgement and/or ACK, and the transmitting device transmits the first feedback information as positive acknowledgement and/or ACK to the network node.

In one embodiment, the transmitting device receives the second feedback information as non-positive acknowledgement and/or NACK, and the transmitting device transmits the first feedback information as non-positive acknowledgement and/or NACK to the network node.

In one embodiment, the transmitting device detects the second feedback information as DTX (e.g., the transmitting device determines that the second feedback information corresponds to DTX), and the transmitting device transmits the first feedback information as non-positive acknowledgement and/or NACK to the network node (e.g., the first feedback information may be indicative of non-positive acknowledgement and/or NACK).

In one embodiment, if the transmitting device does not receive the second feedback information (e.g., DTX), the transmitting device transmits the first feedback information as non-positive acknowledgement and/or NACK to the network node (e.g., the first feedback information may be indicative of non-positive acknowledgment and/or NACK).

In one embodiment, if the transmitting device does not receive the second feedback information (e.g., DTX), the transmitting device does not transmit the first feedback information to the network node.

In one embodiment, the transmitting device receives the second feedback information as positive acknowledgement and/or ACK (e.g., the second feedback information may be indicative of positive acknowledgement and/or ACK), and the transmitting device transmits the first feedback information to the network node.

In one embodiment, if the transmitting device receives the second feedback information as non-positive acknowledgement and/or NACK (e.g., the second feedback information may be indicative of non-positive acknowledgment and/or NACK), the transmitting device does not transmit the first feedback information to the network node.

In one embodiment, the transmitting device does not transmit the first feedback information to the network node means that the transmitting device does not perform uplink transmission for delivering the first feedback information to the network node. In one embodiment, the transmitting device does not transmit the first feedback information to the network node means that the transmitting device neither transmit the first feedback information as non-positive acknowledgement nor transmit the first feedback information as positive acknowledgement to the network node. In one embodiment, the transmitting device does not transmit the first feedback information to the network node means that the transmitting device neither transmit the first feedback information as indicating need of sidelink retransmission resources nor transmit the first feedback information as indicating no need of sidelink retransmission resources to the network node.

In one embodiment, the transmitting device is configured in network scheduling mode (e.g., NR V2X mode 1).

In one embodiment, the second feedback information indicates whether the sidelink data transmission is decoded/received by the receiving device successfully or not In one embodiment, the first feedback information indicates whether the sidelink data transmission on the sidelink data resource is received by the receiving device successfully or not.

In one embodiment, the first feedback information indicates whether the transmitting device needs another sidelink data resource(s) for performing sidelink data retransmission.

In one embodiment, the sidelink grant corresponds to a downlink control information for allocating at least the sidelink data resource.

In one embodiment, the network node transmits the sidelink grant to the transmitting device in Uulink.

In one embodiment, the network node transmits the sidelink grant to the transmitting device via a downlink control transmission.

In one embodiment, the sidelink feedback transmission for delivering the second feedback information is in PC5 interface.

In one embodiment, the sidelink feedback transmission for delivering the second feedback information corresponds to a sidelink control transmission from the receiving device.

In one embodiment, the sidelink feedback transmission for delivering the second feedback information corresponds to a sidelink data transmission from the receiving device.

In one embodiment, the sidelink resource of the sidelink feedback transmission is associated with the sidelink data resource.

In one embodiment, the sidelink resource of the sidelink feedback transmission is derived based on the sidelink data resource.

In one embodiment, the transmitting device transmits a sidelink control information, wherein the sidelink control information allocates/schedules the sidelink data resource for the sidelink data transmission.

In one embodiment, the sidelink resource of the sidelink feedback transmission is associated with a sidelink resource of sidelink control transmission carrying/delivering the sidelink control information.

In one embodiment, the sidelink resource of the sidelink feedback transmission is derived based on a sidelink resource of sidelink control transmission carrying/delivering the sidelink control information.

In one embodiment, the transmitting device transmits the first feedback information via an uplink control/data transmission on the uplink resource.

In one embodiment, the uplink resource is associated with a downlink resource of a downlink control transmission carrying/delivering the sidelink grant.

In one embodiment, the uplink resource is associated with a downlink control information for allocating/scheduling the sidelink data resource.

In one embodiment, the uplink resource is derived based on a downlink resource of a downlink control transmission carrying/delivering the sidelink grant.

In one embodiment, the uplink resource is derived based on a downlink control information for allocating/scheduling the sidelink data resource.

In one embodiment, the association between the uplink resource and the downlink control transmission (and/or the association between a time-domain resource, associated with the uplink resource, and the downlink control transmission) corresponds to a fixed, configured and/or specified TTI difference between the uplink resource and the downlink control transmission (and/or a fixed, configured and/or specified TTI difference between the time-domain resource, associated with the uplink resource, and the downlink control transmission).

In one embodiment, the uplink resource index of the uplink control/data transmission is derived based on a downlink resource index of a downlink control transmission carrying/delivering the sidelink grant.

In one embodiment, the uplink resource index of the uplink control/data transmission is derived based on a downlink resource index of the downlink control information for allocating/scheduling the sidelink data resource.

In one embodiment, the uplink resource is indicated by the sidelink grant.

In one embodiment, the uplink resource is indicated by the downlink control information for allocating/scheduling the sidelink data resource.

In one embodiment, the uplink resource of the uplink control/data transmission (and/or a frequency resource of the uplink resource) is associated with the last resource of the allocated/scheduled the sidelink data resource(s).

In one embodiment, the uplink resource index of the uplink control/data transmission is associated with the sidelink resource index of the last resource of the allocated/scheduled the sidelink data resource(s).

In one embodiment, the uplink resource index of the uplink control/data transmission is associated with the sidelink resource index of the last sidelink control transmission carrying/delivering the sidelink control information.

In one embodiment, the uplink resource (and/or a time-domain resource associated with the uplink resource) is associated with the last resource of the allocated/scheduled the sidelink data resource.

In one embodiment, the uplink resource (and/or the time-domain resource associated with the uplink resource) is derived based on the last resource of the allocated/scheduled the sidelink data resource.

In one embodiment, the association between the uplink resource and the sidelink data resource (and/or the association between the time-domain resource, associated with the uplink resource, and the sidelink data resource) corresponds to a fixed, configured and/or specified TTI difference between the uplink resource and the sidelink data resource (and/or a fixed, configured and/or specified TTI difference between the time-domain resource, associated with the uplink resource, and the sidelink data resource).

In one embodiment, the uplink resource (and/or the time-domain resource associated with the uplink resource) is associated with the resource of last sidelink control transmission carrying/delivering the sidelink control information.

In one embodiment, the uplink resource (and/or the time-domain resource associated with the uplink resource) is derived based on the resource of last sidelink control transmission carrying/delivering the sidelink control information.

In one embodiment, the association between the uplink resource and the sidelink control transmission (and/or the association between the time-domain resource, associated with the uplink resource, and the sidelink control transmission) corresponds to a fixed, configured and/or specified TTI difference between the uplink resource and the sidelink control transmission (and/or a fixed, configured and/or specified TTI difference between the time-domain resource, associated with the uplink resource, and the sidelink control transmission).

In one embodiment, the association between the uplink resource and the sidelink data resource corresponds to a fixed, configured and/or specified frequency resource (index) difference, in unit of frequency resource unit, between the uplink resource and the sidelink data resource.

In one embodiment, the association between the uplink resource and the sidelink control transmission corresponds to a fixed, configured and/or specified frequency resource (index) difference, in unit of frequency resource unit, between the uplink resource and the sidelink control transmission.

In one embodiment, the association between the uplink resource and the downlink control transmission corresponds to a fixed, configured and/or specified frequency resource (index) difference, in unit of frequency resource unit, between the uplink resource and the downlink control transmission.

In one embodiment, the association between the uplink resource and the sidelink data resource corresponds to a fixed, configured and/or specified resource (index) difference between the uplink resource and the sidelink data resource.

In one embodiment, the association between the uplink resource and the sidelink control transmission corresponds to a fixed, configured and/or specified resource (index) difference between the uplink resource and the sidelink control transmission.

In one embodiment, the association between the uplink resource and the downlink control transmission corresponds to a fixed, configured and/or specified resource (index) difference between the uplink resource and the downlink control transmission.

Referring back to FIGS. 3 and 4, in one exemplary embodiment of a transmitting device, the device 300 includes a program code 312 stored in the memory 310. The CPU 308 could execute program code 312 to enable the transmitting device (i) to receive a sidelink grant from a network node, wherein the sidelink grant allocates at least a sidelink data resource, (ii) to perform a sidelink data transmission on the sidelink data resource, (iii) to receive/detect a second feedback information associated with the sidelink data transmission, (iv) to derive an uplink resource based on the sidelink grant and/or the sidelink data resource, and (v) to transmit a first feedback information on the uplink resource to the network node, wherein the first feedback information is set based on the second feedback information. Furthermore, the CPU 308 can execute the program code 312 to perform one, some and/or all of the above-described actions and steps and/or others described herein.

Figure 20:
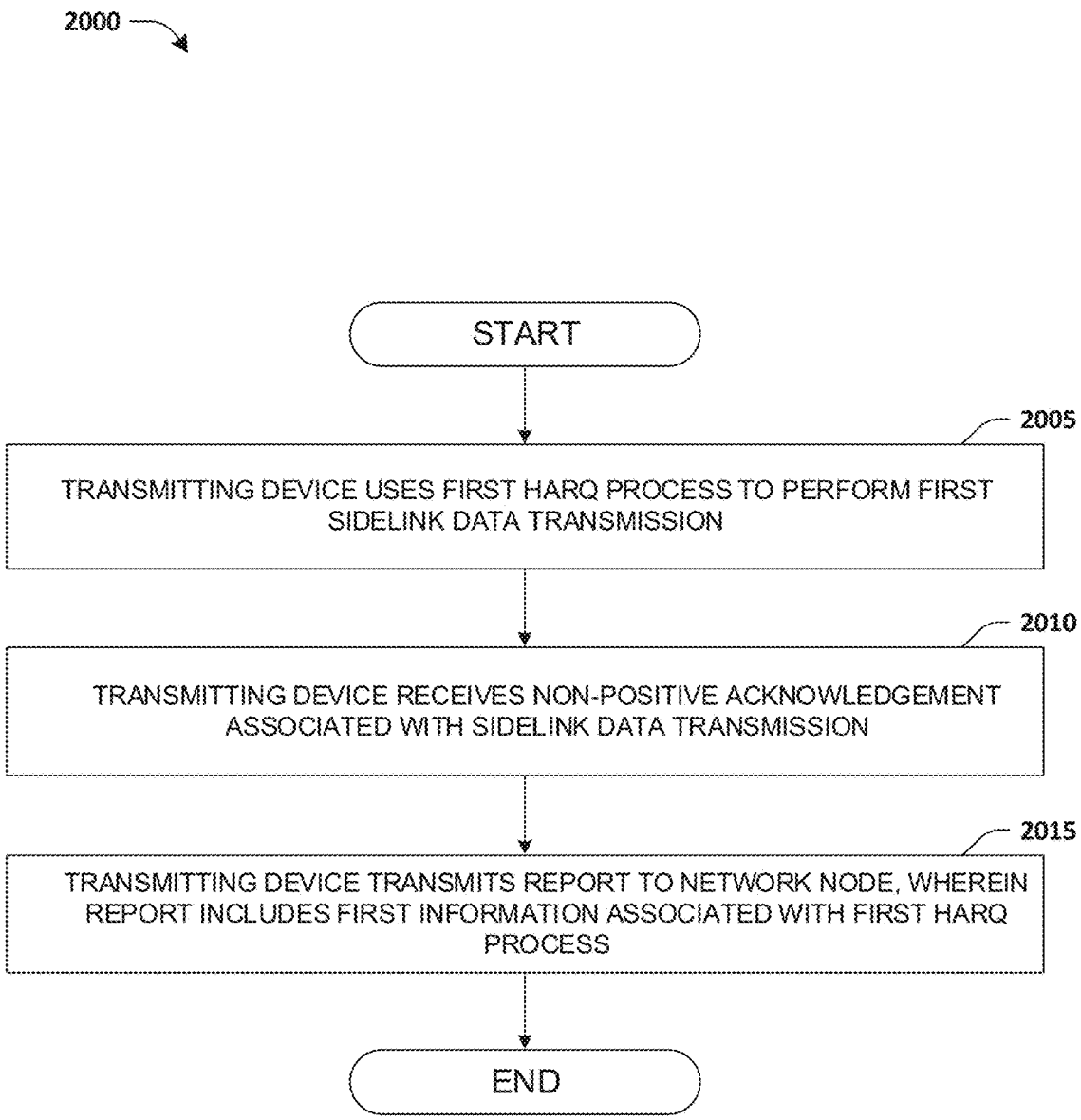
FIG. 20 is a flow chart according to one exemplary embodiment.

FIG. 20 is a flow chart 2000 according to one exemplary embodiment from the perspective of a transmitting device. In step 2005, the transmitting device uses a first HARQ process to perform a first sidelink data transmission. In step 2010, the transmitting device receives a non-positive acknowledgement associated with the sidelink data transmission. In step 2015, the transmitting device transmits a report to a network node, wherein the report includes a first information associated with the first HARQ process.

In one embodiment, the transmitting device transmits a scheduling request to the network node for requesting an uplink resource for transmitting the report.

In one embodiment, the first information includes a transport block size of the first HARQ process.

In one embodiment, the report is a MAC CE.

In one embodiment, the report is a BSR MAC CE.

In one embodiment, the non-positive acknowledgement is transmitted from a second device on sidelink.

In one embodiment, the transmitting device uses a second HARQ process to perform a second sidelink data transmission, the transmitting device does not receive acknowledgement associated with the second sidelink data transmission and/or the transmitting device transmits the report to the network node, wherein the report includes a second information associated with the second HARQ process.

In one embodiment, the report includes a first field for indicating presence of information associated with the first HARQ process.

In one embodiment, the first information includes a priority of transport block in the first HARQ process.

Referring back to FIGS. 3 and 4, in one exemplary embodiment of a transmitting device, the device 300 includes a program code 312 stored in the memory 310. The CPU 308 could execute program code 312 to enable the transmitting device (i) to use a first HARQ process to perform a first sidelink data transmission, (ii) to receive a non-positive acknowledgement associated with the sidelink data transmission, and (iii) to transmit a report to a network node, wherein the report includes a first information associated with the first HARQ process. Furthermore, the CPU 308 can execute the program code 312 to perform one, some and/or all of the above-described actions and steps and/or others described herein.

Figure 21:
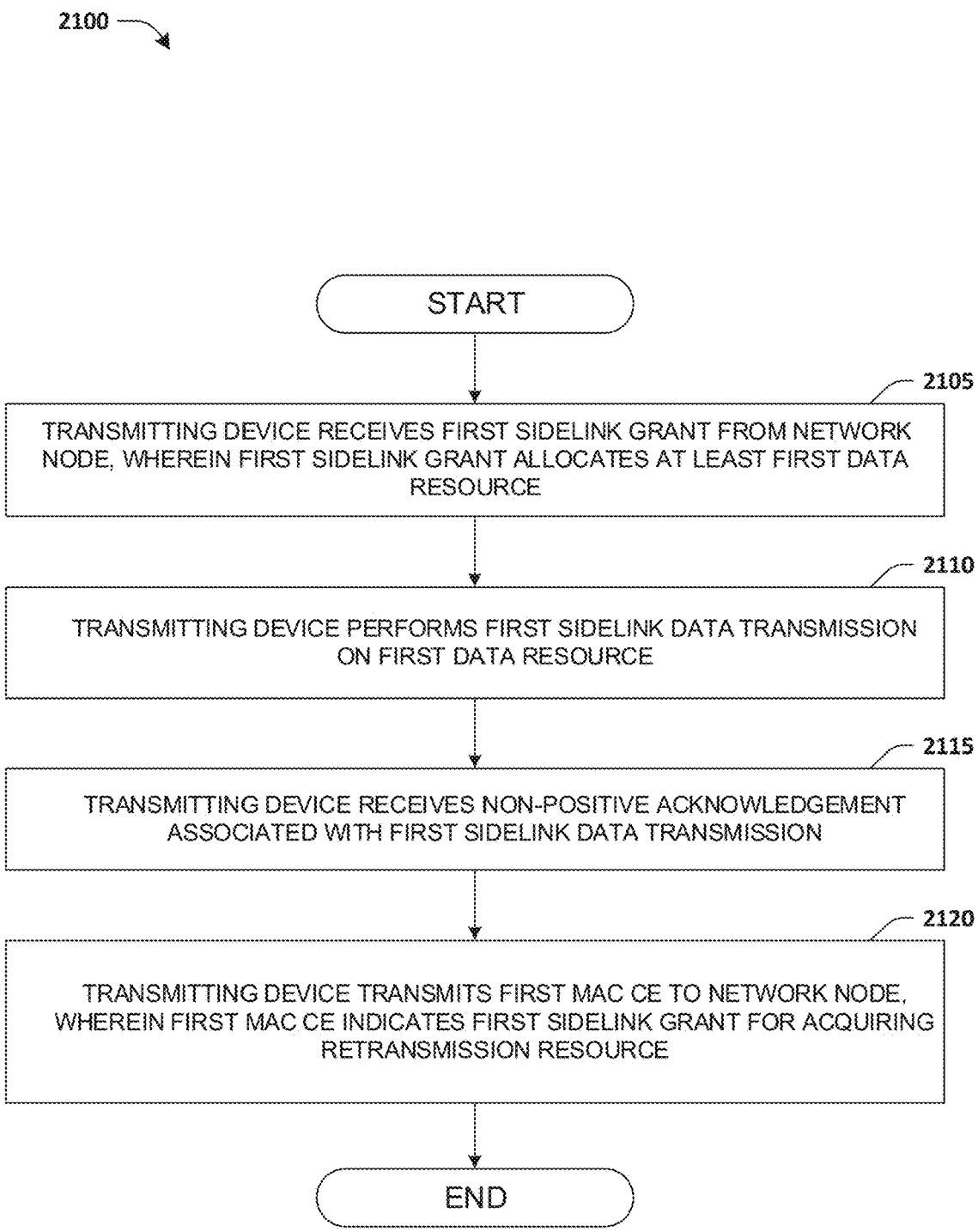
FIG. 21 is a flow chart according to one exemplary embodiment.

FIG. 21 is a flow chart 2100 according to one exemplary embodiment from the perspective of a transmitting device. In step 2105, the transmitting device receives a first sidelink grant from a network node, wherein the first sidelink grant allocates at least a first data resource. In step 2110, the transmitting device performs a first sidelink data transmission on the first data resource. In step 2115, the transmitting device receives a non-positive acknowledgement associated with the first sidelink data transmission. In step 2120, the transmitting device transmits a first MAC CE to network node, wherein the first MAC CE indicates the first sidelink grant for acquiring retransmission resource.

In one embodiment, the transmitting device transmits a request to the network node for requesting an uplink resource for transmitting the first MAC CE.

In one embodiment, the non-positive acknowledgement is transmitted from a second device on sidelink.

In one embodiment, the transmitting device receives a second sidelink grant from the network node, wherein the second sidelink grant allocates at least a second data resource, the transmitting device performs a second sidelink data transmission on the second data resource, the transmitting device does not receive acknowledgement associated with the second sidelink data transmission and/or the transmitting device transmits a second MAC CE to network node, wherein the second MAC CE indicates the second sidelink grant for acquiring retransmission resource.

In one embodiment, the first/second MAC CE indicates sidelink grant(s) for acquiring retransmission resource in sidelink grant(s) receiving order.

In one embodiment, the first/second MAC CE indicates sidelink grant(s) for acquiring retransmission resource in order of sidelink data transmission of sidelink grant(s).

In one embodiment, the first/second MAC CE indicates sidelink grant(s) for acquiring retransmission resource in order of sidelink control transmission of sidelink grant(s).

Referring back to FIGS. 3 and 4, in one exemplary embodiment of a transmitting device, the device 300 includes a program code 312 stored in the memory 310. The CPU 308 could execute program code 312 to enable the transmitting device (i) to receive a first sidelink grant from a network node, wherein the first sidelink grant allocates at least a first data resource, (ii) to perform a first sidelink data transmission on the first data resource, (iii) to receive a non-positive acknowledgement associated with the first sidelink data transmission, and (iv) to transmit a first MAC CE to network node, wherein the first MAC CE indicates the first sidelink grant for acquiring retransmission resource. Furthermore, the CPU 308 can execute the program code 312 to perform one, some and/or all of the above-described actions and steps and/or others described herein.

Referring back to FIGS. 16-21, in one embodiment, the second MAC CE and the first MAC CE are the same MAC CE.

In one embodiment, the second MAC CE and the first MAC CE are different MAC CEs.

Figure 22:
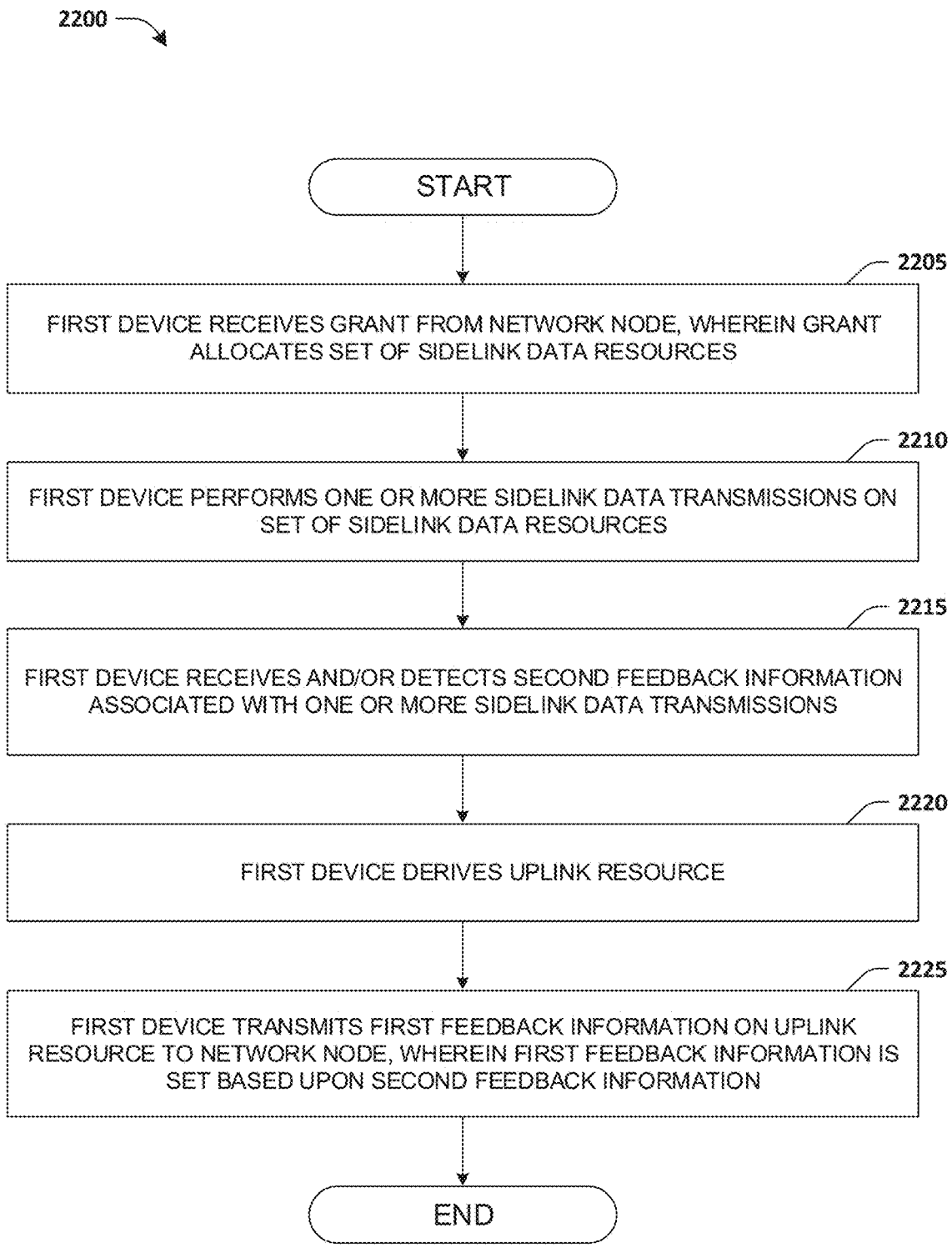
FIG. 22 is a flow chart according to one exemplary embodiment.

FIG. 22 is a flow chart 2200 according to one exemplary embodiment from the perspective of a first device. In step 2205, the first device receives a grant from a network node, wherein the grant allocates a set of sidelink data resources (e.g., a set of one or more sidelink data resources). In step 2210, the first device performs one or more sidelink data transmissions on the set of sidelink data resources. In step 2215, the first device receives and/or detects a second feedback information associated with the one or more sidelink data transmissions. In step 2220, the first device derives an uplink resource. In step 2225, the first device transmits a first feedback information on the uplink resource to the network node, wherein the first feedback information is set based upon the second feedback information.

In one embodiment, the uplink resource is derived based upon a downlink resource of a downlink control transmission associated with delivery of the grant from the network node.

In one embodiment, the uplink resource is derived based upon a time-domain association between the uplink resource and the downlink resource, wherein a TTI difference between the uplink resource and the downlink resource is fixed, configured (e.g., pre-configured) and/or specified.

In one embodiment, the first device derives an uplink resource index of the uplink resource based upon a downlink resource index of the downlink resource.

In one embodiment, the uplink resource is indicated by the grant.

In one embodiment, the uplink resource is derived based upon a last sidelink data resource of the set of sidelink data resources.

In one embodiment, the uplink resource is derived based upon a time-domain association between the uplink resource and the last sidelink data resource, wherein a TTI difference between the uplink resource and the last sidelink data resource is fixed, configured (e.g., pre-configured) and/or specified.

In one embodiment, the first device derives an uplink resource index of the uplink resource based upon a sidelink resource index of the last sidelink data resource.

In one embodiment, the first device transmits a sidelink control information on a sidelink control resource. In one embodiment, the sidelink control information allocates and/or schedules a sidelink data transmission on a last sidelink data resource of the set of sidelink data resources. In one embodiment, the uplink resource is derived based upon the sidelink control resource associated with delivery of the sidelink control information.

In one embodiment, the uplink resource is derived based upon a time-domain association between the uplink resource and the sidelink control resource, wherein a TTI difference between the uplink resource and the sidelink control resource is fixed, configured (e.g., pre-configured) and/or specified.

In one embodiment, the first device derives an uplink resource index of the uplink resource based upon a sidelink resource index of the sidelink control resource.

In one embodiment, each sidelink data transmission of the one or more sidelink data transmissions carries and/or delivers a same data packet and/or a same transport block. For example, the one or more sidelink data transmissions may carry and/or deliver the same data packet and/or the same transport block.

In one embodiment, the second feedback information is indicative of whether the one or more sidelink data transmissions are successfully decoded and/or successfully received by a receiving device and/or the first feedback information is indicative of whether sidelink data resources are needed by the first device for sidelink data retransmission.

In one embodiment, when the second feedback information is associated with a positive acknowledgement, the first feedback information indicates that sidelink retransmission resources are not needed and/or indicates a second positive acknowledgement. For example, when the first device receives the second feedback information as a positive acknowledgement, the first device may transmit the first feedback information as a second positive acknowledgement.

In one embodiment, when the second feedback information is associated with a non-positive acknowledgement, the first feedback information indicates that sidelink retransmission resources are needed and/or indicates a second non-positive acknowledgement. For example, when the first device receives the second feedback information as a non-positive acknowledgement, the first device may transmit the first feedback information as a second non-positive acknowledgement.

In one embodiment, when the second feedback information is associated with a non-positive acknowledgement, the first device may not transmit the first feedback information on the uplink resource to the network node. For example, when the first device receives the second feedback information as a non-positive acknowledgement, the first device may not transmit the first feedback information on the uplink resource to the network node.

In one embodiment, when the first device does not receive the second feedback information (e.g., DTX), the first feedback information indicates that sidelink retransmission resources are needed and/or indicates a second non-positive acknowledgement. For example, when the first device does not receive the second feedback information (e.g., DTX), the first device may transmit the first feedback information as a second non-positive acknowledgement.

In one embodiment, when the first device does not receive the second feedback information (e.g., DTX), the first device may not transmit the first feedback information on the uplink resource to the network node. For example, when the first device does not receive the second feedback information (e.g., DTX), the first device may not transmit the first feedback information on the uplink resource to the network node.

In one embodiment, the first device may not transmit the first feedback information on the uplink resource to the network node means that the first device may not perform uplink transmission on the uplink resource to the network node. In one embodiment, the first device may not transmit the first feedback information on the uplink resource to the network node means that on the uplink resource to the network node, the first device may not transmit the first feedback information as non-positive acknowledgement and may not transmit the first feedback information as positive acknowledgement. In one embodiment, the first device may not transmit the first feedback information on the uplink resource to the network node means that on the uplink resource to the network node, the first device may not transmit the first feedback information as indicating need of sidelink retransmission resources and may not transmit the first feedback information as indicating no need of sidelink retransmission resources.

Referring back to FIGS. 3 and 4, in one exemplary embodiment of a first device, the device 300 includes a program code 312 stored in the memory 310. The CPU 308 could execute program code 312 to enable the first device (i) to receive a grant from a network node, wherein the grant allocates a set of sidelink data resources, (ii) to perform one or more sidelink data transmissions on the set of sidelink data resources, (iii) to receive and/or detect a second feedback information associated with the one or more sidelink data transmissions, (iv) to derive an uplink resource, and (v) to transmit a first feedback information on the uplink resource to the network node, wherein the first feedback information is set based upon the second feedback information. Furthermore, the CPU 308 can execute the program code 312 to perform one, some and/or all of the above-described actions and steps and/or others described herein.

Figure 23:
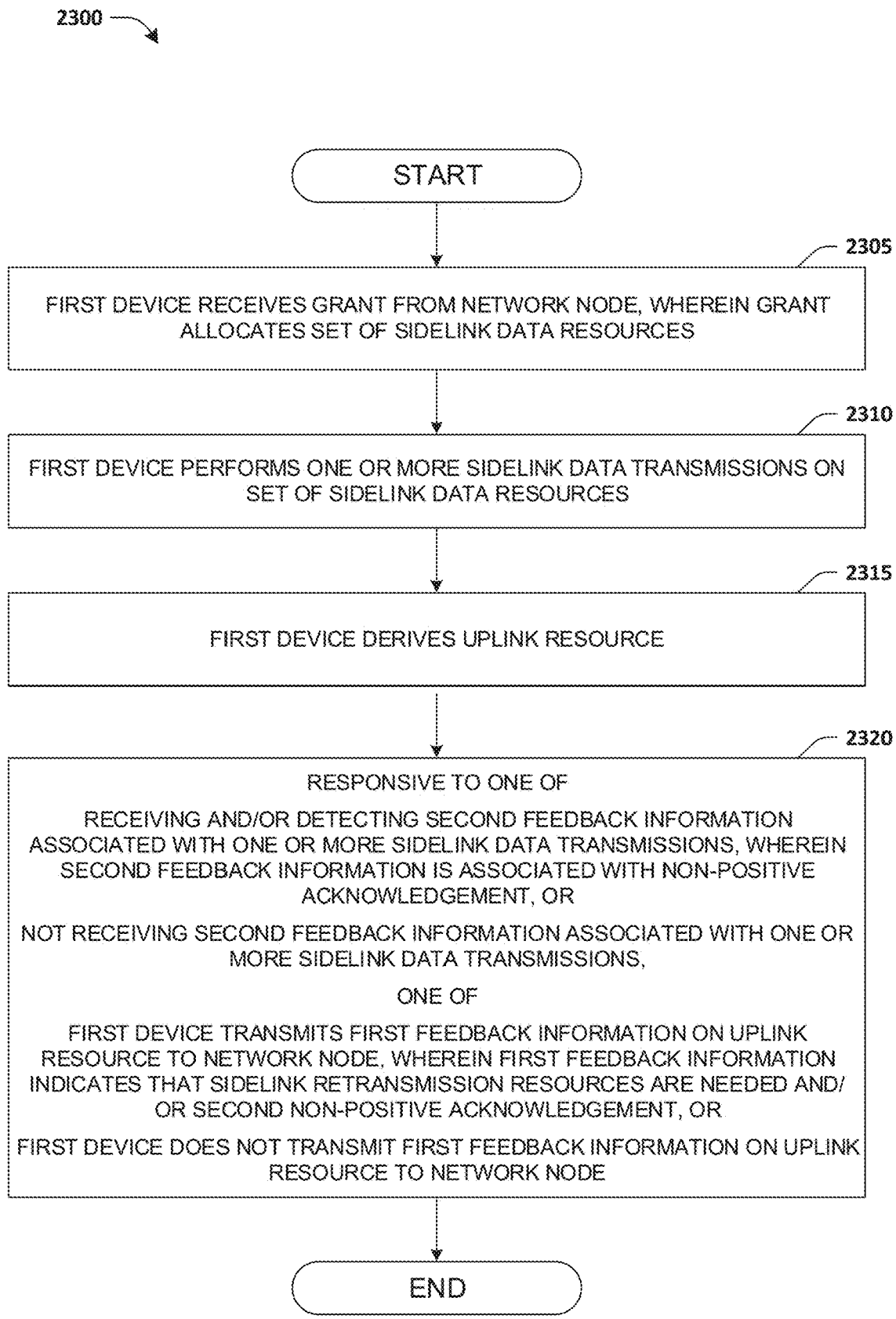
FIG. 23 is a flow chart according to one exemplary embodiment.

FIG. 23 is a flow chart 2300 according to one exemplary embodiment from the perspective of a first device. In step 2305, the first device receives a grant from a network node, wherein the grant allocates a set of sidelink data resources. In step 2310, the first device performs one or more sidelink data transmissions on the set of sidelink data resources. In step 2315, the first device derives an uplink resource. In step 2320, responsive to receiving and/or detecting a second feedback information associated with the one or more sidelink data transmissions, wherein the second feedback information is associated with a non-positive acknowledgement, and/or responsive to not receiving the second feedback information associated with the one or more sidelink data transmissions, the first device transmits a first feedback information on the uplink resource to the network node, wherein the first feedback information indicates that sidelink retransmission resources are needed and/or indicates a second non-positive acknowledgement, and/or the first device does not transmit the first feedback information on the uplink resource to the network node.

In one embodiment, the first device does not transmit the first feedback information on the uplink resource to the network node means that the first device does not perform uplink transmission on the uplink resource to the network node. In one embodiment, the first device does not transmit the first feedback information on the uplink resource to the network node means that the first device neither transmit the first feedback information as non-positive acknowledgement nor transmit the first feedback information as positive acknowledgement on the uplink resource to the network node. In one embodiment, the first device does not transmit the first feedback information on the uplink resource to the network node means that the first device neither transmit the first feedback information as indicating need of sidelink retransmission resources nor transmit the first feedback information as indicating no need of sidelink retransmission resources on the uplink resource to the network node.

In one embodiment, the uplink resource is derived based upon a downlink resource of a downlink control transmission associated with delivery of the grant from the network node.

In one embodiment, the uplink resource is derived based upon a time-domain association between the uplink resource and the downlink resource, wherein a TTI difference between the uplink resource and the downlink resource is fixed, configured (e.g., pre-configured) and/or specified.

In one embodiment, the first device derives an uplink resource index of the uplink resource based upon a downlink resource index of the downlink resource.

In one embodiment, the uplink resource is indicated by the grant.

In one embodiment, the uplink resource is derived based upon a last sidelink data resource of the set of sidelink data resources.

In one embodiment, the uplink resource is derived based upon a time-domain association between the uplink resource and the last sidelink data resource, wherein a TTI difference between the uplink resource and the last sidelink data resource is fixed, configured (e.g., pre-configured) and/or specified.

In one embodiment, the first device derives an uplink resource index of the uplink resource based upon a sidelink resource index of the last sidelink data resource.

In one embodiment, the first device transmits a sidelink control information on a sidelink control resource. In one embodiment, the sidelink control information allocates and/or schedules a sidelink data transmission on a last sidelink data resource of the set of sidelink data resources. In one embodiment, the uplink resource is derived based upon the sidelink control resource associated with delivery of the sidelink control information.

In one embodiment, the uplink resource is derived based upon a time-domain association between the uplink resource and the sidelink control resource, wherein a TTI difference between the uplink resource and the sidelink control resource is fixed, configured (e.g., pre-configured) and/or specified.

In one embodiment, the first device derives an uplink resource index of the uplink resource based upon a sidelink resource index of the sidelink control resource.

In one embodiment, each sidelink data transmission of the one or more sidelink data transmissions carries and/or delivers a same data packet and/or a same transport block. For example, the one or more sidelink data transmissions may carry and/or deliver the same data packet and/or the same transport block.

In one embodiment, the second feedback information is indicative of whether the one or more sidelink data transmissions are successfully decoded and/or successfully received by a receiving device and/or the first feedback information is indicative of whether sidelink data resources are needed by the first device for sidelink data retransmission.

In one embodiment, when the first device receives the second feedback information as a non-positive acknowledgement and/or when the first device does not receive the second feedback information (e.g., DTX), the first device may transmit the first feedback information as a second non-positive acknowledgement.

Referring back to FIGS. 3 and 4, in one exemplary embodiment of a first device, the device 300 includes a program code 312 stored in the memory 310. The CPU 308 could execute program code 312 to enable the first device (i) to receive a grant from a network node, wherein the grant allocates a set of sidelink data resources, (ii) to perform one or more sidelink data transmissions on the set of sidelink data resources, (iii) to derive an uplink resource, and (iv) responsive to receiving and/or detecting a second feedback information associated with the one or more sidelink data transmissions, wherein the second feedback information is associated with a non-positive acknowledgement, and/or responsive to not receiving the second feedback information associated with the one or more sidelink data transmissions, to transmit a first feedback information on the uplink resource to the network node, wherein the first feedback information indicates that sidelink retransmission resources are needed and/or indicates a second non-positive acknowledgement, and/or to not transmit the first feedback information on the uplink resource to the network node. Furthermore, the CPU 308 can execute the program code 312 to perform one, some and/or all of the above-described actions and steps or others described herein.

Figure 24:
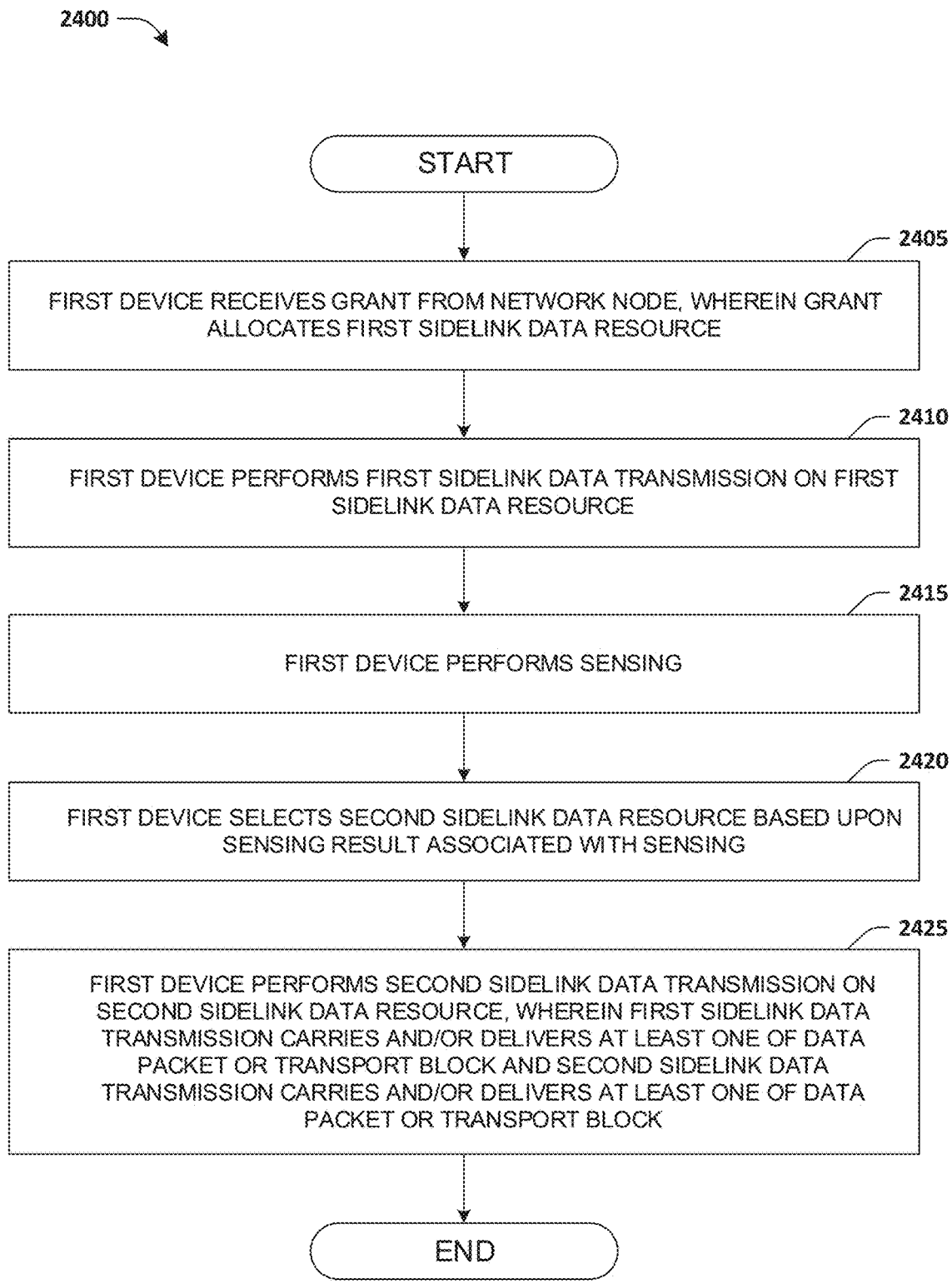
FIG. 24 is a flow chart according to one exemplary embodiment.

FIG. 24 is a flow chart 2400 according to one exemplary embodiment from the perspective of a first device. In step 2405, the first device receives a grant from a network node, wherein the grant allocates a first sidelink data resource (e.g., the grant allocates at least the first sidelink data resource). In step 2410, performs a first sidelink data transmission on the first sidelink data resource. In step 2415, the first device performs sensing. In step 2420, the first device selects a second sidelink data resource based upon a sensing result associated with the sensing. In step 2425, the first device performs a second sidelink data transmission on the second sidelink data resource, wherein the first sidelink data transmission carries and/or delivers at least one of a data packet or a transport block and the second sidelink data transmission carries and/or delivers the same at least one of the data packet or the transport block (e.g., the first sidelink data transmission and/or the second sidelink data transmission may carry and/or deliver the same data packet and/or the same transport block).

In one embodiment, the first sidelink data transmission is performed in a first data resource pool and/or the second sidelink data transmission is performed in a second data resource pool, different than the first data resource pool.

In one embodiment, the first sidelink data transmission is performed in a first data resource pool and/or the second sidelink data transmission is performed in the first data resource pool.

In one embodiment, the first device receives a feedback information indicative of a non-positive acknowledgement associated with the first sidelink data transmission, wherein the second sidelink data transmission is performed responsive to the feedback information. For example, the first device may receive a feedback information as a non-positive acknowledgement associated with the first sidelink data transmission before the first device performs the second sidelink data transmission.

Referring back to FIGS. 3 and 4, in one exemplary embodiment of a first device, the device 300 includes a program code 312 stored in the memory 310. The CPU 308 could execute program code 312 to enable the first device (i) to receive a grant from a network node, wherein the grant allocates a first sidelink data resource, (ii) to perform a first sidelink data transmission on the first sidelink data resource, (iii) to perform sensing, (iv) to select a second sidelink data resource based upon a sensing result associated with the sensing, and (v) to perform a second sidelink data transmission on the second sidelink data resource, wherein the first sidelink data transmission carries and/or delivers at least one of a data packet or a transport block and the second sidelink data transmission carries and/or delivers the same at least one of the data packet or the transport block. Furthermore, the CPU 308 can execute the program code 312 to perform one, some and/or all of the above-described actions and steps and/or others described herein.

It may be appreciated that applying one or more of the techniques presented herein may result in one or more benefits including, but not limited to, improving a performance of a communication device (e.g., a UE, a base station, a network node, etc.) as a result of enabling the communication device to efficiently acquire sidelink data resources for NR-V2X sidelink data retransmission.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 16-24. Furthermore, the processor may execute the program code to perform one, some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device for performing sidelink transmission, the method comprising:
receiving a first grant from a network node, wherein the first grant is derived from a first downlink control information for allocating a first set of sidelink data resources;
transmitting a sidelink control information to a second device, wherein the sidelink control information indicates the second device to perform a sidelink feedback transmission;
performing one or more sidelink data transmissions of a first transport block on the first set of sidelink data resources to the second device;
at least one of receiving or detecting a second sidelink feedback information associated with the one or more sidelink data transmissions of the first transport block via the sidelink feedback transmission from the second device;
deriving an uplink resource, wherein the uplink resource is associated with at least one of the first set of sidelink data resources or the first downlink control information; and
transmitting a first feedback information on the uplink resource to the network node, wherein the first feedback information is set based upon the second sidelink feedback information,
wherein:
the first feedback information at least one of indicates a non-positive acknowledgement or indicates sidelink retransmission resources for the first transport block is needed; or
the first feedback information at least one of indicates a positive acknowledgement or indicates sidelink retransmission resources for the first transport block is not needed.

2. The method of claim 1, wherein:
the uplink resource comprises at least one of a frequency resource or a time-domain resource of the uplink resource.

3. The method of claim 1, wherein:
a time-domain resource of the uplink resource is associated with a sidelink data resource among the first set of sidelink data resources.

4. The method of claim 3, wherein:
the time-domain resource of the uplink resource is associated with the sidelink data resource among the first set of sidelink data resources and an indication of the first grant.

5. The method of claim 3, wherein:
the time-domain resource of the uplink resource is associated with a last sidelink data resource of the first set of sidelink data resources in a time domain.

6. The method of claim 5, wherein at least one of:
the deriving the uplink resource is based upon a time-domain association between the uplink resource and the last sidelink data resource; or
a transmission time interval (TTI) difference between the uplink resource and the last sidelink data resource is at least one of fixed, configured or specified.

7. The method of claim 5, wherein:
the deriving the uplink resource comprises deriving an uplink resource index of the uplink resource based upon a sidelink resource index of the last sidelink data resource.

8. The method of claim 3, comprising:
transmitting the sidelink control information on a sidelink control resource, wherein:
the sidelink control information at least one of allocates or schedules a sidelink data transmission on a last sidelink data resource of the first set of sidelink data resources in a time domain; and
the time-domain resource of the uplink resource is associated with the sidelink control resource associated with delivery of the sidelink control information.

9. The method of claim 8, wherein at least one of:
the deriving the uplink resource is based upon a time-domain association between the uplink resource and the sidelink control resource; or
a transmission time interval (TTI) difference between the uplink resource and the sidelink control resource is at least one of fixed, configured or specified.

10. The method of claim 8, wherein:
the deriving the uplink resource comprises deriving an uplink resource index of the uplink resource based upon a sidelink resource index of the sidelink control resource.

11. The method of claim 1, wherein:
a time-domain resource of the uplink resource is associated with a downlink resource associated with a downlink control transmission associated with delivery of the first grant from the network node.

12. The method of claim 1, comprising:
receiving a second grant, via a second downlink control information, from the network node if the first feedback information indicates the non-positive acknowledgement, wherein the second grant allocates a second set of sidelink data resources for one or more sidelink data retransmissions of the first transport block; or
receiving a third grant, via a third downlink control information, from the network node if the first feedback information indicates the positive acknowledgement, wherein the third grant allocates a third set of sidelink data resources for one or more sidelink data transmissions of a second transport block.

13. The method of claim 1, wherein at least one of:
the second sidelink feedback information is indicative of whether the one or more sidelink data transmissions are at least one of successfully decoded or successfully received by a receiving device; or
the first feedback information is indicative of whether sidelink data resources are needed by the first device for sidelink data retransmission.

14. The method of claim 1, wherein:
when the second sidelink feedback information is associated with a positive acknowledgement, the first feedback information indicates at least one of that sidelink retransmission resources are not needed or a second positive acknowledgement.

15. The method of claim 1, wherein:
when the second sidelink feedback information is associated with a non-positive acknowledgement, the first feedback information indicates at least one of that sidelink retransmission resources are needed or a second non-positive acknowledgement.

16. A method of a first device for performing sidelink transmission, the method comprising:
receiving a first grant from a network node, wherein the first grant is derived from a first downlink control information for allocating a first set of sidelink data resources;
transmitting a sidelink control information to a second device, wherein the sidelink control information indicates the second device to perform a sidelink feedback transmission;
performing one or more sidelink data transmissions of a first transport block on the first set of sidelink data resources to the second device;
deriving an uplink resource; and
responsive to one of:
at least one of receiving or detecting a second sidelink feedback information associated with the one or more sidelink data transmissions of the first transport block via the sidelink feedback transmission from the second device, wherein the second sidelink feedback information is associated with a non-positive acknowledgement; or
not receiving the second sidelink feedback information associated with the one or more sidelink data transmissions,
transmitting a first feedback information on the uplink resource to the network node, wherein the first feedback information indicates at least one of that sidelink retransmission resources for the first transport block are needed or a second non-positive acknowledgement.

17. A method of a first device for performing sidelink transmission, the method comprising:
receiving a grant from a network node, wherein the grant is derived from a downlink control information for allocating a first sidelink data resource;
performing a first sidelink data transmission on the first sidelink data resource;
performing sensing;
selecting a second sidelink data resource based upon a sensing result associated with the sensing; and
performing a second sidelink data transmission on the second sidelink data resource selected based upon the sensing result associated with the sensing, wherein:
the first sidelink data transmission is performed in a first data resource pool;
the second sidelink data transmission is performed in a second data resource pool, different than the first data resource pool;
the first sidelink data transmission on the first sidelink data resource at least one of carries or delivers a transport block; and
the second sidelink data transmission on the second sidelink data resource at least one of carries or delivers the same transport block, which is identical to the transport block at least one of carried or delivered by the first sidelink data transmission on the first sidelink data resource.

18. The method of claim 17, comprising:
receiving a sidelink feedback information indicative of a non-positive acknowledgement associated with the first sidelink data transmission.

19. The method of claim 18, wherein:
the second sidelink data transmission is performed responsive to the sidelink feedback information.

20. The method of claim 18, wherein:
the second sidelink data resource is selected based upon the sensing result associated with the sensing responsive to the sidelink feedback information.

21. The method of claim 17, wherein:
after performing the first sidelink data transmission on the first sidelink data resource allocated by the downlink control information from which the grant is derived, the second sidelink data resource is selected based upon the sensing result associated with the sensing.

* * * * *